US006963521B2

(12) United States Patent
Hayashi

(10) Patent No.: US 6,963,521 B2
(45) Date of Patent: Nov. 8, 2005

(54) DISC DRIVE APPARATUS

(75) Inventor: Tsuneo Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 625 days.

(21) Appl. No.: 10/109,078

(22) Filed: Mar. 28, 2002

(65) Prior Publication Data

US 2002/0167874 A1 Nov. 14, 2002

(30) Foreign Application Priority Data

Mar. 30, 2001 (JP) ............................ 2001-102563
Mar. 30, 2001 (JP) ............................ 2001-102565
Mar. 30, 2001 (JP) ............................ 2001-102568

(51) Int. Cl.[7] ................................................ G11B 7/00
(52) U.S. Cl. .............................. 369/44.13; 369/44.35; 369/53.28
(58) Field of Search .......................... 369/44.13, 44.25, 369/44.26, 44.27, 44.28, 44.29, 44.32, 44.35, 369/44.36, 47.44, 47.45, 53.28, 53.29

(56) References Cited

U.S. PATENT DOCUMENTS 5,696,742 A * 12/1997 Ogata et al. ............ 369/47.22
6,469,980 B1 * 10/2002 Takemura et al. ....... 369/275.3

* cited by examiner

*Primary Examiner*—Paul W. Huber
(74) *Attorney, Agent, or Firm*—Frommer Lawrence & Haug LLP; William S. Frommer

(57) ABSTRACT

Disclosed herein is a disc drive apparatus for recording and reproducing data to and from an optical disc-like storage medium. The apparatus includes a wobble signal generating element for generating a wobble signal representative of information about the wobble detected based on reflected light from the optical disc-like storage medium, and a land/groove detecting element for determining, when the light beam fails to trace a specific track correctly on the storage medium, whether the emitted light beam is located on a land field or in a groove field. The land/groove detecting element further outputs a land/groove detection signal having a waveform inverted depending on whether the light beam is located on the land field or in the groove field. The apparatus also includes a moving direction determining element for determining a radial moving direction of the light beam over the disc signal surface based on a phase difference between the land/groove detection signal and a tracking error signal that represents how much the light beam deviates from the specific track on the disc signal surface, and a controlling element for executing control so as to prevent the light beam from moving in the direction determined by the moving direction determining element.

7 Claims, 44 Drawing Sheets

FIG. 7

1 SECTOR

HEADER FIELD | RECORDABLE FIELD

| HEADER FIELD | MIRROR FIELD | GAP FIELD | GUARD1 FIELD | VFO3 FIELD | PS FIELD | DATA FIELD | PA3 FIELD | GUARD2 FIELD | BUFFER FIELD |
|---|---|---|---|---|---|---|---|---|---|
| 128 | 2 | 10+J/16 | 20+K | 35 | 3 | 2418 | 1 | 55−K | 25−J/16 |

| HEADER FIELD 1 | | | | | HEADER FIELD 2 | | | | | HEADER FIELD 3 | | | | | HEADER FIELD 4 | | | | |
|---|---|---|---|---|---|---|---|---|---|---|---|---|---|---|---|---|---|---|---|
| VFO1 | AM | PID1 | IED1 | PA1 | VFO2 | AM | PID2 | IED2 | PA2 | VFO1 | AM | PID3 | IED3 | PA1 | VFO2 | AM | PID4 | IED4 | PA2 |
| 36 | 3 | 4 | 2 | 1 | 8 | 3 | 4 | 2 | 1 | 36 | 3 | 4 | 2 | 1 | 8 | 3 | 4 | 2 | 1 |

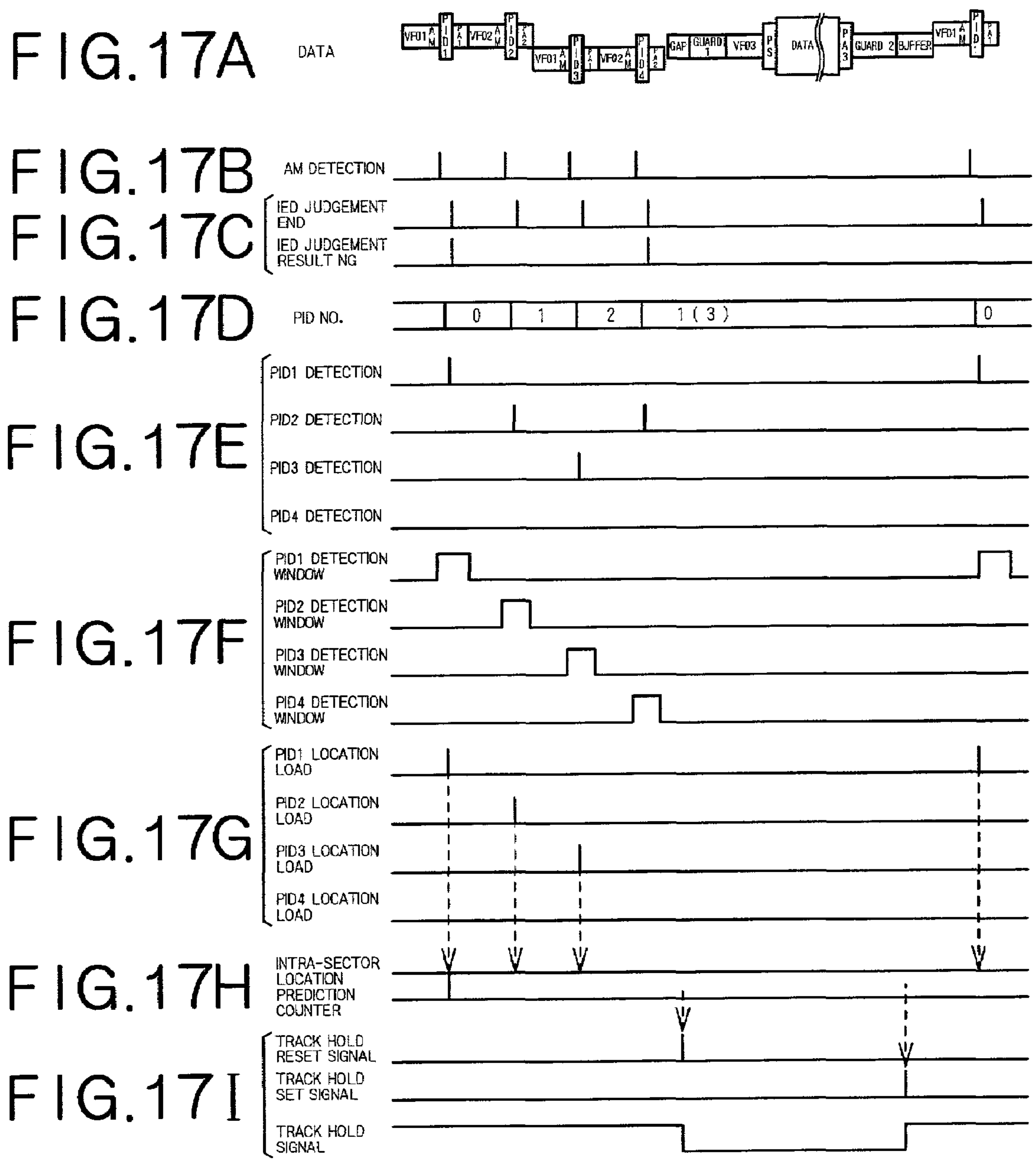
FIG.17A
DATA
VFO1
AM
PID1
PA1
VFO2
AM
PID2
PA2
VFO1
AM
PID3
PA1
VFO2
AM
PID4
PA2
GAP
GUARD 1
VFO3
PS
DATA
PA3
GUARD 2
BUFFER
VFO1
AM
PID
PA1
FIG.17B
AM DETECTION
FIG.17C
IED JUDGEMENT END
IED JUDGEMENT RESULT NG
FIG.17D
PID NO.
0
1
2
1 ( 3 )
0
FIG.17E
PID1 DETECTION
PID2 DETECTION
PID3 DETECTION
PID4 DETECTION
FIG.17F
PID1 DETECTION WINDOW
PID2 DETECTION WINDOW
PID3 DETECTION WINDOW
PID4 DETECTION WINDOW
FIG.17G
PID1 LOCATION LOAD
PID2 LOCATION LOAD
PID3 LOCATION LOAD
PID4 LOCATION LOAD
FIG.17H
INTRA-SECTOR LOCATION PREDICTION COUNTER
FIG.17I
TRACK HOLD RESET SIGNAL
TRACK HOLD SET SIGNAL
TRACK HOLD SIGNAL

FIG. 26A PERIOD MEASUREMENT

FIG. 26B MAXIMUM VALUE HOLD

FIG. 26C MINIMUM VALUE HOLD

FIG. 32A WOBBLE-FROM RF-AMP

FIG. 32B HEADER HOLD SIGNAL

FIG. 32C CORRECTED WOBBLE SIGNAL

FIG. 35A WOBBLE-FROM RF-AMP

FIG. 35B SYNC PROTECTION HOLD SIGNAL (WBHLD)

FIG. 35C pwbpe

FIG. 35D WOBBLE SIGNAL BASED ON pwbpe

FIG. 40A wbwin

FIG. 40B wbpe-1

FIG. 40C SPOT LOCATION

FIG. 40D LAND/GROOVE DETECTION SIGNAL

FIG. 41A wbwin

FIG. 41B wbpe-1

FIG. 41C SPOT LOCATION

FIG. 41D LAND/GROOVE DETECTION SIGNAL

RADIALLY OUTER ZONE
(UPON ARRIVAL IN GROOVE)
RADIALLY
INNER ZONE

TE
0

ZERO-CROSS
DETECTION PULSE

LAND/GROOVE
DETECTION SIGNAL
LAND
GROOVE
H
L

TRACKING DRIVE
INHIBIT SIGNAL
H
L

TRACKING DRIVE
OUTPUT
INHIBITED

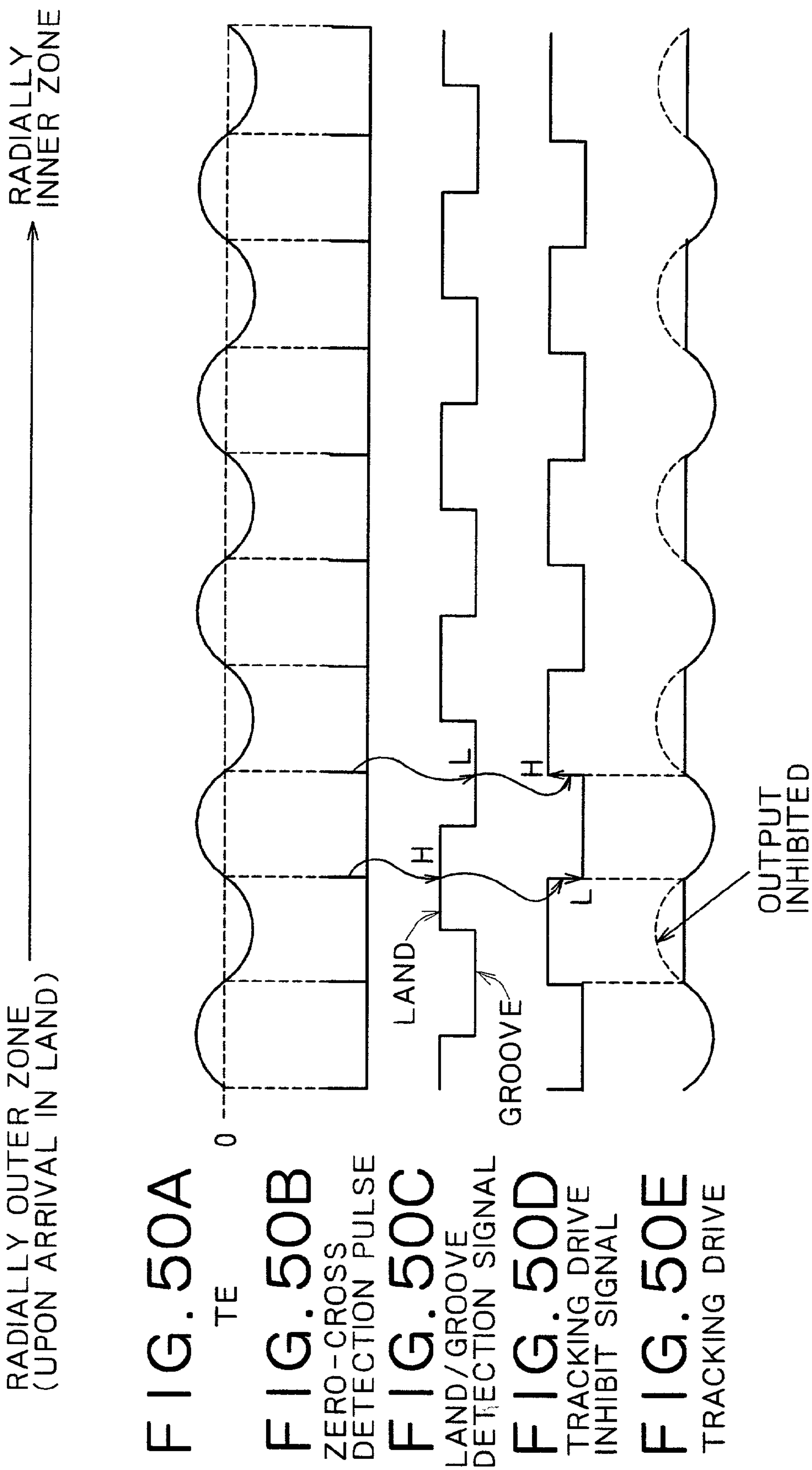
FIG. 50A TE
FIG. 50B ZERO-CROSS DETECTION PULSE
FIG. 50C LAND/GROOVE DETECTION SIGNAL
FIG. 50D TRACKING DRIVE INHIBIT SIGNAL
FIG. 50E TRACKING DRIVE

DISC DRIVE APPARATUS

BACKGROUND OF THE INVENTION

The present invention relates to a disc drive apparatus capable of recording and reproducing data to and from an optical disc-like storage medium. More particularly, the invention relates to a disc drive apparatus that supports a disc-like storage medium having tracks formed physically and in a manner constituting a wobble each on a signal surface of the disc medium.

Disc storage media include DVDs (Digital Versatile Discs or Digital Video Discs) which come in two types: DVD-ROMs for recording purposes only, and DVD-RAMs developed for use as a repeatedly recordable storage medium that has gained widespread acceptance. To write data to a DVD-RAM requires forming recording pits on the disc surface by use of the so-called phase change recording method.

A track format of the DVD-RAM includes recording tracks to and from which data are recorded and reproduced. The recording tracks are divided circumferentially into units called sectors comprising a recordable field each. The recordable field is headed by a header field that has data recorded in pit rows. The recordable field allows data to be recorded thereto repeatedly by the phase change recording method. That is, the header field and recordable field have data stored therein by different data recording methods involving different amounts of laser emission aimed at the disc surface. The tracks comprising recordable fields subject to recording by the phase change recording method are formed so as to constitute a meander shape called “wobble” each. Information derived from the wobble is used illustratively to permit clock recovery and to ensure address reliability.

Briefly, the header field has four addresses: PID1, PID2, PID3 and PID4 in pit rows each identifying a physical address (physical ID). The pit rows of PID1 and PID2 are dislocated by a ½ track pitch on the radially outer side from a center line of each groove track; the pit rows of PID3 and PID4 are dislodged by a ½ track pitch on the radially inner side from the center line. In other words, on each track, the header field and recordable field are radially dislodged by a ½ track pitch each. The DVD-RAM is typically subject to the so-called land/groove recording method whereby data are recorded both to lands and to grooves on the disc.

The above-described DVD-RAM and other recently developed and popularized disc media such as DVD+RW have track formats different from those of conventional CDs and DVD-ROMs. Under the circumstances, disc drive apparatuses that support DVD-RAMs and have recording functions are being called on to provide recording and reproducing performance of higher reliability through improvements addressing these new track formats.

SUMMARY OF THE INVENTION

In carrying out the invention and according to a first aspect thereof, there is provided a disc drive apparatus for recording and reproducing data to and from an optical disc-like storage medium which has tracks formed thereon each constituting a wobble with a frequency and which includes land and groove fields for storing the data in retrievable fashion, the disc drive apparatus including:

wobble signal generating means for generating a wobble signal representative of information about the wobble detected based on reflected light from the optical disc-like storage medium under a light beam emitted to a disc signal surface of the storage medium;

land/groove detecting means for determining by using the wobble signal, when the light beam fails to trace a specific track correctly on the storage medium, whether the emitted light beam is located on a land field or in a groove field, the land/groove detecting means further outputting a land/groove detection signal having a waveform inverted depending on whether the light beam is located on the land field or in the groove field;

moving direction determining means for determining a radial moving direction of the light beam over the disc signal surface based on a phase difference between the land/groove detection signal and a tracking error signal that represents how much the light beam deviates from the specific track on the disc signal surface; and controlling means for executing control so as to prevent the light beam from moving in the direction determined by the moving direction determining means.

The above structure takes advantage of the fact that the waveform of the wobble signal is inverted depending on the reflected light coming from a land or from a groove. The characteristic permits detection of the land or groove even if the emitted light beam forming a laser spot fails to trace the track correctly on the disc signal surface. Detection of the land or groove is made possible even when tracks are traversed (i.e., a track jump). In such cases, a land/groove detection signal is constituted by the signal whose waveform is inverted depending on the land or the groove being under the laser spot.

A signal derived from tracking is inverted in polarity depending on the emitted light beam (laser spot) moving from the radially inner zone to the outer zone of the disc or vice versa. With that signal in effect, the phase difference between the land/groove detection signal (in waveform) and the tracking error signal (in polarity) also varies depending on the moving direction of the laser spot. These characteristics make it possible to determine whether the laser spot is currently moving in the radially outer direction or in the opposite direction.

In the setup above, the output of a tracking drive signal may be enabled or disabled so as not to let an objective lens through which the light beam passes move in a direction corresponding to the moving direction of the laser spot thus determined.

The structure above thus provides illustratively the effect of braking the objective lens in a suitable direction when the laser spot jumps tracks to arrive at its destination.

According to a second aspect of the invention, there is provided a disc drive apparatus for recording and reproducing data to and from an optical disc-like storage medium which has tracks formed thereon each constituting a wobble with a frequency and which includes land and groove fields for storing the data in retrievable fashion, the disc drive apparatus including:

wobble signal generating means for generating a wobble signal representative of information about the wobble detected based on reflected light from the optical disc-like storage medium under a light beam emitted to a disc signal surface of the storage medium;

land/groove detecting means for determining by using the wobble signal, when the light beam fails to trace a specific track correctly on the storage medium, whether the emitted light beam is located on a land field or in a groove field, the land/groove detecting means further outputting a land/ groove detection signal having a waveform inverted depending on whether the light beam is located on the land field or in the groove field;

zero-cross detecting means for detecting a zero-cross event of a tracking error signal generated to represent how much the light beam deviates from the specific track on the disc signal surface;

drive signal generating means for generating, based on the tracking error signal, a tracking drive signal for causing an objective lens through which the light beam passes to move in a manner allowing the light beam correctly to trace the specific track on the disc signal surface; and setting means for either enabling or disabling output of the tracking drive signal depending on whether the land/groove detection signal indicates the land field or the groove field at a point in time at which the zero-cross event is detected by the zero-cross detecting means.

As with the preceding structure according to the first aspect of the invention, the structure according to the second aspect thereof permits detection of a land or a groove upon traverse over tracks. The tracking error signal (traverse signal) has a sinusoidal waveform which takes on level zero in the center of each track made of a land or a groove and which is at a positive or negative peak level on the boundary between a land and a groove. With this characteristic taken into account, the moving direction of the laser spot is determined depending on whether the land/groove detection signal indicates a land or a groove upon zero-cross timing of the tracking error signal.

The output of the tracking drive signal may be enabled or disabled depending on the correspondence between the zero-cross timing of the tracking error signal on the one hand, and the result of detection of the land or groove on the other hand. This, with the moving direction of the laser spot determined, prevents the light beam from moving in the determined direction of the laser spot.

According to a third aspect of the invention, there is provided a disc drive apparatus for recording and reproducing data to and from an optical disc-like storage medium having tracks formed thereon each constituting a wobble with a frequency, the disc drive apparatus including:

wobble signal generating means for generating a wobble signal representative of information about the wobble detected based on reflected light from the optical disc-like storage medium under a light beam emitted to the storage medium; and a phase-locked loop circuit for reproducing an oscillation frequency signal in synchronism with a period of the wobble upon input of a signal based on the wobble signal;

wherein the phase-locked loop circuit includes:

periodic error detecting means for detecting a periodic error of the predetermined input signal so as to output an error signal; and frequency controlling means for variably controlling the oscillation frequency signal based on the error signal that is input.

The structure according to the third aspect of the invention allows the PLL circuit to settle based on the periodic error of the wobble signal. Since the wobble signal is derived from a periodically constant wobble formation on the disc, the PLL circuit is prevented from settling on an erroneous frequency even if the laser spot is not located illustratively in the appropriate radial direction on the disc (e.g., within the zone); the PLL circuit is designed to settle in synchronism with the period of the wobble signal (i.e., with the period of the wobble formation).

According to a fourth aspect of the invention, there is provided a disc drive apparatus for recording and reproducing data to and from an optical disc-like storage medium having tracks formed thereon each constituting a wobble with a frequency, the disc drive apparatus including:

wobble signal generating means for generating a wobble signal representative of information about the wobble detected based on reflected light from the optical disc-like storage medium under a light beam emitted to the storage medium; and interpolating means for interpolating at least what is missing about the wobble signal, the interpolating means thereby acting as wobble protecting means subjecting the wobble signal to a protective process and outputting a protected wobble signal following the protective process.

According to a fifth aspect of the invention, there is provided a disc drive apparatus for recording and reproducing data to and from an optical disc-like storage medium having tracks formed thereon each constituting a wobble with a frequency, the disc drive apparatus including:

wobble signal generating means for generating a wobble signal representative of information about the wobble detected based on reflected light from the optical disc-like storage medium under a light beam emitted to the storage medium; and phase correcting means for correcting at least a phase difference of the wobble signal, the phase correcting means thereby acting as wobble protecting means subjecting the wobble signal to a protective process and outputting a protected wobble signal following the protective process.

According to a sixth aspect of the invention, there is provided a disc drive apparatus for recording and reproducing data to and from an optical disc-like storage medium having tracks formed thereon each constituting a wobble with a frequency, the disc drive apparatus including:

wobble signal generating means for generating a wobble signal representative of information about the wobble detected based on reflected light from the optical disc-like storage medium under a light beam emitted to the storage medium; and polarity correcting means for correcting at least the wobble signal, which is inverted in polarity depending on the reflected light coming either from a land field or from a groove field, in such a manner that the wobble signal has the same polarity regardless of the reflected light coming from the land field or from the groove field, the polarity correcting means thereby acting as wobble protecting means subjecting the wobble signal to a protective process and outputting a protected wobble signal following the protective process.

The structure according to the fourth, the fifth, or the sixth aspect of the invention includes the wobble protecting element for protecting the wobble signal derived from the wobble formation on the disc. The wobble protection involves performing at least one of three processes: interpolating what is missing in the wobble signal waveform, correcting the phase of the wobble signal, and correcting the polarity of the wobble signal so that the signal polarity remains independent of the land or groove being in effect.

Signals are derived from the wobble formation for use illustratively in clock recovery and reproduction control. Conventionally, the signals obtained from the wobble formation have tended to be unstable and erroneous due to such adverse effects as a format error, missing parts of a physically defective wobble formation, and a servo error.

When the protective process is carried out to generate the protected wobble signal as outlined above, it is possible to acquire a signal which can be used for reproduction control just like the conventional wobble signal and which is made more stable than the wobble signal.

In the specification that follows, the expression “wobble formation with a frequency” will refer to a formation that wobbles with a constant frequency (i.e., periodically) or to a wobbling formation whose frequency is varied within a specific range when particular information such as addresses associated with the formation is modulated by a predetermined modulation method such as frequency modulation (FM). In other words, the wobble formation with a frequency signifies a formation with characteristics indicative of a frequency signal.

Other objects, features and advantages of the invention will become more apparent upon a reading of the following description and appended drawings.

BRIEF DESCRIPTION OF THE DRAWINGS

These and other objects of the invention will be seen by reference to the description, taken in connection with the accompanying drawing, in which:

FIG. 7 is an explanatory view representing a data structure of a single sector with sizes of component fields in the track format of the DVD-RAM;

FIGS. 17A through 17I are timing charts indicative of an intra-sector location predicting operation (first example) by the inventive disc drive apparatus;

FIGS. 32A through 32D are timing charts and a schematic view indicating how a land/groove correction process takes place;

FIGS. 50A through 50E are other timing charts indicating how the braking circuit operates (upon arrival on land; moving from radially outer zone to radially inner zone).

DETAILED DESCRIPTION OF THE PREFERRED EMBODIMENTS

Figure 1:
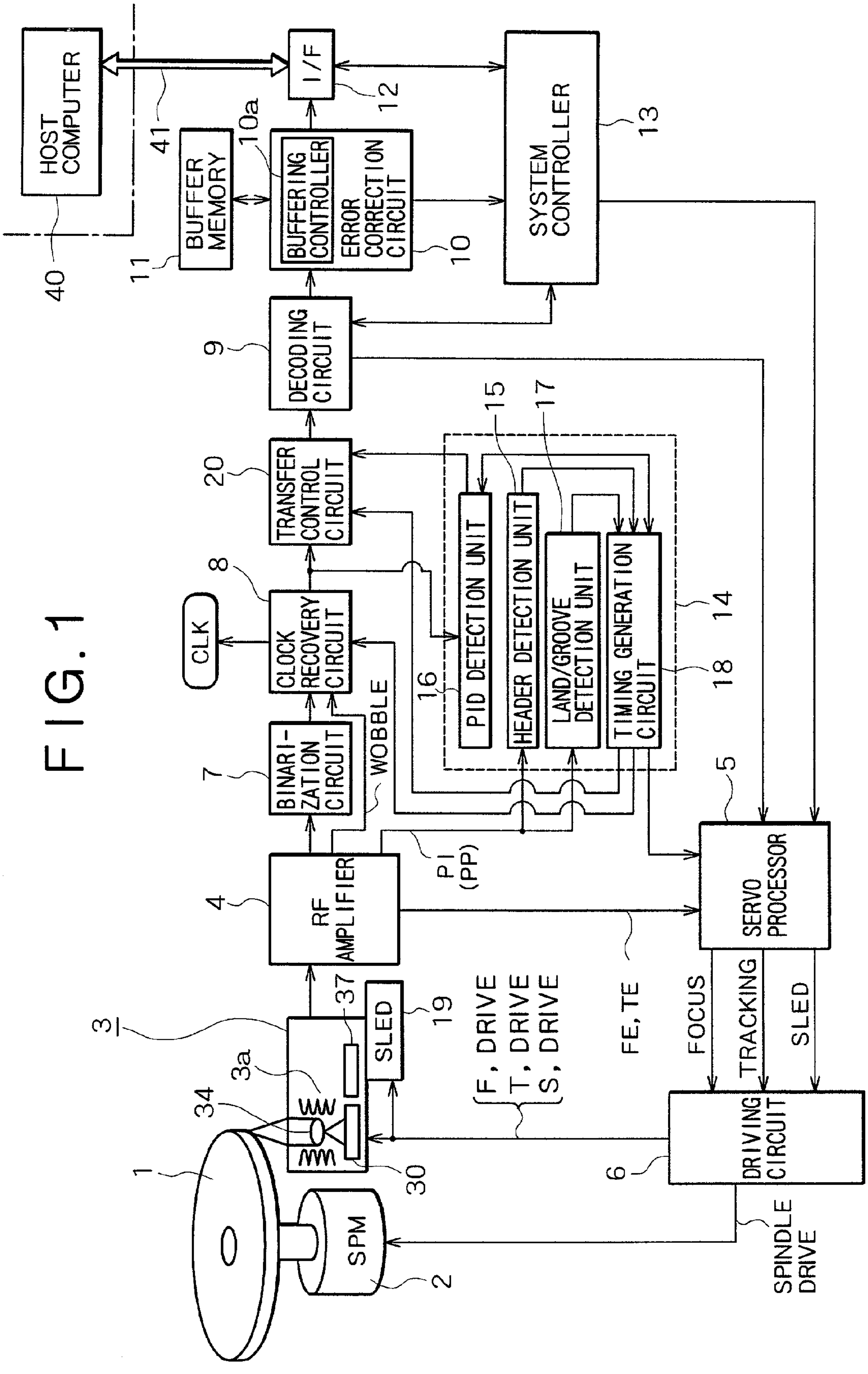
FIG. 1 is a block diagram showing a typical structure of a disc drive apparatus embodying the invention.

Preferred embodiments of this invention will now be described with reference to the accompanying drawings. The invention is embodied illustratively as a disc drive apparatus capable of reproducing data not only from the DVD-RAM but also from CD format discs such as DVD-ROM, CD-DA (Digital Audio) and CD-ROM. This embodiment of the invention also supports reproduction of data from other recordable DVD disc-like storage media such as DVD+RW and DVD-RW. The description that follows will be made under the following headings:

1. Track format of DVD-RAM
2. Structure of the disc drive apparatus
3. Intra-sector location prediction
   3-1. Control based on predicted intra-sector locations
   3-2. Intra-sector location predicting operation
4. PLL circuit
5. Spindle control
6. Wobble protection circuit
7. Land/groove detection
8. Detection of the laser spot moving direction
9. Track jump control

1. Track Format of DVD-RAM

Outlined below with reference to FIGS. 4 through 9 is a typical track format of the DVD-RAM from which data are reproduced by the disc drive apparatus embodying the invention.

Figure 4:
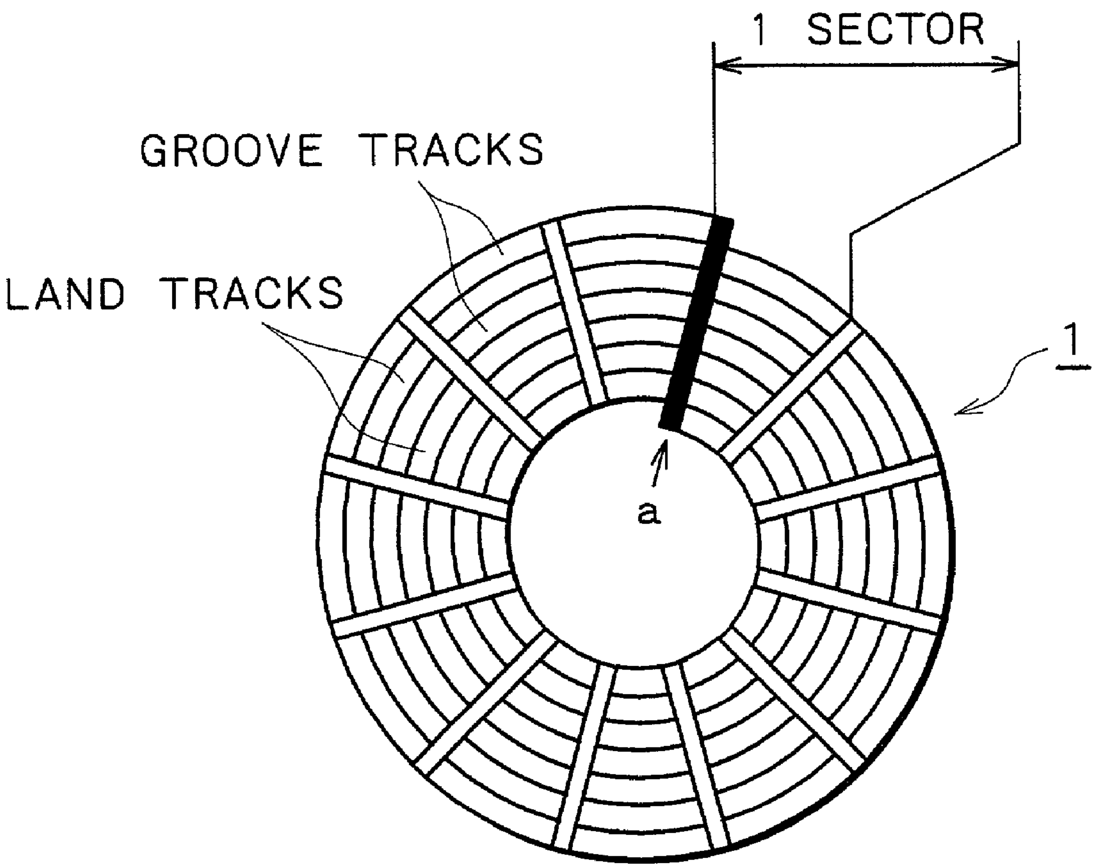
FIG. 4 is an explanatory view of a track format covering a DVD-RAM (disc) as a whole.

The DVD-RAM is a recordable disc medium that applies to the so-called phase change recording method. At present, the DVD-RAM has a storage capacity of 4.7 GB (unformatted) on one side. FIG. 4 gives a conceptual view of the track format covering a DVD-RAM as a whole. In FIG. 4, the DVD-RAM indicated as a disc 1 has recording tracks formed in single spiral fashion. Each recording track contains grooves (depressions) in such a manner that every two contiguous grooves form a land (projection) therebetween. On the DVD-RAM, grooves and lands constitute recording tracks subject to data recording implemented by what is known as the land/groove recording method. Adoption of this recording method is one reason why the DVD-RAM offers such high recording density.

Land and groove tracks are connected to one another alternately to form a single track in spiral fashion from the radially innermost region to the outermost region. That is, when viewed along a radially straight line such as one indicated by arrow "a" in FIG. 4, the land and groove tracks occur by turns.

Figure 5:
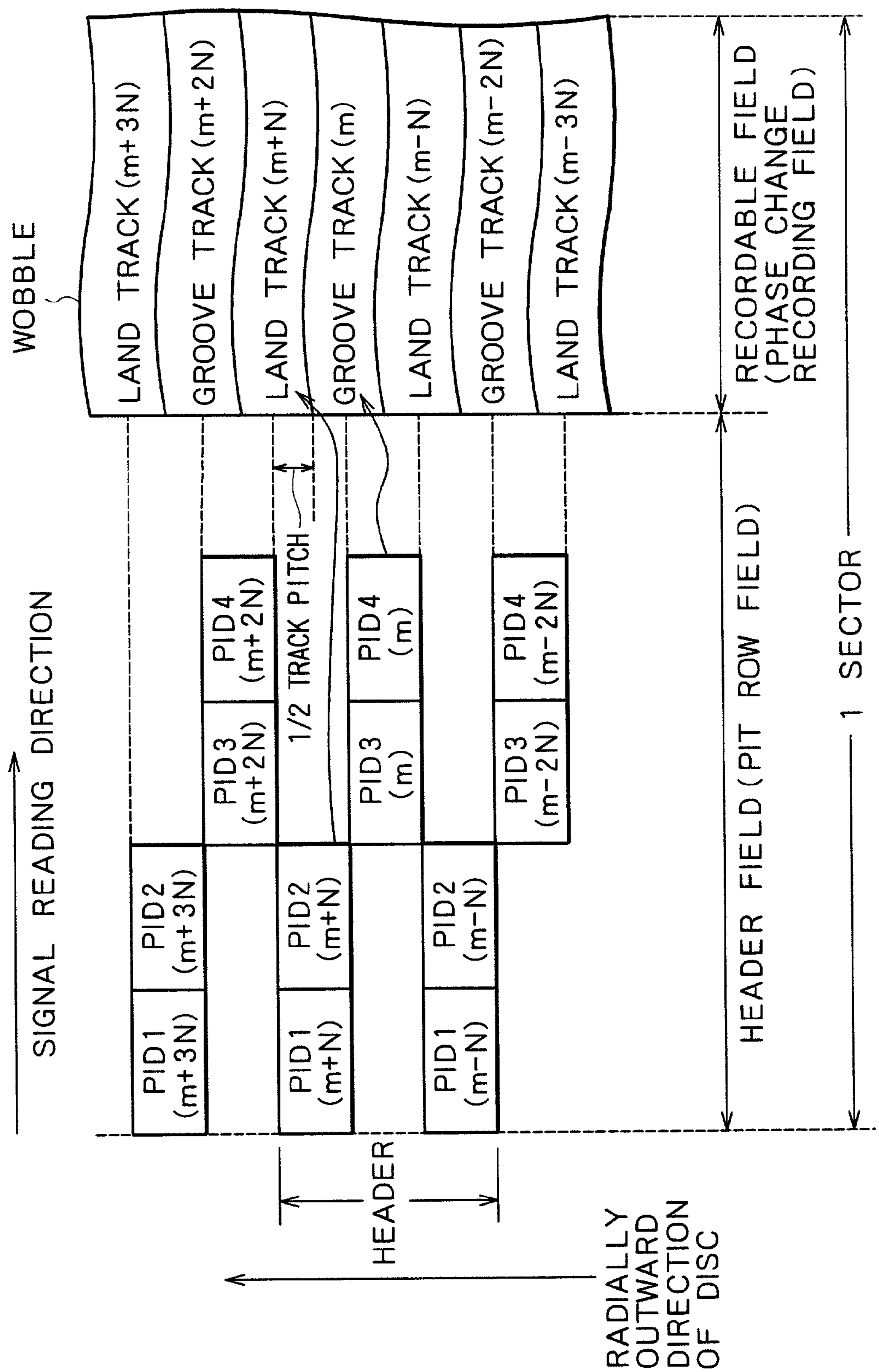
FIG. 5 is an explanatory view depicting a conceptual track arrangement of a single sector in the track format of the DVD-RAM.

The recording tracks made up of land and groove tracks are divided into a plurality of sectors in the circumferential direction, as shown in FIG. 4. What is shown here is the track format of a single zone. Zones are divisions formed in the radial direction of the disc. The number of sectors per track differs from one zone to another. The number of sectors per track in each zone becomes greater the farther the zone away from the disc center. FIG. 5 depicts a typical sector-wise physical structure on the disc.

As shown in FIG. 5, each sector is headed by a header field followed by a recordable field. In the header field, as illustrated, PIDs (physical IDs) each denoting a physical address on the disc are recorded using pit rows. The recordable field is a field where data may be repeatedly recorded by the phase change recording method and where land and groove tracks are arranged alternately in the radial direction of the disc, as illustrated. In each sector, the land and groove tracks constitute a meander shape commonly known as a wobble having a cycle of 186 PLCK (channel clock frequency). A clock signal is recorded by use of the wobble.

In the header field, one header is constituted by PID1, PID2, PID3 and PID4. PID1 and PID2 have a common content while PID3 and PID4 store another common content. The pit rows of regions accommodating PID1 and PID2 are dislocated by a ½ track pitch on the radially outer side from the center line of the groove track; the pit rows of PID3 and PID4 following those of PID1 and PID2 are dislodged by a ½ track pitch on the radially inner side from the center line.

The PIDs (i.e., addresses) above are laid out in what is known as a CAPA (Complementary Allocated Pit Address) arrangement. In each sector, each groove track shares its address with the contiguous land track; the shared address is used for the groove to be traced or for the land to be operated on. This kind of address arrangement requires only half the header length of earlier setups in which land and groove tracks are each assigned an address. The resulting savings in redundancy translate into increased storage capacity.

In FIG. 5, take for example the header composed of PID1 (m+N), PID2 (m+N), PID3 (m) and PID4 (m). PID1 (m+N) and PID2 (m+N) are dislocated by a ½ track pitch on the radially outer side from the center line of the groove track; PID3 (m) and PID4 (m) are dislodged by a ½ track pitch on the radially inner side from the center line. Here, reference character N represents the number of sectors per track.

PID1 (m+N) and PID2 (m+N) denote the address of the land track (m+N) contiguous to the groove track (m) in the radially outer direction in the sector; PID3 (m) and PID4 (m) represent the address of the groove track (m) in the sector.

Figure 6:
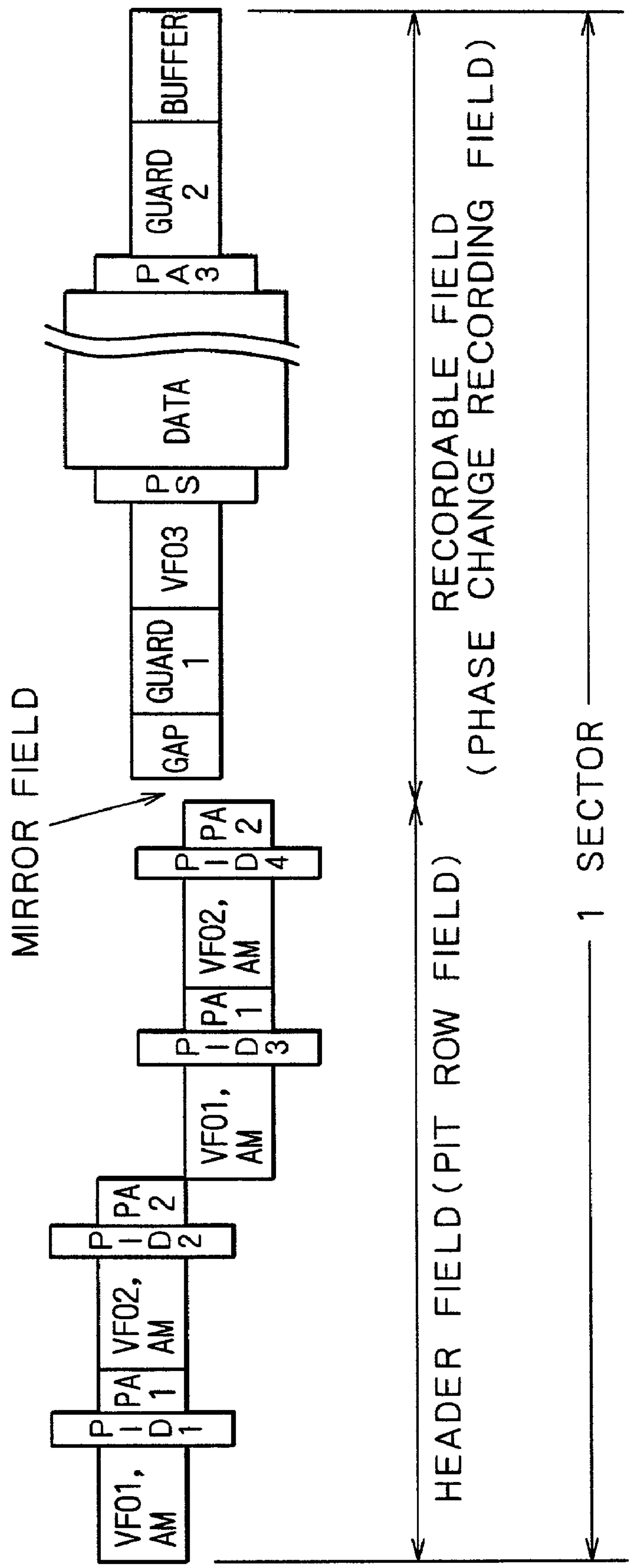
FIG. 6 is an explanatory view giving a conceptual data structure of a single sector in the track format of the DVD-RAM.

FIGS. 6 and 7 sketch a typical data arrangement structure in a single sector. Each sector comprises a 128-byte header field and a recordable field that has data recorded thereto. A mirror field of two bytes (32 channel bits) is furnished between the header field and the recordable field.

As shown in FIGS. 6 and 7, the header field contains four PIDs (PID1, PID2, PID3, PID4). In particular, the regions accommodating PID1, PID2, PID3 and PID4 are also defined as header fields 1, 2, 3 and 4 respectively as depicted in FIG. 7.

The header field 1 is headed by a 36-byte VFO1 (Variable Frequency Oscillator 1) followed by a three-byte AM (Address Mark), a four-byte PID1, a two-byte IED1 (ID Error Detection Code 1) and a one-byte PA1 (postamble 1), in that order within the field. The header field 2 is head by an eight-byte VFO2 followed by an AM (Address Mark), PID2, IED2 and PA2, in that order inside the field. The header field 3 is headed by VFO1, AM, PID3, IED3 and PA1, in that order within the field. The header field 4 is headed by VFO2, AM, PID4, IED4 and PA2, in that order inside the field.

VFO1 and VFO2 are provided to let a PLL (Phase-Locked Loop) circuit of the disc drive apparatus, to be described later, carry out a settling operation for clock recovery. The 36-byte VFO1 is 576 channel bits long, and the eight-byte VFO2 is 128 channel bits long. Each AM is used to provide the apparatus with byte synchronization with the ensuing PID and has a predetermined 48-channel bit pattern. PA1 serves as a boundary region at which IED1 and IED3 terminate, and PA2 acts as a boundary region at which IED2 and IED4 terminate. IED1, IED2, IED3 and IED4 each have a code recorded therein for use in error checks on the respectively preceding PID1, PID2, PID3 and PID4.

The recordable field is headed by a gap field followed by a guard 1 field and a VFO3 field, in that order within the field. The gap field has a size of 160 channel bits (10 bytes)+J(0 to 15) channel bits. The guard 1 field has a size of 20+K(0 to 7) bytes. The gap field and guard 1 field are furnished to protect a data field physically, to be described later. The VFO3 field has a size of 35 bytes or 560 channel bits and is used for clock recovery corresponding to the recordable field in question.

The VFO3 field is followed by a PS (Pre-Synchronous code) field that has a predetermined pattern of 48 channel bits (36 bytes). The PS field is used to ensure byte synchronization with a data field that follows. The data field is 2,418 bytes longs and has user data recorded thereto. The data field is followed by a PA3 field (one byte long).

The PA3 field is followed by a guard 2 field that has a size of 55–K(0 to 7) bytes. The guard 2 field is followed by a buffer field having a size of 400 channel bits (25 bytes)–J channel bits. The buffer field is provided illustratively to absorb those variations in the actual length of recorded data which may occur as a result of detracking or record speed fluctuations during a record operation.

Figures 8A, 8B:
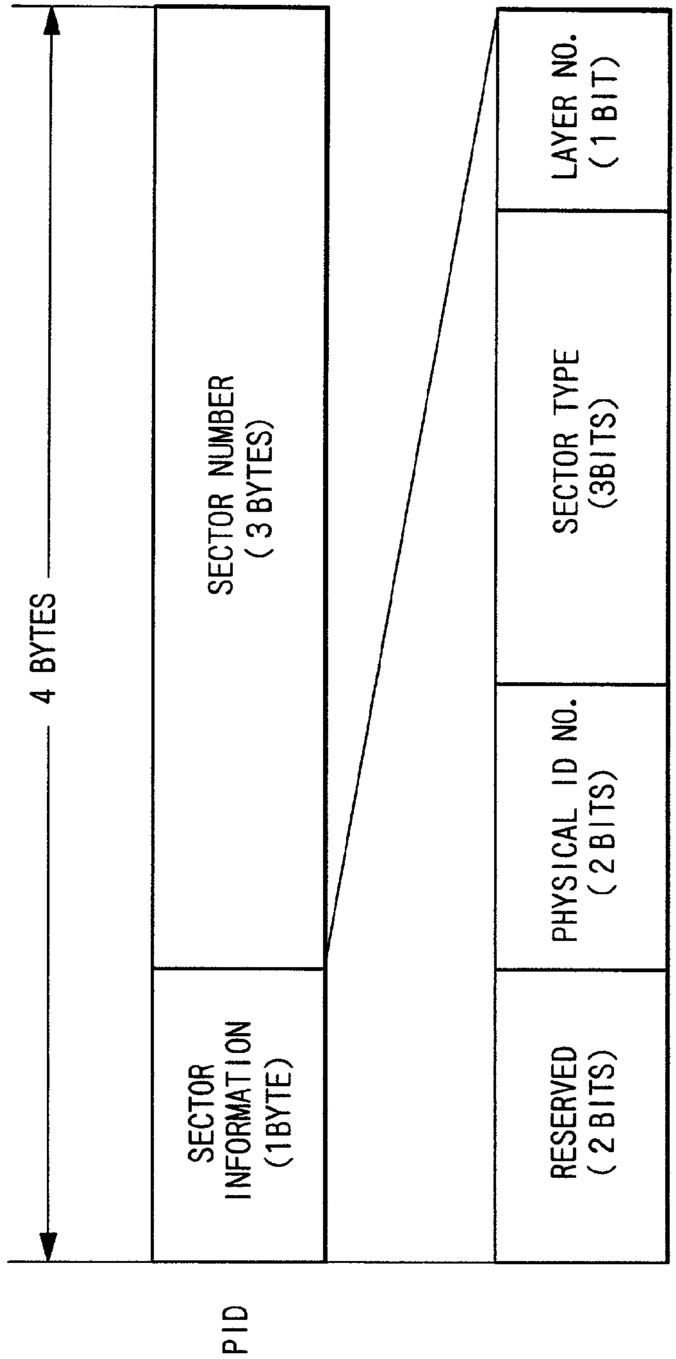
FIGS. 8A and 8B are explanatory views showing a typical structure of a PID.

FIGS. 8A and 8B show a typical structure of each of PID1, PID2, PID3 and PID4. In the description that follows, PID1, PID2, PID3 and PID4 will be referred to generically as the PID unless distinctions therebetween are specifically required.

The PID as a whole is made up of one-byte sector information followed by a three-byte sector number, as shown in FIG. 8A. The sector number accommodates an address. PID1 and PID2 each indicate the sector number of the ensuing land sector, while PID3 and PID4 each denote the sector number of the ensuing groove sector.

The sector information is structured as shown in FIG. 8B. The first two bytes are reserved. The two-bit reserved region is followed by a physical ID number (2 bites), a sector type (3 bites) and a layer number (1 bit), in that order.

Each physical ID number identifies one of PID1, PID2, PID3 and PID4. Illustratively, the physical ID numbers of 0(00b), 1(01b), 2(10b) and 3(11b) are defined to correspond with PID1, PID2, PID3 and PID4 respectively.

In the description that follows, the expression "PID number" will refer to any one of the values of PID1, PID2, PID3 and PID4. For example, if the physical ID number is 0(00b), then the ID number is 1(PID1). Likewise, if the physical ID number is 1(01b), then the ID number is 2(PID2); if the physical ID number is 2(10b), then the PID number is 3(PID3); if the physical ID number is 3(11b), then the PID number is 4(PID4).

The sector type indicates the location of the current sector within a single track. That is, depending on its value, the sector type specifies one of four sectors: a start sector of the track, an end sector of the track, a last-but-one sector of the track, or any other sector. The layer number indicates the layer to which the current sector belongs.

Figure 9:
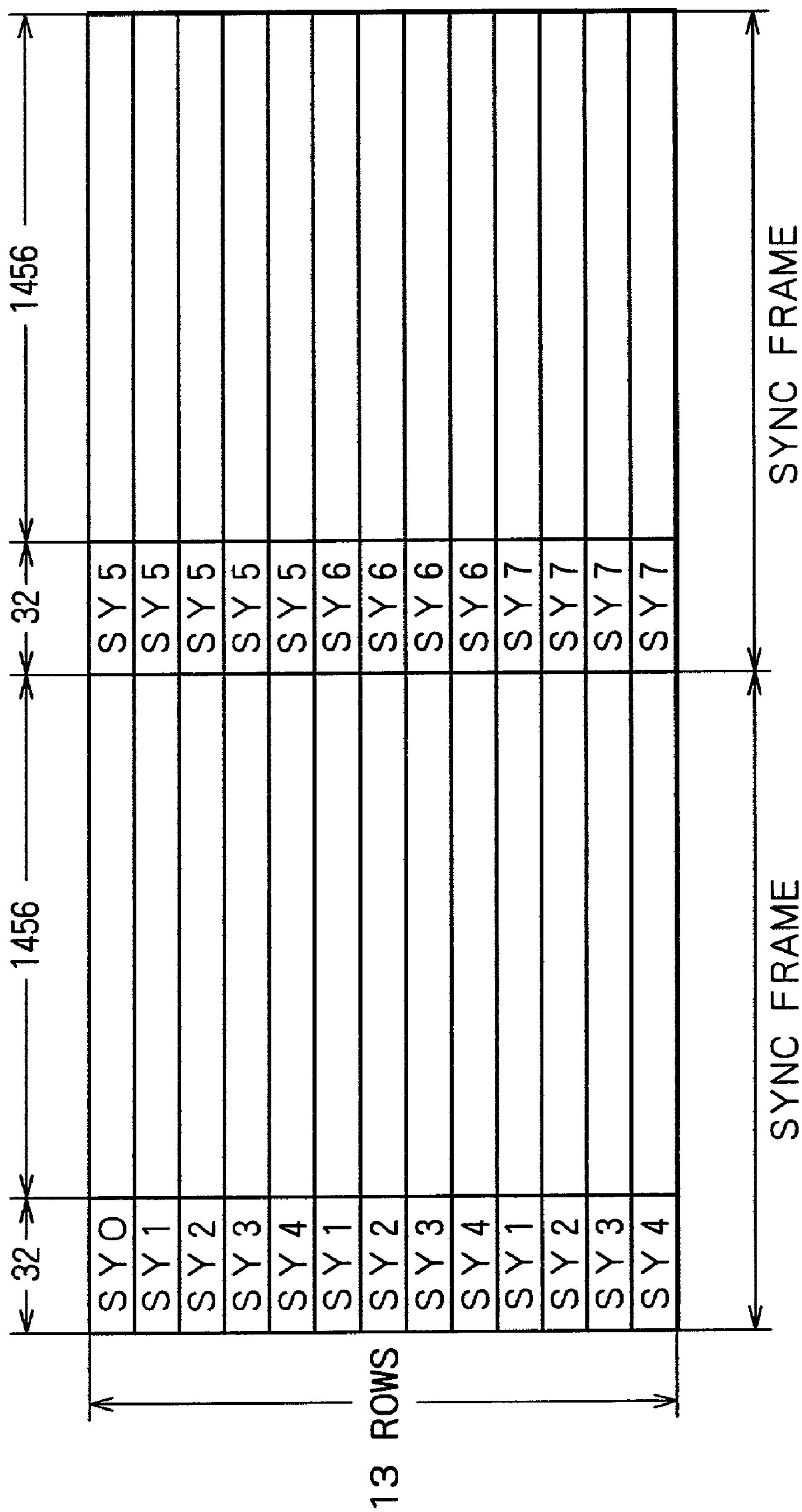
FIG. 9 is an explanatory view depicting a typical structure of data recorded in a data field of a single sector.

The data to be recorded to each data field in a given sector are composed of 26 frames (13 rows times 2), each frame accommodating 1,488 channel bits (=1456+32 bits) as shown in FIG. 9. Each frame is headed by a 32-channel bit frame sync region furnished with sync numbers of SY0 through SY7. Each sync number points to a specific location within the frame data.

As described, the PID contains diverse kinds of information including the address of the ensuing sector. These kinds of information are intended for data reproduction control. In other words, the PID constitutes reproduction control information, i.e., information to be utilized during data reproduction control processes.

2. Structure of the Disc Drive Apparatus

Described below with reference to the block diagram of FIG. 1 is a typical structure of the inventive disc drive apparatus capable of reproducing data from the DVD-RAM. This disc drive apparatus embodying the invention can reproduce data not only from the DVD-RAM but also from the DVD-ROMs. The use of the apparatus is not limited to DVDs alone; the apparatus also supports reproduction of data from the CD-DA (Digital Audio) and CD-ROM. For the moment, for purpose of simplification and illustration, the disc drive apparatus will be discussed in terms of its structural aspects addressing solely data reproduction from the DVD-RAM. In practice, data can be retrieved from diverse kinds of discs for reproduction by the apparatus when processing streams of reproduced signals are suitably switched and/or when reproduction parameters are changed appropriately inside functional circuits of the apparatus in accordance with each disc type in use, as will be described later.

In FIG. 1, an optical disc 1 refers to the DVD-RAM above. In operation, the optical disc 1 is placed on a turntable, not shown, and rotated controllably by a spindle motor 2.

The DVD-RAM complies with a rotation control scheme called ZCLV (Zoned Constant Linear velocity). As is well known, the disc format of ZCLV involves radially dividing the disc into a plurality of zones beforehand, in such a manner that the number of sectors per track in each zone is made greater the farther the zone away from the disc center. Within each zone, the rotating speed is subject to CAV (Constant Angular Velocity) for rotation control. To keep linear velocity substantially constant over the entire disc surface requires controlling the rotating speed so that the farther the zone away from the disc center, the lower the rotating speed.

An optical pickup 3 (It is to be noted that optical pickup 3 will be sometimes referred to "optical head 3.) includes a laser diode 30 that emits a laser beam onto a signal surface of the optical disc 1. A photo detector 37 in the pickup 3 detects reflected light from the signal surface under the laser beam, thereby reading data from the optical disc 1.

The optical pickup 3 also includes an objective lens 34. Acting as a laser beam output edge, the objective lens 34 is supported movably by a dual-axis mechanism 3*a* in the tracking and focusing direction. The dual-axis mechanism 3*a* comprises a focusing coil and a tracking coil. The focusing coil serves to move the objective lens 34 close to and away from the surface of the optical disc 1; the tracking coil moves the objective lens 34 radially over the optical disc 1. The optical pickup 3 as a whole is supported by a sled mechanism 19 in a radially movable manner over the optical disc 1.

The reflected light detected by the optical head 3 is translated into a current signal reflecting the amount of the reflected light detected. The current signal is fed to an RF amplifier 4. The RF amplifier 4 performs a current-to-voltage conversion process and a matrix computation process to generate a focusing error signal FE, a tracking error signal TE, an RF signal (reproduction information), a pull-in signal (PI; sum signal), and a push-pull signal (PP; difference signal).

The focusing error FE and tracking error TE generated by the RF amplifier 4 go to a servo processor 5 for phase compensation and gain adjustment before reaching a driving circuit 6. In turn, the driving circuit 6 outputs a focusing drive signal and a tracking drive signal to the focusing coil and tracking coil mentioned above. The tracking error signal TE sent to the server processor 5 is passed through a low-pass filter (LPF) which generates a sled error signal. The sled error signal is sent to the driving circuit 6 which in turn outputs a sled drive signal to the sled mechanism 19. These circuits implement focusing servo control, tracking servo control, and sled servo control.

The servo processor 5 under control of the system controller 13 supplies the driving circuit 6 with signals for focus search and track jump operations. In turn, the driving circuit 6 generates the focusing drive signal, tracking drive signal, and sled drive signal causing the optical head 3 to perform focus search and track jump/access operations.

The focus search operation involves detecting a so-called S-curve waveform of the focusing error signal FE while forcibly moving the objective lens 34 between the farthest and the closest points relative to the disc 1 for focus servo settling purposes. As is well known, the focusing error signal FE under observation manifests its S-curve waveform when the objective lens 34 is positioned within a narrow segment around its focal point relative to the recording layer of the disc 1. Turning on focus servo in a linear region of the S-curve implements focus serve settling. It is for the purpose of focus servo settling that focus search is carried out by feeding the focusing drive signal to the focusing coil so as to move the objective lens 34 suitably.

For track jump or access, the dual-axis mechanism 3*a* moves the objective lens 34 or the sled mechanism 19 moves the optical head 3 respectively in the radial direction of the disc. For these purposes, the tracking drive signal or sled drive signal is output to the tracking coil or to the sled mechanism 19.

A reproduced RF signal generated by the RF amplifier 4 is output to a binarization circuit 7 for binarization before being coded through eight-to-sixteen modulation into an EFM+ signal. The EFM+ signal is output to a clock recovery circuit 8. Given the EFM+ signal, by the PLL circuit or the like, the clock recovery circuit 8 extracts therefrom a recovered clock signal CLK in synchronism with the EFM+ signal and outputs the recovered clock signal. The recovered clock signal CLK is fed as an operation clock signal to various circuits including a decoding circuit 9 and the servo processor 5. Following the extraction of the clock signal, the EFM+ signal is input to a transfer control circuit 20.

The clock recovery circuit 8 of this disc drive apparatus admits a wobble signal that is obtained by detecting the wobble formation on the tracks of recordable fields. The clock recovery circuit 8 then generates a clock signal in synchronism with the input wobble signal and outputs the generated clock signal.

The transfer control circuit 20 performs timing control in extracting a necessary signal portion from the input EFM+ signal for transfer to the decoding circuit 9. The process is based on results detected by a PID detection unit 16, to be described later, as well as on intra-sector locations predicted by a timing generation unit 18.

The decoding circuit 9 subjects the input EFM+ signal to EFM-Plus demodulation (eight-to-fourteen demodulation plus; the reverse of eight-to-sixteen modulation) and outputs the result to an error correction circuit 10. The error correction circuit 10 utilizing a buffer memory 11 as a work area carries out an error correction process in compliance with the RS-PC scheme. A buffering controller 10*a* included in the error correction circuit 10 controls write and read operations to and from the buffer memory 11.

Binary data having undergone the error correction process (i.e., reproduced data) are transferred from the buffer memory 11 through a data interface 12 under read control of the buffering controller 10*a* in the error correction circuit 10. The data interface 12 is provided to interface with an external information processing apparatus such as a host computer 40 connected via an external data bus 41. When reproduced data are transferred as described above, the data are forwarded by the data interface 12 through the external data bus 41 to the host computer 40.

The data interface 12 also permits exchanges of commands between the disc drive apparatus and the host computer 40. In the disc drive apparatus, a system controller 13 processes such exchanges of commands.

Although FIG. 1 depicts a typical structure of the disc drive apparatus as it is connected to computer equipment, the setup is not limitative of the invention. Alternatively, the disc drive apparatus may also be connected to various audio-visual devices, game consoles, telephone sets, network devices, or any other devices capable of processing data reproduced from the disc.

The system controller 13 is constituted by a microcomputer for overall control purposes. By monitoring the current operation status or by receiving instructions from the host computer 40, the system controller 13 executes necessary control over data reproduction operations.

The inventive disc drive apparatus includes a RAM block 14 for use in data reproduction from the DVD-RAM as illustrated. The RAM block 14 is made up of a header detection unit 15, a PID detection unit 16, a land/groove detection unit 17, and a timing generation unit 18.

The header detection unit 15 is used to detect headers. More specifically, the header detection unit 15 detects the timing of header fields on the DVD-RAM as they are traced by the laser beam. Here, the header detection unit 15 need only detect two kinds of regions: a region where the headers 1 and 2 are arranged contiguous to each other with PID1 and PID2 included, and a region where the headers 3 and 4 are laid out contiguous to each other with PID3 and PID4 included. A typical header detection circuit that performs such detection processes in a more stable manner than before may be structured as disclosed by this applicant in Japanese Patent Application No. 2000-280144.

The PID detection unit 16 detects physical addresses recorded as PIDs in the header field (PID1, PID2, PID3, PID4). In operation, the PID unit 16 first detects an address mark (AM) and outputs a PID signal to the decoding circuit 9 based on the detection. The decoding circuit 9 decodes the input PID signal through its EFM+ demodulation process to obtain PID data. The PID data thus acquired allow illustratively the decoding circuit 9 and system controller 13 to recognize physical addresses in the recordable field following the header field.

As described above with reference to FIG. 4, lands and grooves alternate per track on the DVD-RAM. This requires executing suitable control processes during data reproduction such as finding out whether the current recordable field is a land or a groove in order to invert accordingly the polarity of the tracking error signal TE for use in tracking servo control. It is the land/groove detection unit 17 that determines whether the current recordable field is a land or a groove. In this case, the land/groove detection unit 17 inputs a push-pull signal (PP) generated illustratively by the RF amplifier 4.

Generally, land/groove detection is carried out as follows: upon detection of the header field in a given sector, the detection waveforms of the push-pull signal PP for the pit rows of PID 1 and PID 2 are inverted from those of the push-pull signal PP for the pit rows of PID 3 and PID 4 depending on the land track or groove track being traced in the sector. Whether the inversion occurs from positive to negative polarity or vice versa depends uniquely on whether the track following the header represents a land sector or a groove sector. Given the input push-pull signal PP, the land/groove detection unit 17 detects an inverted pattern of the waveform corresponding to the header field and generates accordingly a detection signal indicating either the land or the groove. The detection signal is input illustratively to the servo processor 5 which in turn inverts the polarity of the tracking error signal TE in a suitably timed manner.

Land/groove detection may also be implemented by use of the result of decoded PIDs or by resorting to the periodicity of disc revolutions.

Although not shown in FIG. 1, the inventive disc drive apparatus comprises a land/groove detection circuit 17A in addition to the land/groove detection circuit 17. The circuit 17A is designed to effect land/groove detection based on the wobble signal derived from the wobble, as will be described later. The land/groove detection circuit 17A is also designed to determine the land or the groove upon traverse over tracks in a track jump operation. This will also be described later in more detail.

The timing generation unit 18 predicts intra-sector data locations in what is called an intra-sector location prediction (detection) process by utilizing detection outputs from the header detection unit 15, PID detection unit 16, and land/groove detection unit 17. With the data locations within the sector predicted, necessary settings may be altered accordingly by relevant circuits.

For example, the servo processor 5 puts tracking servo control on hold during the period in which the header is being reproduced on the basis of the predicted intra-sector locations. More specifically, the servo processor 5 puts on hold the value of the tracking error signal TE in effect immediately before detection of the header field, in order to carry out closed-loop tracking servo control. This prevents the tracking process under servo control from following the track (address pit rows) of the header field that is shifted by a ½ track pitch relative to the recordable field track. The land track or groove track to be traced following the header in question can then be traced correctly.

Figure 2:
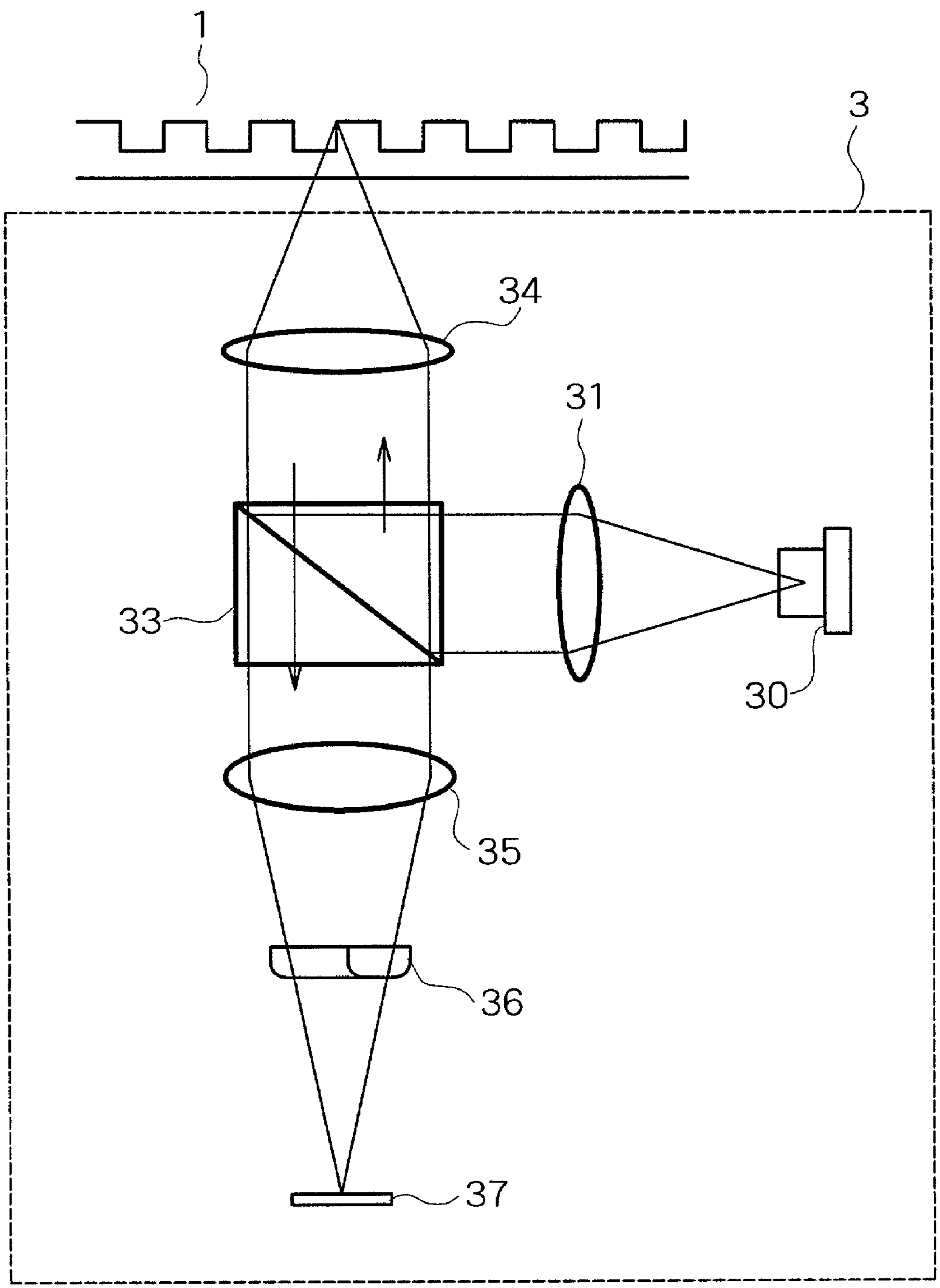
FIG. 2 is a conceptual view indicating a typical structure of an optical system in the inventive disc drive apparatus.

A typical optical system structure addressing data reproduction from the DVD-RAM will now be described. FIG. 2 shows a typical structure of the optical system in the optical pickup 3. In this optical system, a laser beam emitted by the laser diode 30 is turned into parallel rays by a collimator lens 31 before entering a beam splitter 33. The incident light to the beam splitter 33 is reflected by 90 degrees in the direction of the optical disc 1 and passed through the objective lens 34. The light is thus emitted to the optical disc 1 in focused fashion. Reflected light from the optical disc 1 enters the beam splitter 33 past the objective lens 34 before reaching a condenser lens 35. The light condensed by the condenser lens 35 enters the photo detector 37 through a cylindrical lens 36.

Illustratively, the laser diode 30 may have a center wavelength of 650 nm and the objective lens 34 may have a numerical aperture (NA) of 0.6, on the assumption that they are for use in DVD-standard HD layer reproduction.

Figure 3:
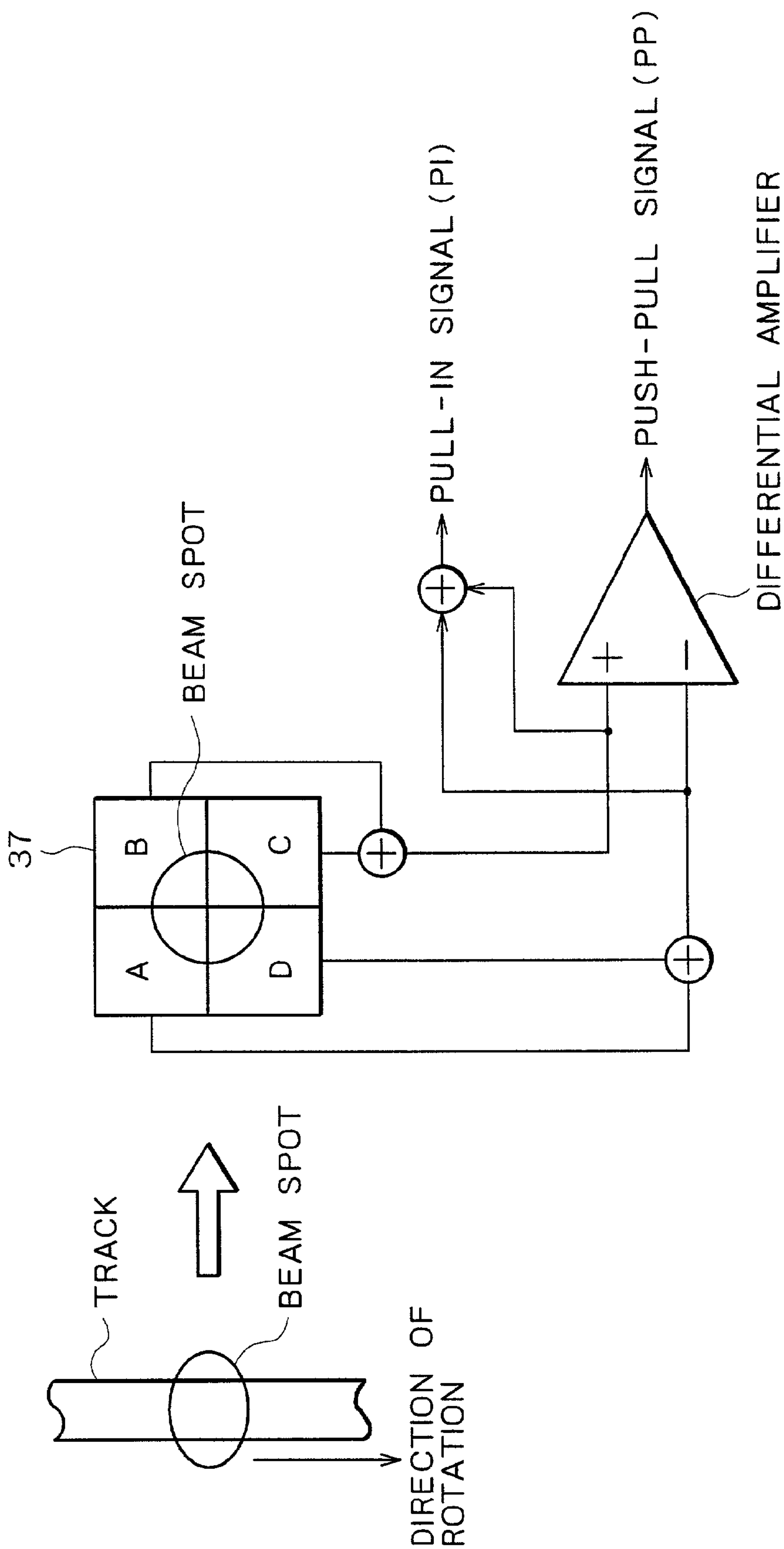
FIG. 3 is an explanatory view of how a photo detector is structured and how a signal is generated thereby in the inventive disc drive apparatus.

FIG. 3 outlines a typical structure of the photo detector 37. As shown in FIG. 3, the photo detector 37 comprises at least a four-division detector made up of detection units A, B, C and D. The four detection units A, B, C and D are laid out and positioned relative to a recording track (in the left-hand side sketch) as illustrated. In the description that follows, detection signals obtained by the detection units A through D will be referred to as detection signals A through D respectively.

The inventive disc drive apparatus utilizes the pull-in signal PI for header detection, as will be described later. The pull-in signal PI may be generated by illustratively through computations of PI=(A+B+C+D) based on the detection signals A, B, C and D from the detection units A, B, C and D as shown in an equivalent circuit in FIG. 3.

The DVD-RAM is subject to what is known as the push-pull scheme for tracking servo control. This scheme utilizes the push-pull signal PP generated through computations of PP=(A+D)−(B+C) by a differential amplifier using the detection signals A, B, C and D from the detection units A, B, C and D, as shown in another equivalent circuit in FIG. 3. Alternatively, the DPP (differential push-pull) scheme may be adopted in place of the push-pull scheme. It should be noted that the DVD-ROM is subject to the phase difference scheme for the same purpose.

The push-pull signal PP is also used to detect the wobble formation. For example, suppose that two edges of the laser spot tracing the groove track overhang onto the contiguous land tracks. In that case, the reflected light of the laser beam appears brighter coming the groove and darker from the lands. When the main laser spot is bisected in the advancing direction of the track, either side appears fluctuating in brightness in keeping with the wobble formation. That is, the wobble is detected using the push-pull signal PP that is calculated by obtaining a difference in brightness between the two regions of the four-division detector bisected in the track advancing direction. In this specification, the push-pull signal PP is referred to as the wobble signal "wob" when dealt with as a wobble detection signal.

The focusing error signal FE may be generated illustratively through computations of FE=(A+C)−(B+D) using the detection signals A, B, C and D, although no equivalent circuit for this case is shown in FIG. 3. In practice, the computations for generating the signals above are carried out by the RF amplifier 4.

3. Intra-Sector Location Prediction 3-1. Control Based on Predicted Intra-Sector Locations In the disc drive apparatus of this invention, the timing generation unit 18 (FIG. 1) predicts (i.e., detects) intra-sector data locations during data reproduction from the DVD-RAM. Various reproduction control processes are carried out on the basis of the predicted data locations in the sector.

Figures 10A, 10B, 10C, 10D, 10E, 10F, 10G:
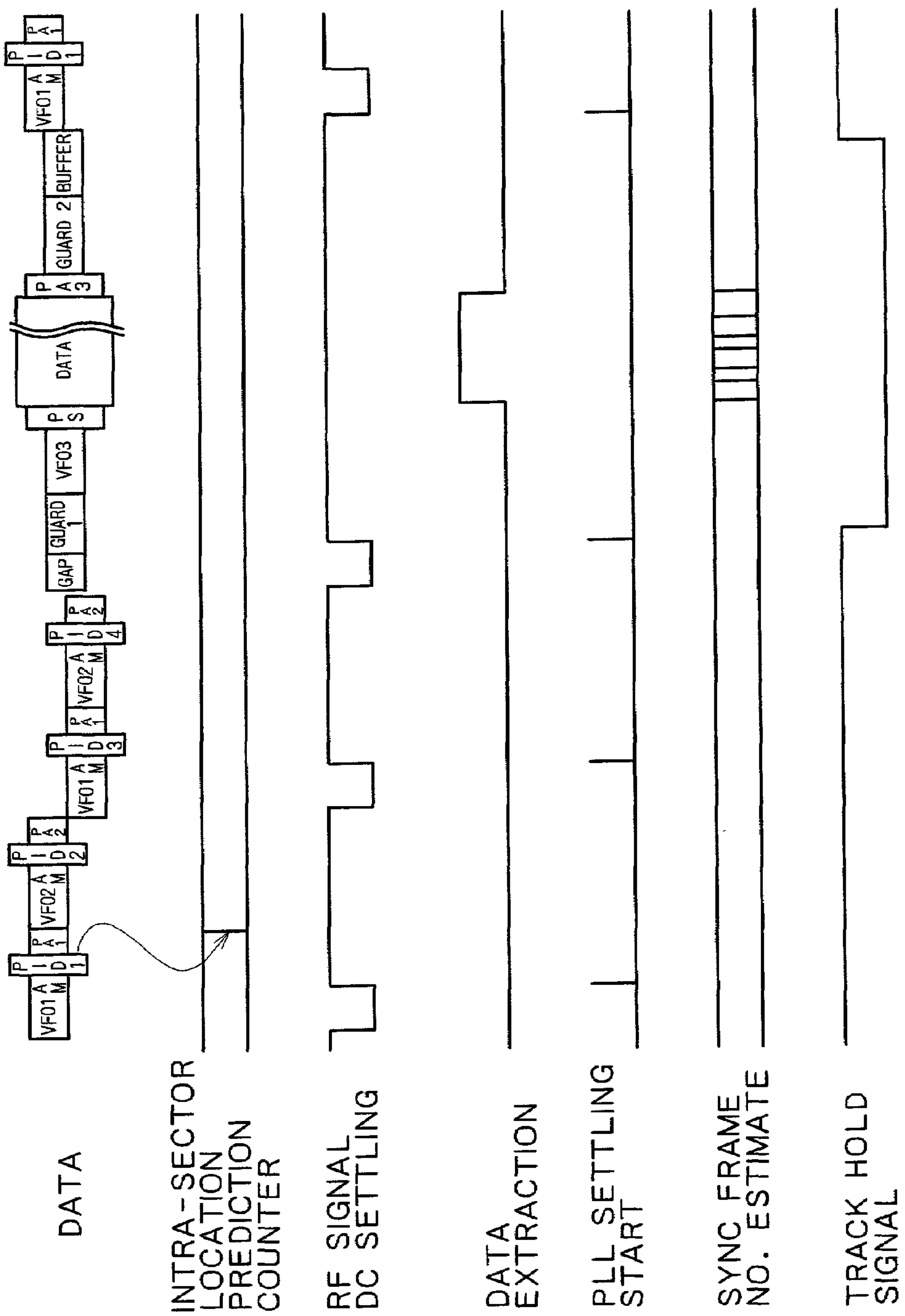
FIGS. 10A through 10G are timing charts indicative of typical control timings based on intra-sector locations predicted by the inventive disc drive apparatus.

The timing charts in FIGS. 10A through 10G indicate typical control timings based on the intra-sector locations thus predicted. FIG. 10A shows data in a single sector as they appear on a time series basis after retrieval from the disc. FIG. 10B depicts the load timing (count start timing) of an intra-sector location prediction counter included in the timing generation unit 18, to be described later. This prediction counter is cleared illustratively sector by sector and starts counting from an initial value specific to each of PID1, PID2, PID3 and PID4 in the header field every time a PID is detected. The value on the counter is incremented by 1 at predetermined intervals. That is, the intra-sector location prediction counter counts time so as to ensure synchronization on a sector-by-sector basis. FIG. 10B shows the timing in effect when the prediction counter starts counting from the initial value specific to PID1 whose position has been detected.

As the counting by the counter proceeds, the count value (measured time) is used illustratively as a basis for providing the timing of a track hold signal as depicted in FIG. 10G. As described earlier, tracking servo needs to be put on hold while the header field is being passed during DVD-RAM data reproduction. The track hold signal was generated conventionally on the basis of headers being detected. With this embodiment, by contrast, the predicted intra-sector locations are referenced so that the track hold signal is timed more accurately when generated. In FIG. 10G, the hold state is brought about when the track hold signal is driven High and canceled when the track hold signal is brought Low.

Figure 11:
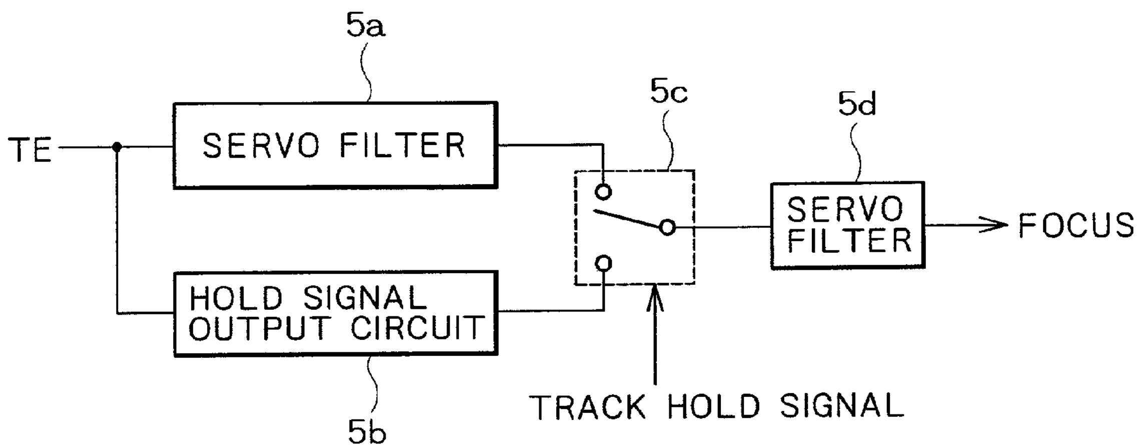
FIG. 11 is a block diagram of a typical setup for tracking servo control hold based on the predicted intra-sector locations.

The block diagram of FIG. 11 gives a conceptual view of a tracking servo signal processing system included in the servo processor 5. As illustrated in FIG. 11, the tracking error signal TE is divided into two branches before being fed to a servo filter 5*a* and a hold signal output circuit 5*b*. The output from the servo filter 5*a* or from the hold signal output circuit 5*b* is selected alternately by a switch 5*c* for output through a servo filter 5*d* as a focusing drive signal.

When the track hold signal is Low, the switch 5*c* selects the output from the servo filter 5*a*. This permits execution of tracking servo control in response to the fluctuations in the tracking error signal TE. That is, the hold state is canceled.

By contrast, when the track hold signal is High, the switch 5*c* selects the output from the hold signal output circuit 5*b*. In this case, the tracking error signal TE is either kept at its immediately preceding value or is set for a value from integration based on a predetermined time constant; the signal TE is output unchanged to the servo filter 5*d*.

The operation above is carried out in a suitably timed manner as shown in FIGS. 10A and 10G. While the recordable field is being traced, tracking servo control is effected so that the laser spot follows the track; while the header field is being traced, tracking servo is put on hold so that the immediately preceding state in which the land or groove track was traced is kept unchanged.

Figure 16A:
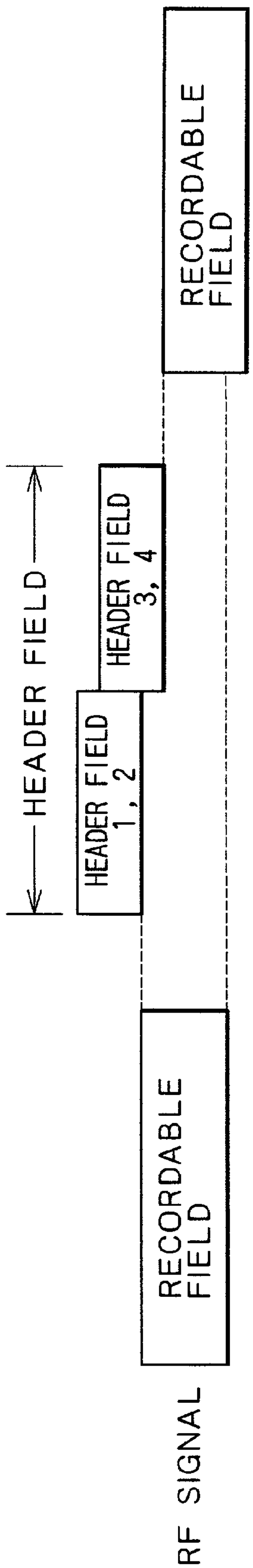
FIGS. 16A and 16B are explanatory views showing conceptually how an RF signal DC settling operation takes place.
Figure 16B:
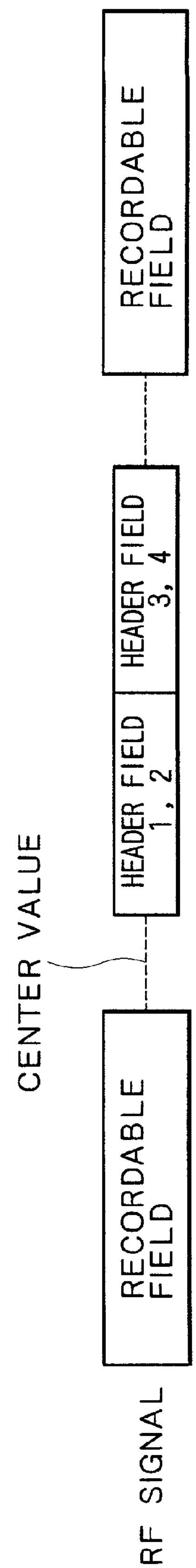

The value on the intra-sector location prediction counter upon prediction of intra-sector locations is also used as a basis for DC value settling regarding the RF signal. More specifically, the signal retrieved from the disc is first input as the RF signal to the RF amplifier 4. A DC component (DC value) superposed on the RF signal appears different between the header field and the recordable field, as shown in FIG. 16A. Within the header field, the region constituting the header fields 1 and 2 further differs in terms of DC value from the region composed of the header fields 3 and 4. To let the RF amplifier 4 properly execute its signal processing thus requires removing the DC component so that the center value of the RF signal becomes equal between the header field (header fields 1, 2/header fields 3, 4) and the recordable field as shown in FIG. 16B. In other words, DC settling is needed regarding the RF signal.

Figure 12:
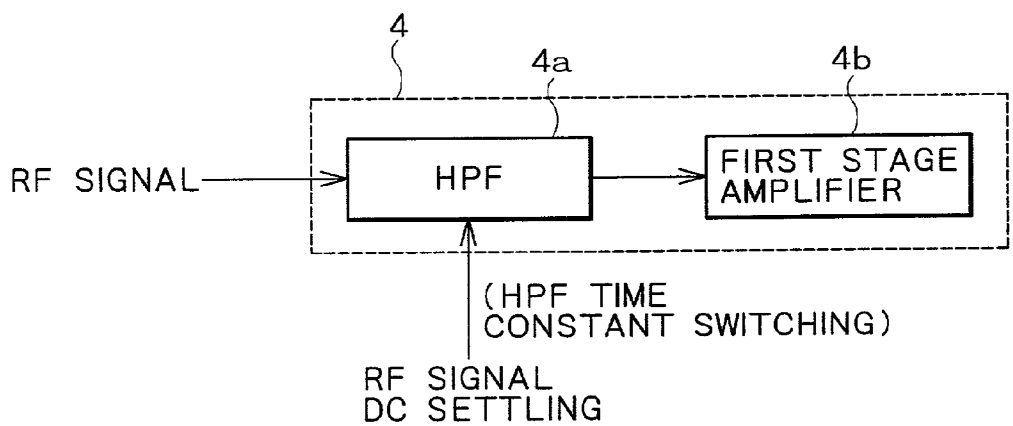
FIG. 12 is a block diagram of a typical setup for RF signal CD settling based on the predicted intra-sector locations.

The RF amplifier 4 mentioned above eliminates the DC component by subjecting the RF signal first to a high-pass filter (HPF) 4*a* for filtration and then to a first-stage amplifier 4*b* for amplification, as depicted in FIG. 12. The RF signal DC settling operation is performed on the HPF 4*a* in a suitably timed manner as shown in FIG. 10C. Specifically, the time constant of the HPF 4*a* is switched so that DC settling is carried out appropriately relative to those data locations in FIG. 10A which correspond to High-level segments in FIG. 10C. The settling process is executed illustratively in the suitably timed manner shown in FIG. 10C. All this makes it possible to read PID1, PID2, PID3 and PID4 from the header field and to retrieve user data from the data field within the recordable field more reliably than before.

Given the input binary RF signal, the transfer control circuit 20 (FIG. 1) is required to extract only the data from the recordable field and output what is extracted to the decoding circuit 9. The extraction of the data is timed as shown in FIG. 10D on the basis of the count value on the intra-sector location prediction counter.

Figure 13:
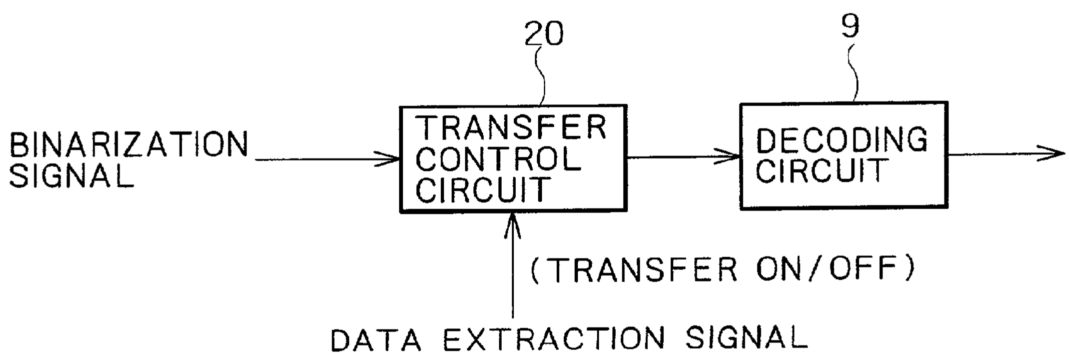
FIG. 13 is a block diagram of a typical setup for data transfer control based on the predicted intra-sector locations.

FIG. 13 outlines the transfer control circuit 20 and the decoding circuit 9 located downstream of the circuit 20. When the data extraction timing is Low in FIG. 10D, data transfer by the transfer control circuit 20 in FIG. 13 is turned off; when the data extraction timing is High, the data transfer is turned on. Only the data signal alone is extracted correctly by the transfer control circuit 20 for output to the decoding circuit 9 as long as the data extraction timing in FIG. 10D is properly obtained on the basis of the count value on the intra-sector location prediction counter.

The clock recovery circuit 8 operates a PLL circuit using VFO1 and VFO2 over the header field and VFO3 over the recordable field so as to recover the channel clock signal CLK synchronized with the binary RF signal. During the process, the settling of such a PLL circuit is timed as shown in FIG. 10E on the basis of the count value on the intra-sector location prediction counter. Following the timing shown in FIG. 10E, a PLL circuit 8*a* in the clock recovery circuit 8 is instructed to start its PLL settling operation as sketched in FIG. 14.

The PLL circuit in its operation may be timed not only as shown in FIG. 10E but also through the use of a header hold signal for putting on hold the PLL circuit operation and wobble protection operation, as will be described later.

The count value on the intra-sector location prediction counter may be used as a basis for predicting locations in the data field in units of sync frames that are numbered illustratively in ascending order. As shown in FIG. 10F, the current location in the data field is defined by a specific sync frame as it is numbered from the beginning of the field. In this specification, the sync frame number attributed in such a manner to a particular sync frame as it occurs in the data field is called a sync frame number estimate. On the basis of that sync frame number estimate, the buffering controller 10*a* in the error correction circuit 10 may transfer data illustratively to the buffer memory 11 in units of sync frames.

3-2. Intra-Sector Location Predicting Operation

With the inventive disc drive apparatus, the control processes shown in FIGS. 10A through 10G are timed by the timing generation unit 18 in the RAM block 14 using illustratively detection outputs from the PID detection unit 16, header detection unit 15, and land/groove detection unit 17 as needed. More specifically, the timing generation unit 18 operates the intra-sector location prediction counter (simply called the counter hereunder) in an appropriately timed manner based on the data locations retrieved as signals from the disc. The count value (measured time) on the counter is used to predict data locations in a given sector. Various timing signals are generated in accordance with the data locations thus predicted. The intra-sector location predicting operation above is implemented by the inventive disc drive apparatus illustratively as described below.

The timing charts in FIGS. 17A through 17I depict how an intra-sector location predicting operation may typically take place. Suppose now that signals are retrieved from the disc as shown in FIG. 17A. In such a case, the PID detection unit 16 detects AMs in properly timed relation as shown in FIG. 17B. Every time an AM is detected, the region of a predetermined size following the detected AM is regarded as the region where a PID and an IED occur contiguously. EFM+ demodulation is then carried out for error detection of the PID based on the IED.

As shown in FIG. 17C, every time the PID-IED contiguous region is read out, an IED judgment end (error detection process end) flag is set; if the result of the error detection process is not good, then an IED judgment result NG flag is set. Referencing the physical ID number (in 2 bits) within each PID based on the above timing permits detection of a PID number (i.e., PID1, PID2, PID3 or PID4). Depending on the PID number thus detected, any one of a PID1 detection flag, a PID2 detection flag, a PID3 detection flag and a PID4 detection flag is set as shown in FIG. 17E. Each detected PID number is identified as indicated in FIG. 17D.

If the result of the IED judgment is good, then the PID number in question is judged correct; if the result of IED judgment is not good, the reliability of that PID number is considered low. For example, as depicted in FIGS. 17D and 17E, the moment that PID4 is detected, an IED judgment result NG flag is set; the PID number at that point is detected erroneously as "1" instead of the correct "3."

The timing generation unit 18 of this disc drive apparatus references basically the PID detection flags shown in FIG. 17E upon loading the location of the detected PID (1, 2, 3, 4) to the counter. That is, the counter starts counting when loaded with the initial value determined uniquely for each PID (1, 2, 3, 4).

In view of the possibility of reduced reliability resulting from erroneous PID detection, the inventive disc drive apparatus generates what may be called protection windows in keeping with the PID detection timings, such as PID (1, 2, 3, 4) detection windows indicated in FIG. 17F. The generation of these windows also utilizes the predicted intra-sector locations based on the count value of the counter, in an arrangement to be described later.

PID1, PID2, PID3 and PID4 are located as shown in FIG. 17G only if PID (1, 2, 3, 4) detection flags are set as shown in FIG. 17E within the PID (1, 2, 3, 4) detection windows. As evident from FIGS. 17E and 17F, the PID1 detection flag is set upon detection of the first PID1. Because the PID1 detection flag is set during a period in which the PID1 detection window remains open at the High level, a PID1 location load flag is set at the same time as the PID1 detection flag as illustrated in FIG. 17G. The counter starts counting when loaded with the initial value corresponding to PID1 the moment the PID1 location load flag is set, as depicted in FIG. 17H.

As in the case of the detection of PID1, the detection of PID2 and PID3 leads to PID2 and PID3 detection flags being set (FIG. 17E) during periods in which the PID2 and PID3 detection windows remain open (FIG. 17F). PID2 and PID3 location load flags are thus set at the same time as the PID2 and PID3 detection flags respectively, as illustrated in FIG. 17G. However, since the counter once loaded with its initial value starts counting even before the PID2 and PID3 location load flags are set, these load flags are ignored.

When the counter has started counting as shown in FIG. 17H, the count value is incremented at predetermined intervals. The count value is the same as that shown in FIG. 10A. That is, the count value is treated as the measured time synchronized with the sector timing. The timings indicated in FIGS. 17C, 10D, 10E, 10F and 10G become effective when the count value (measured time) on the intra-sector prediction counter reaches predetermined values.

In FIG. 17I, a track hold signal is shown representing the timing brought into effect on the basis of the predicted intra-sector locations. As mentioned earlier, the track hold signal puts tracking servo control on hold when driven High; when brought Low, the track hold signal allows servo control to proceed normally in keeping with the tracking error signal TE.

When to drive the track hold signal High is determined by a track hold set signal and a track hold reset signal shown in FIG. 17I. The track hold set signal is raised at a point in time when the header field of the next sector is judged to begin based on the intra-sector locations predicted by the counter. At that point, the track hold signal is driven High from its Low level. The moment the predicted intra-sector location indicates transition into the recordable field past the header field, the track hold reset signal is raised. Correspondingly, the track hold signal is brought back Low.

The operations shown in FIGS. 17A through 17I are implemented by the intra-sector location prediction counter in the timing generation unit 18. A typical structure of the intra-sector location prediction counter is described below with reference to FIGS. 18, 19 and 20.

Figure 18:
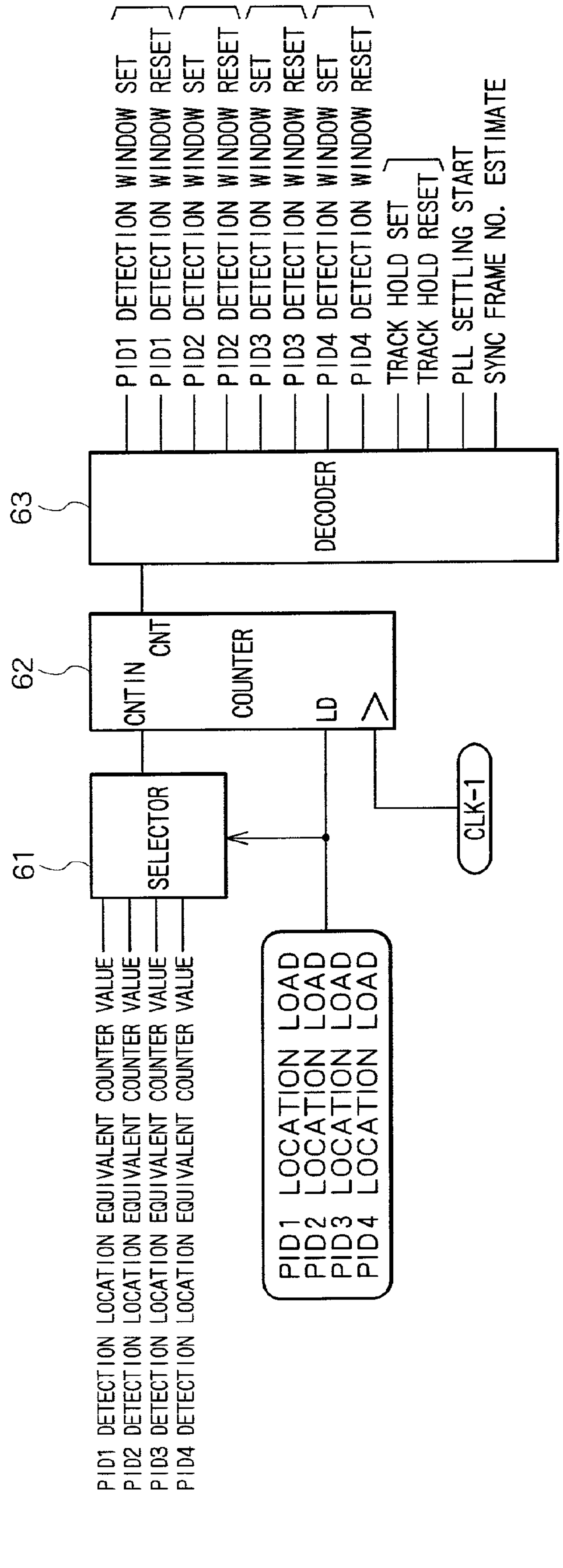
FIG. 18 is a block diagram outlining a typical structure of an intra-sector location prediction counter that supports the intra-sector location predicting operation.

The block diagram of FIG. 18 shows a selector 61, a counter 62, and a decoder 63. The selector 61 admits initial count values corresponding to the predetermined locations of PID1, PID2, PID3 and PID4, i.e., a PID1 detection location equivalent counter value, a PID2 detection location equivalent counter value, a PID3 detection location equivalent counter value, and a PID4 detection location equivalent counter value. The selector 61 selects one of the four counter values for output to a count input of the counter 62.

A load terminal of the counter 62 receives four flags: a PID1 location load flag, a PID2 location load flag, a PID3 location load flag, and a PID4 location load flag. A clock input of the counter 62 admits a clock signal CLK-1 generated in accordance with the wobble cycle. The counter 62 increments its value at constant intervals in keeping with the frequency of the clock signal CLK-1.

Suppose that one of the PID (1, 2, 3, 4) location load flags is first set within a given sector. In that case, the selector 61 selects the PID location detection equivalent counter value corresponding to that PID location load flag and outputs the selected value to the count input of the counter 62. At the same time, the PID location load flag is input to the load terminal of the counter 62. This causes the counter 62 to start incrementing its value from the count value that has been input to its count input terminal. For example, if the PID1 location load flag is set corresponding to PID1, then the counter 62 starts counting from the initial value furnished by the PID1 location detection equivalent counter value. That is, the PID1 location detection equivalent counter value represents the time corresponding to the location of PID1 within the sector. Starting from that point corresponding to PID1, the counter 62 starts measuring time in synchronism with the sector. The measured time constitutes the count value that is output to the decoder 63.

The decoder 63 generates timing signals when the input counter value (measured time) reaches predetermined values. In such cases, as shown in FIG. 18, the decoder 63 outputs a PID1 detection window set/reset signal, a PID2 detection window set/reset signal, a PID3 detection window set/reset signal, and a PID4 detection window reset/reset signal. The decoder 63 also outputs a track hold set/reset signal (FIG. 17I), a PLL settling start signal (FIG. 14), and a sync frame number estimate (FIG. 10F).

Figure 19:
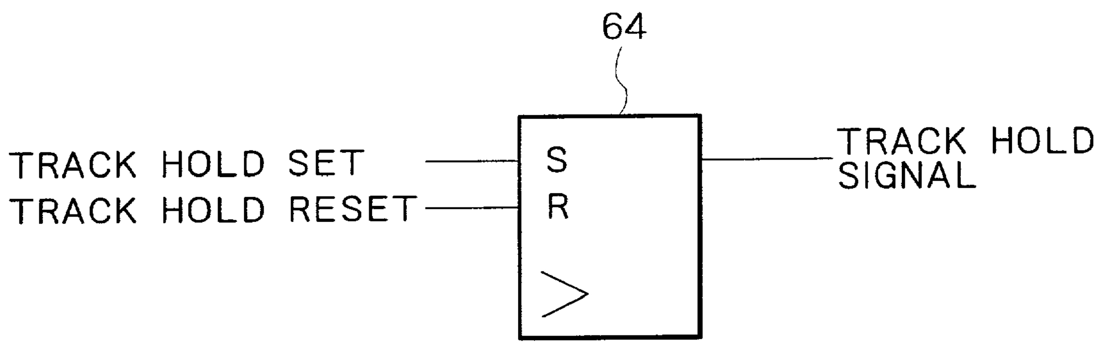
FIG. 19 is a block diagram of a typical setup for generating a track hold signal based on signals obtained by the intra-sector location prediction counter of FIG. 18.

Illustratively, the track hold operation shown in FIG. 17I may be implemented by a flip-flop circuit 64 depicted in FIG. 19. A set terminal and a reset terminal of the flip-flop circuit 64 receive a track hold set signal and a track hold reset signal respectively. In turn, the circuit 64 outputs the track hold signal whose timing is illustrated in FIG. 17I.

Figure 20:
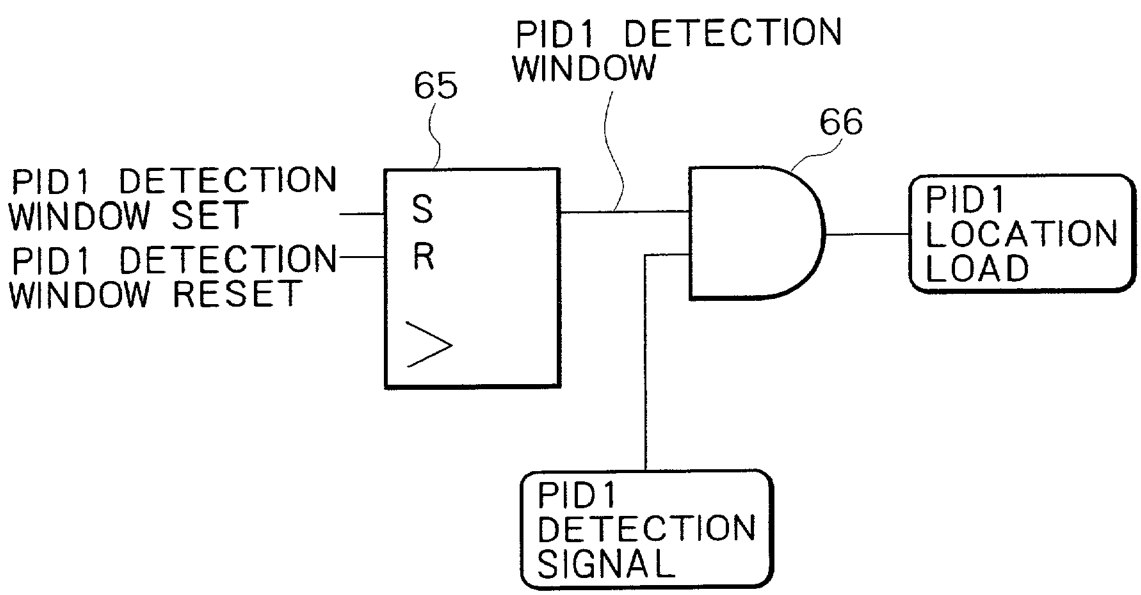
FIG. 20 is a block diagram of a typical setup for generating a PID location load signal for use by the intra-sector location prediction counter of FIG. 18.

The PID location load flag input to the counter 62 in FIG. 18 is generated by a circuit arrangement, shown in FIG. 20, regarding the PID1 location load flag for example. In FIG. 20, a set terminal and a reset terminal of a flip-flop 65 admit a PID1 detection window set signal and a PID1 detection window reset signal respectively. In turn, the flip-flop 65 outputs the PID1 detection window whose timing is shown in FIG. 17F.

The PID1 detection window is input to an AND gate 66 which also receives a PID1 detection signal (FIG. 17E). When the two input signal are both driven High, the AND gate 66 outputs a High-level signal constituting the PID1 location load flag (FIG. 17G).

The circuit arrangement for outputting the other PID (2, 3, 4) location flags is similar to what is shown in FIG. 20. In the case of the PID2 location load flag, for example, the flip-flop 65 may admit a PID detection window set/reset signal corresponding to PID 2 and may feed a PID2 detection signal to the AND gate 66.

As described above, the PID (1, 2, 3, 4) detection windows are generated based on the value of the intra-sector location prediction counter, i.e., on the count value obtained in accordance with the PID location load flags shown in FIG. 18. Thus generated, the detection windows serve effectively as protection windows that comply constantly with the appropriate timings of PID1, PID2, PID3 and PID4.

With the above PID (1, 2, 3, 4) detection windows in use, the detection of multiple PID numbers as erroneously identical values still leaves each of the detected PID numbers to be used as a signal indicative of a different PID. Because the window is generated corresponding to each PID detection signal, the counter can be loaded with an appropriate value even if the result of the IED-based error detection is not good.

4. PLL Circuit

Figure 21:
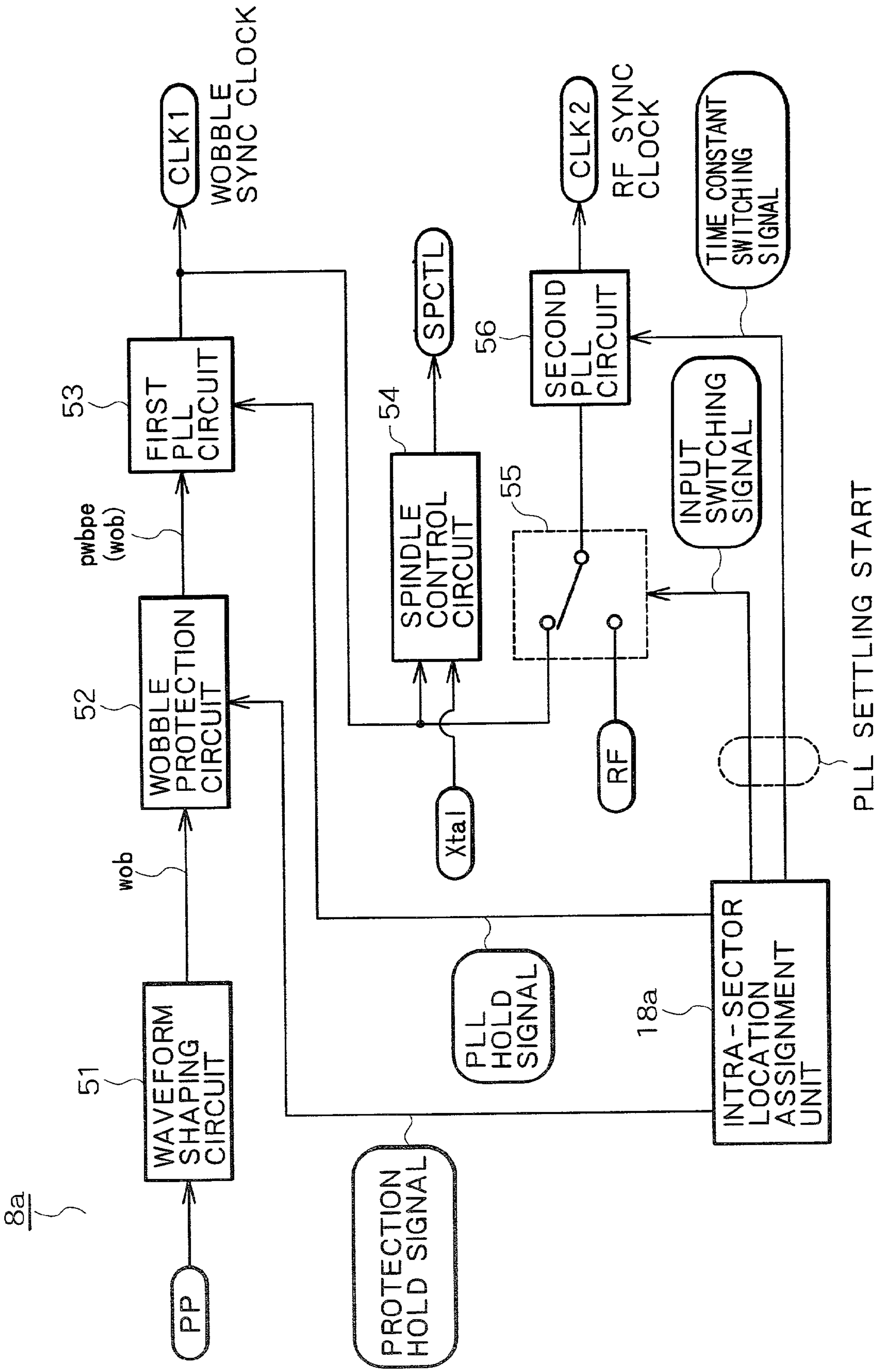
FIG. 21 is a block diagram showing a typical internal structure of a PLL circuit in the inventive disc drive apparatus.

What follows is a description of a PLL circuit arrangement specific to the inventive disc drive apparatus. FIG. 21 shows a typical structure of a PLL circuit 8*a* included in the clock recovery circuit 8.

As illustrated, the PLL circuit 8*a* is made up of a first PLL circuit 53 and a second PLL circuit 56. The disc drive apparatus of this invention is designed to reproduce data not only from the DVD-RAM but also from the DVD-ROM and CD format discs. The two PLL circuits are provided to deal with these diverse disc formats. The description that follows, however, will focus primarily on the structure addressing DVD-RAM data reproduction and touch on DVD-ROM and CD data reproduction only where necessary.

As shown in FIG. 21, the PLL circuit 8*a* admits as its input signal a push-pull signal PP coming from the RF amplifier 4. The push-pull signal PP is vulnerable to harmful effects such as scratches or detracking on the disc. These effects are removed illustratively by a waveform shaping circuit 51 using a band-pass filter. The push-pull signal PP in this case contains a signal component detected from the wobble formed by tracks on the disc. Submitting the push-pull signal PP to the waveform shaping circuit 51 for waveform shaping and binarization generates the wobble signal "wob," i.e., a signal derived from binarizing the wobble signal component. The wobble formed by the tracks on the DVD-RAM has a cycle of 186 PLCK (channel clock frequency). For that reason, the wobble signal "wob" output by the waveform shaping circuit 51 also has the cycle of 186 PLCK.

The wobble signal "wob" thus acquired is input to a wobble protection circuit 52. From the input wobble signal "wob," the wobble protection circuit 52 removes noise components that may be included in the signal illustratively as a result of phase fluctuations. As described earlier with reference to FIG. 5, the wobble is formed only by the tracks having recordable fields, not by the tracks having header fields in pits. While each header field is being traced, the wobble signal "wob" is missing. Such missing portions of the wobble signal in its waveform are interpolated by the wobble protection circuit 52.

The wobble protection circuit 52 carries out protective operations as described so that the wobble signal "wob" will have a constantly stabilized waveform. Input of the wobble signal thus protected helps stabilize the operation of downstream PLL circuit segments. In this manner, a stable clock recovery operation is performed regardless of wobble signal disturbances caused by various external factors.

Conventionally, by contrast, PLL circuits for DVD-RAM data reproduction admitted unprotected wobble signals. As described above, the wobble signal is interrupted by header fields and is vulnerable to servo-induced phase fluctuations where the DVD-RAM format is in effect. Consequently, conventional setups are liable to suffer from unstable clock recovery operations. How the wobble protection circuit 52 works typically and how it is structured will be described later in more detail.

The wobble signal "wob" protected by the wobble protection circuit 52 is output as a protected wobble output signal "pwbpe." The protected wobble output signal is output in one of two ways depending on synchronization status: either as a signal having undergone protective processing, or as a signal without undergoing the processing.

The first PLL circuit 53 recovers and outputs a wobble sync clock signal CLK1 in synchronism with the protected wobble output signal "pwbpe" that has been input. Because of its synchronization with the wobble formed on the disc, the wobble sync clock signal CLK1 is in synchronism with the disc revolutions. Since the wobble sync clock signal CLK1 is used as a drive clock signal for intra-sector location prediction, the frequency of the clock signal CLK1 is set to be higher than that of the wobble signal. That is, the wobble sync clock CLK1 is synchronized with the protected wobble signal "pwbpe" and is given a frequency that is a multiple of the wobble signal frequency. A typical internal structure of the first PLL circuit 53 will be described later.

As shown in FIG. 21, the wobble sync clock CLK1 is input to a spindle control circuit 54 as well as to the second PLL circuit 56 past a switch 55. During DVD-RAM data reproduction, the spindle control circuit 54 generates and outputs a rotation control signal SPCTL for controlling the rotating speed of the disc in accordance with the ZLCV scheme. The rotation control signal SPCTL is generated by use of two signals: the input wobble sync clock signal CLK1, and a high-precision reference frequency signal Xtal obtained illustratively on the basis of an oscillation signal from a crystal oscillator. The spindle motor 2 is driven by use of a spindle drive signal generated in accordance with the rotation control signal SPCTL. A typical internal structure of the spindle control circuit 54 in the inventive disc drive apparatus will be described later.

The second PLL circuit 56 admits the binary RF signal from the binarization circuit 7 so as to reproduce an RF sync clock signal CLK2 in synchronism with the RF signal. The RF sync clock signal CLK2 is used in data retrieval.

The switch 55 is provided specifically to select either the wobble sync clock signal CLK1 or the binary RF signal for input to the second PLL circuit 56. When data (PID, user data, etc.) are being read, the switch 55 is operated so as to let the binary RF signal enter the second PLL circuit 56. At other times, the switch 55 is operated to input the wobble sync clock signal CLK1 to the second PLL circuit 56.

More specifically, the binary RF signal is input to the second PLL circuit 56 over that portion of each header field or over that part of each recordable field in which the RF signal is available. Over all other portions of each header field or over all other parts of each recordable where the RF signal is not available, the wobble sync clock signal CLK1 is input to the second PLL circuit 56.

In the above setup, during each period where no data are read, the wobble sync clock signal CLK1 is input to keep the oscillation frequency of the second PLL circuit 56 at an appropriate value. Whenever data are read out, the phase lock operation need only be carried out to provide the suitable RF sync clock signal CLK2. This in turn ensures a highly reliable data read operation.

There already exist PLL circuits that have only one PLL circuit arrangement each for clock recovery during DVD-RAM data reproduction. This type of PLL circuit is operated by a number of techniques. One typical technique involves synchronizing the PLL circuit with the wobble signal when the RF signal is not available, and causing the PLL circuit to synchronize with the RF signal when the wobble signal is not available.

The conventional setup above has some disadvantages. For example, if the frequency wildly fluctuates during synchronization with the RF signal, it can take time for the frequency to settle. It may also become impossible to obtain in steady fashion a clock signal in synchronism with the revolutions of the spindle motor 2.

Such potential deficiencies are circumvented by the inventive PLL circuit setup comprising the first PLL circuit 53 and the second PLL circuit 56. The first PLL circuit 53 constantly provides a clock signal synchronized with the wobble, while the second PLL circuit 56 is fed selectively with either the wobble sync clock signal CLK1 or the RF signal so as to generate the RF sync clock signal CLK2. Consequently the PLL circuit arrangement as a whole provides the clock signal CLK2 that remains stable at all times independently of, say, RF signal disturbances.

The PLL circuit arrangement of the inventive disc drive apparatus is further subject to control procedures based on the intra-sector location predicting operation described above. This ensures more reliable performance than ever before.

Figure 14:
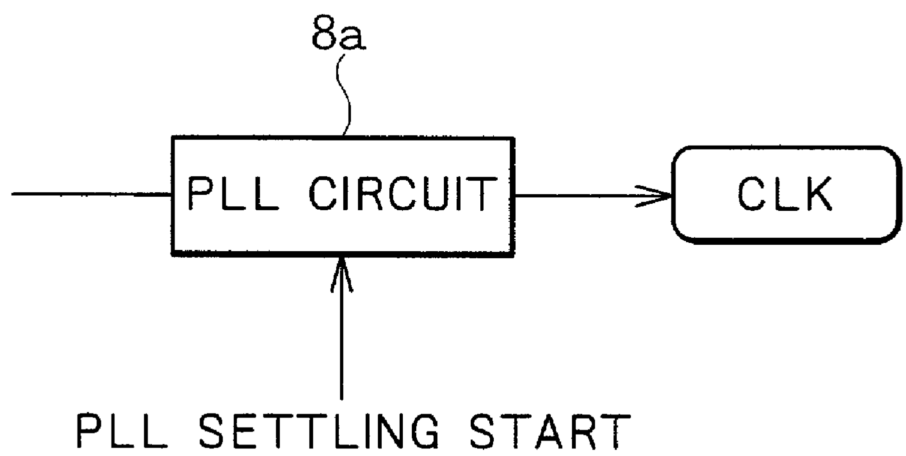
FIG. 14 is a block diagram of a typical setup for implementing PLL circuit settling control based on the predicted intra-sector locations.
Figure 15:
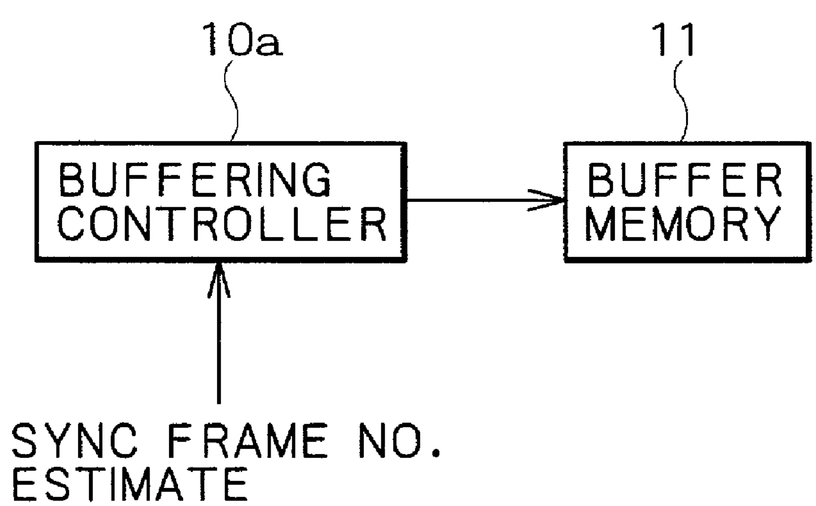
FIG. 15 is a block diagram of a typical setup for implementing control over data transfer to buffer memory based on the predicted intra-sector locations.

One such control procedure involves switching a filter time constant for the second PLL circuit 56 through the use of a time constant switching signal. Specifically, upon start of a data read operation, the filter time constant is reduced in order to enlarge the gain, whereby a high-speed settling operation is carried out. The PLL settling start signal shown in FIG. 14 is provided in the form of the time constant switching signal or the input switching signal for operating the switch 55. The two signals are both generated using the intra-sector location prediction counter.

Since each header field has no wobble structure as part of the track, the operation of the first PLL circuit 53 can become unstable over these fields if no corrective measure is taken. Illustratively, while a header field is being traced, the first PLL circuit 53 can be activated to follow the erroneously generated wobble signal. This can lead to an inconsistency in the frequency of the wobble sync clock signal CLK1 output by the first PLL circuit 53.

The above deficiency is bypassed as follows: when the header field is being traced, a PLL hold signal output by the intra-sector location prediction counter is used to put the operation of the first PLL circuit 53 on hold so that a constant oscillation frequency can be obtained. The hold operation is implemented illustratively by setting for level zero a phase error signal coming from a phase comparator 76 constituting part of the first PLL circuit 53, as will be described later. The hold operation may be implemented alternatively by setting a larger time constant on the low-pass filter (LPF) as part of the first PLL circuit 53, whereby responsiveness to the input wobble signal is reduced sufficiently.

In the inventive disc drive system, the wobble protection circuit 52 is also fed with a protection hold signal from the intra-sector location prediction counter. The protection hold signal is used in a manner similar to that described above to put the protective operation of the wobble protection circuit 52 on hold when each header field is being traced.

The wobble protection circuit 52 detects leading edges of the wobble signal "wob" as will be described later. When the header field with no wobble formed therein is being traced, the normal wobble signal "wob" is not available. In other words, any attempt to detect a leading edge in the header field will result in erroneous detection and cause degradation in reliability. This deficiency is circumvented by putting edge detection on hold while the header field is being traced, whereby erroneous edge detection is averted.

Figure 22:
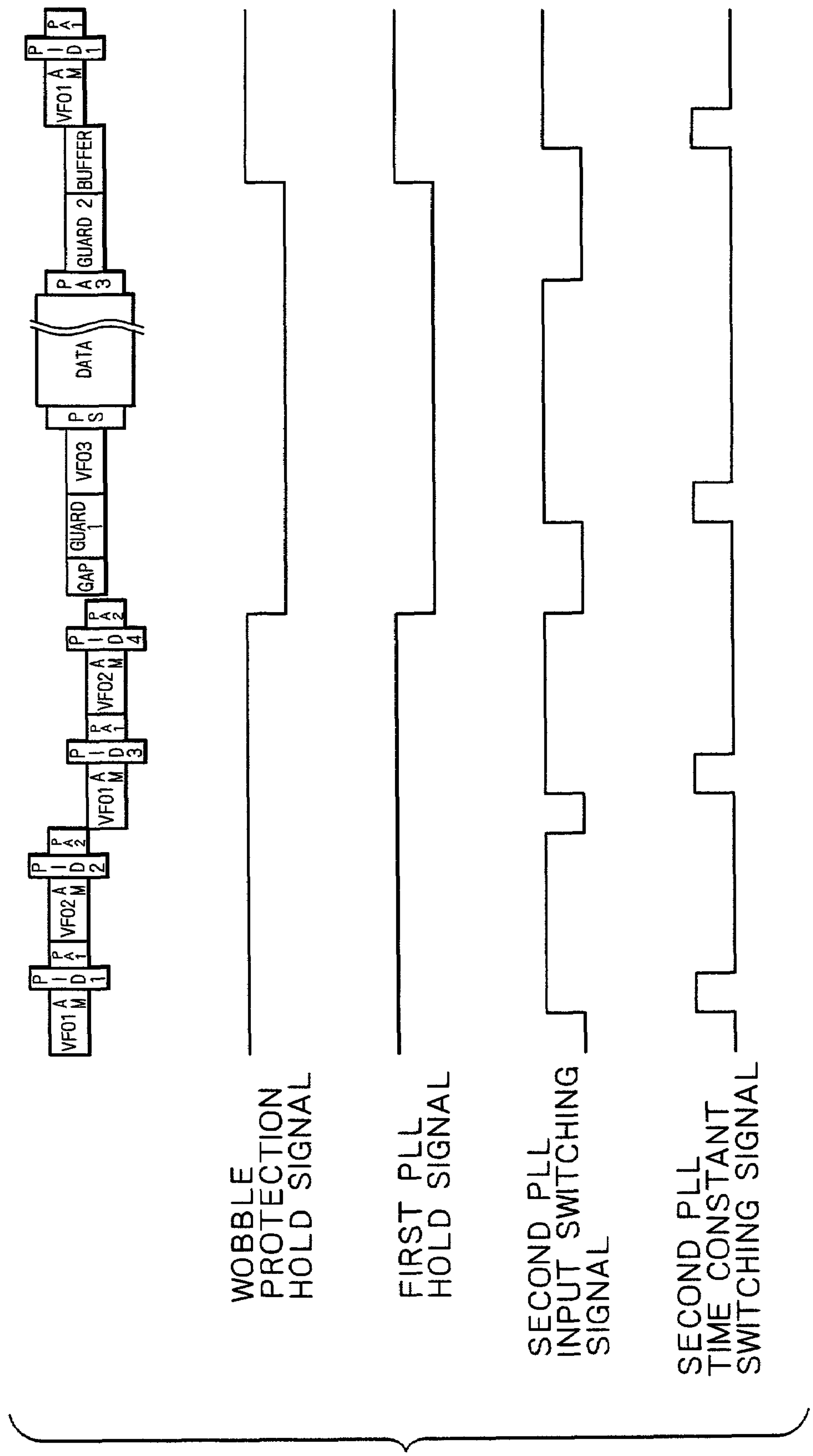
FIG. 22 is a timing chart giving typical control timings of the PLL circuit based on the predicted intra-sector locations.

FIG. 22 shows control timings relevant to the PLL circuit 8*a*. In FIG. 22, sector-long data are shown subject to the timings of a wobble protection hold signal, a first PLL hold signal, a second PLL input switching signal, and a second PLL time constant switching signal. Driving High the wobble protection hold signal puts the operation of the wobble protection circuit 52 on hold. Likewise, driving the first PLL hold signal High puts the protection circuit operation on hold. Although the wobble protection signal and the first PLL hold signal are shown substantially similar to each other in terms of timing in FIG. 22, they need not retain their similarity; the two signals may be varied in timing depending on the actual control timing requirements.

For use in controlling the switch 55, the second PLL input switching signal causes the switch 55 to select the binary RF signal when driven High and to choose the wobble sync clock signal CLK1 when brought Low. The second PLL time constant switching signal when driven High reduces the filter time constant for the second PLL circuit 56, and raises the time constant when brought Low. The period in which the second PLL time constant switching signal remains High corresponds substantially to points in time at which VFO1, VFO2 or VFO3 is detected. The signal timings shown in FIG. 22 are also obtained, it should be noted again, on the basis of the count value on the intra-sector location prediction counter whose structure was discussed by referring to FIGS. 17A through 18.

The switch 55 is basically operated in suitably timed relation using the intra-sector location prediction counter as described. Preferably, where disturbances of the RF signal exceed predetermined tolerances, the switch 55 should be operated specifically to admit the wobble sync clock signal CLK1. Disturbances of the RF signal may be judged illustratively through scratch detection or through the monitoring of sync detection status or sync protection status.

The second PLL circuit 56 may be assigned a larger time constant upon input of the wobble sync clock signal CLK1 and a smaller time constant upon input of the RF signal. This control procedure is justified for the following reason: in terms of the response time (time constant) of the PLL circuit, a trade-off generally exists between trackability and the ability to deal with signal irregularities. That is, the shorter the response time (smaller time constant), the higher the level of trackability but the more disturbed the oscillation frequency of the PLL circuit during input of irregular signals. Conversely, the longer the response time (larger time constant), the lower the level of trackability but the less disturbed the oscillation frequency during input of irregular signals.

Since higher levels of trackability translate into smaller jitters, trackability should preferably be given higher priority during input of the RF signal by reducing the response time to let the clock signal properly follow the phase of the RF signal. During input of the wobble sync clock signal CLK1, the response time may be prolonged so as to boost the ability to deal with signal irregularities at the expense of trackability. The reason for this arrangement is that the oscillation frequency of the second PLL circuit 56 need only be close to the frequency of RF signal reproduction during input of the wobble sync clock signal CLK1; frequency accuracy is allowed to be lower than at the time of RF signal input.

Alternatively, the RF signal may be input consistently to the second PLL circuit 56 provided the oscillation frequency of the circuit 56 is reduced in range. Upon input of the RF signal, the second PLL circuit 56 must synchronize rapidly with the RF signal in order to attain a locked state. This requires keeping the oscillation frequency of the second PLL circuit 56 sufficiently close to a target frequency during input of the RF signal even when unrecorded areas or like fields where the RF signal is unavailable are being traced. The requirement above applies to the setup of FIG. 21 in which the wobble sync clock signal CLK1 is input to the second PLL circuit 56 when the RF signal is not available.

When reduced in range, the oscillation frequency of the second PLL circuit 56 will not deviate significantly from the target frequency even if the RF signal is not input to the circuit 56. In this case, there is no problem even as the RF signal is input in fixed fashion to the second PLL circuit 56 without switchover to the wobble sync clock signal CLK1.

In the inventive disc drive apparatus, the second PLL circuit 56 may be constituted by a digital PLL setup. In this case, a drive clock signal of a digital PLL circuit restricts the oscillation frequency of the circuit. This easily translates into narrowing the range of the oscillation frequency of the second PLL circuit 56 in the manner described above. Adopting the digital PLL arrangement offers other benefits. For example, the phase settling can be performed at a high speed. Further, a digital PLL setup may be readily implemented using a small-area LSI that is advantageous for reduced-scale applications.

With the foregoing description of the time constant and the range of the oscillation frequency taken into account, the setup of FIG. 21 is further explained below. A longer response time of the first PLL circuit 53 and a shorter response time of the second PLL circuit 56 in the setup of FIG. 21 make it possible for the second PLL circuit 56 to realize good trackability on the RF signal and a reinforced ability to deal with signal irregularities. Implementing the second PLL circuit 56 as a digital PLL arrangement as described above also allows the circuit 56 to provide improved trackability on the RF signal and the enhanced ability to deal with signal irregularities.

Figure 23:
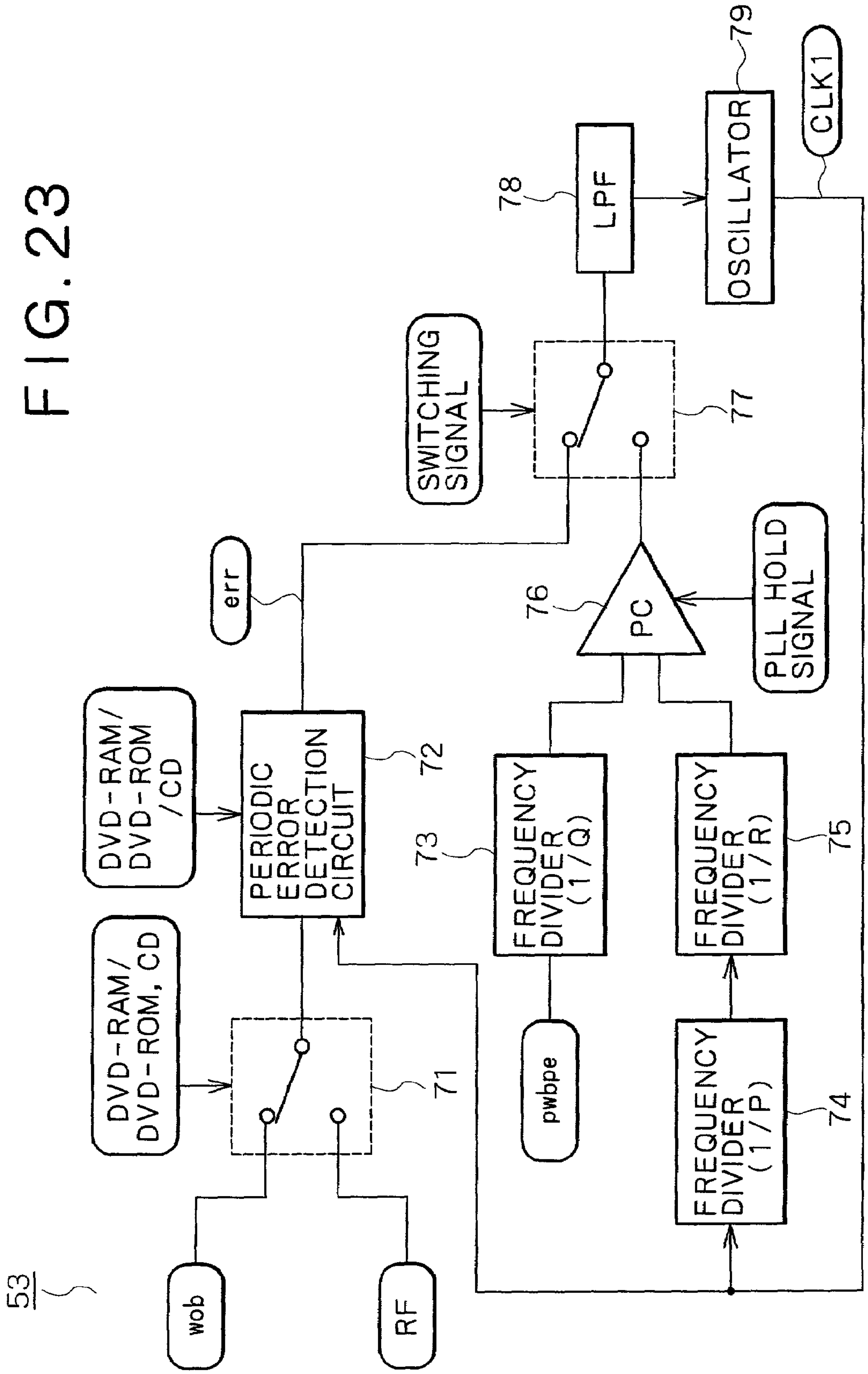
FIG. 23 is a block diagram depicting a typical internal structure of a first PLL circuit.

FIG. 23 depicts a typical internal structure of the first PLL circuit 53. The first PLL circuit 53 having this structure includes a switch 71 and a periodic error detection circuit 72. The switch 71 selects either the binary wobble signal "wob" or the binary RF signal for input to the periodic error detection circuit 72. During DVD-RAM data reproduction, the switch 71 selects the wobble signal "wob"; during DVD-ROM or CD data reproduction, the switch 71 chooses the RF signal. Because the signal to be input to the first PLL circuit 53 is switched as described depending on the disc type, a single PLL circuit loop can be shared by multiple disc types such as the DVD-RAM, DVD-ROM and CD when data are reproduced from these discs.

During DVD-RAM data reproduction, the periodic error detection circuit 72 (of which the internal structure will be described later) obtains the length (i.e., time) of the input wobble signal "wob" per cycle, detects any error between the cycle length and a reference time (target time) corresponding to the speed of data reproduction, and outputs the detected error as detected error information "err." During DVD-ROM data reproduction, the periodic error detection circuit 72 detects as the cycle length a 14T component representative of a maximum inverting interval of the EFM+ modulated code retrieved from the RF signal. During CD data reproduction, the periodic error detection circuit 72 detects an 11T component denoting the maximum inverting interval of the EFM modulated code. In each of these cases, the switching operation is suitably carried out so that the error of the cycle length is output as the detected error information "err". A switch 77 selects the detected error signal "err" for input to a low-pass filter (LPF) 78.

A frequency divider 73 admits the protected wobble output signal "pwbpe" as illustrated. The frequency divider 73 divides the protected wobble output signal "pwbpe" by a dividing ratio of 1/Q to generate a divided signal for output to a phase comparator 76. The phase comparator 76 admits a reference frequency signal obtained by having the wobble sync clock signal CLK1 from a voltage-controlled oscillator 79 divided in frequency by frequency dividers 74 (with dividing ratio of 1/P) and 75 (with dividing ratio of 1/R) In operation, the phase comparator 76 compares in terms of phase the reference frequency signal with the protected wobble output signal "pwbpe" input and divided as described, and outputs a phase error signal representing any error of the signal "pwbpe" with respect to the reference frequency signal. The phase error signal is selected by the switch 77 before being output to the low-pass filter 78.

The low-pass filter 78 extracts a low-pass component from the detected error information "err" selected by the switch 77 or from the phase error signal coming from the phase comparator 76. The low-pass component thus extracted is used to control the voltage-controlled oscillator 79 so that its oscillation frequency settles on a predetermined frequency.

As can be understood from the circuit structure described above, the first PLL circuit 53 of the inventive disc drive apparatus includes two circuit loops. One of the two circuit loops is enabled selectively by the switch 77 using a switching signal.

Suppose that the first PLL circuit 53 causes the wobble sync clock signal CLK1 to settle into a capture range or a locked range. The settling operation is carried out when the switch 77 selects the detected error information "err" for input to the low-pass filter 78. At this point, the wobble sync clock signal CLK1 output by the first PLL circuit 53 synchronizes with a maximum period of the wobble signal, i.e., a signal at a relatively low level of accuracy. That is, a loop is formed for rough control over the settling of the wobble sync clock signal CLK1 in terms of frequency.

With the settling operation completed, the switch 77 selects the phase error signal from the phase comparator 76 for input to the low-pass filter 78. This produces the wobble sync clock signal CLK1 in synchronism with the protected wobble output signal "pwbpe." Because the signal "pwbpe" has a cycle of 186 PLCK (channel clock frequency), the wobble sync clock signal CLK1 at this point is a highly accurate signal synchronized with the wobble signal.

In other words, the phase error signal from the phase comparator 76 selected by the switch 77 constitutes a loop whereby the fine-tuned wobble sync clock signal CLK1 is acquired. Because the wobble sync clock signal CLK1 obtained at this point synchronizes with the protected wobble signal, the clock signal CLK1 is in synchronism with both the wobble and the disc revolutions regardless of an unrecorded field, a recorded field, a header field or a recordable field being currently traced.

The wobble sync clock signal CLK1 serves to drive the intra-sector location prediction counter. This entails the frequency of the clock signal CLK1 being higher than that of the wobble signal. That is, the wobble sync clock signal CLK1 is provided as a clock signal which synchronized with the protected wobble signal and of which the frequency is a multiple of the wobble signal frequency.

More specifically, where PR/Q=186 for the frequency dividers 73, 74 and 75 having dividing ratios of 1/Q, 1/P and 1/R respectively, the wobble sync clock signal CLK1 has the same frequency as the channel bit frequency PLCK. Alternatively, the ratio PR/Q regarding the three frequency dividers may be made smaller so as to furnish the wobble sync clock signal CLK1 with a frequency lower than the channel bit frequency PLCK.

The switching signal for operating the switch 77 may be generated on the basis of synchronization status, to be described later, of the wobble protection circuit 52. The switching signal may alternatively be generated in accordance with the synchronization status of a downstream PID read circuit. During DVD-RAM data reproduction, the protected wobble output signal "pwbpe" is input to the phase comparator 76 as described above. During DVD-ROM or CD data reproduction, protected sync pulses are input to the phase comparator 76.

Figure 24:
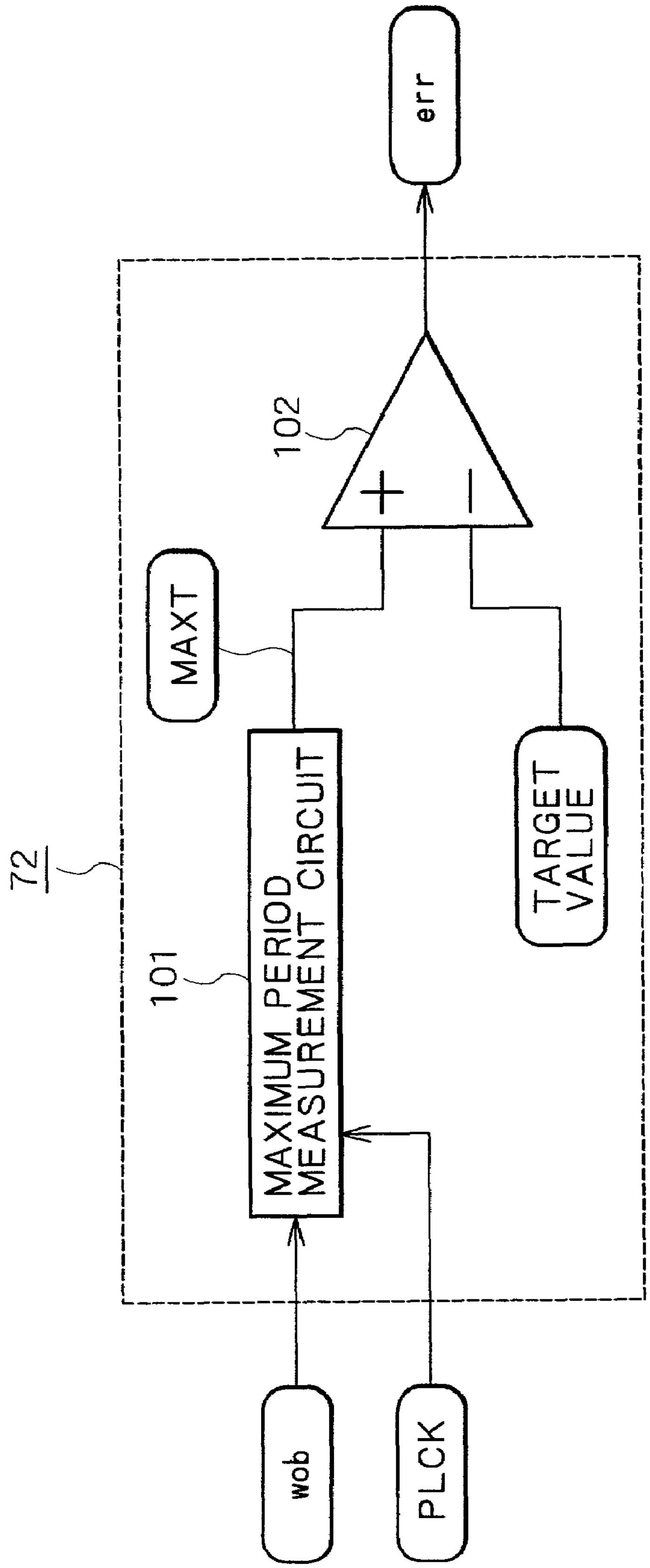
FIG. 24 is a block diagram illustrating a typical structure of a periodic error detection circuit in the inventive disc drive apparatus.

The internal structure of the periodic error detection circuit 72 in FIG. 23 is illustratively made up of a maximum period measurement circuit 101 and an arithmetic circuit 102, as shown in FIG. 24. Given the input wobble signal "wob," the maximum period measurement circuit 101 finds a maximum period MAXT, i.e., the longest time cycle from among multiple periods acquired over a predetermined period of time, and outputs the maximum period thus obtained to the arithmetic circuit 102. The arithmetic circuit 102 computes the difference between the input maximum period MAXT and a predetermined target value, and outputs the computed difference as the detected error information "err."

A typical structure of the maximum period measurement circuit 101 and its workings are described below with reference to FIGS. 25 through 26C. The block diagram of FIG. 25 shows an internal structure of the maximum period measurement circuit 101, and FIGS. 26A through 26C give the timing charts illustrating how the circuit of FIG. 25 works.

Figure 25:
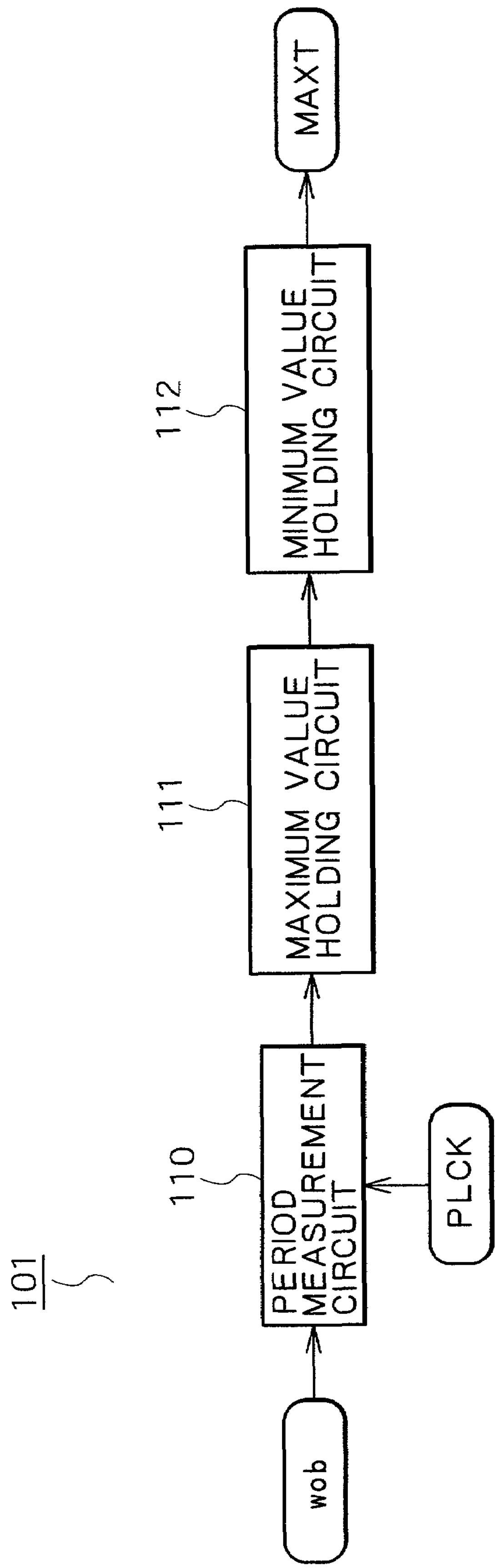
FIG. 25 is a block diagram indicating a typical structure of a maximum period measurement circuit.
Figure 26:
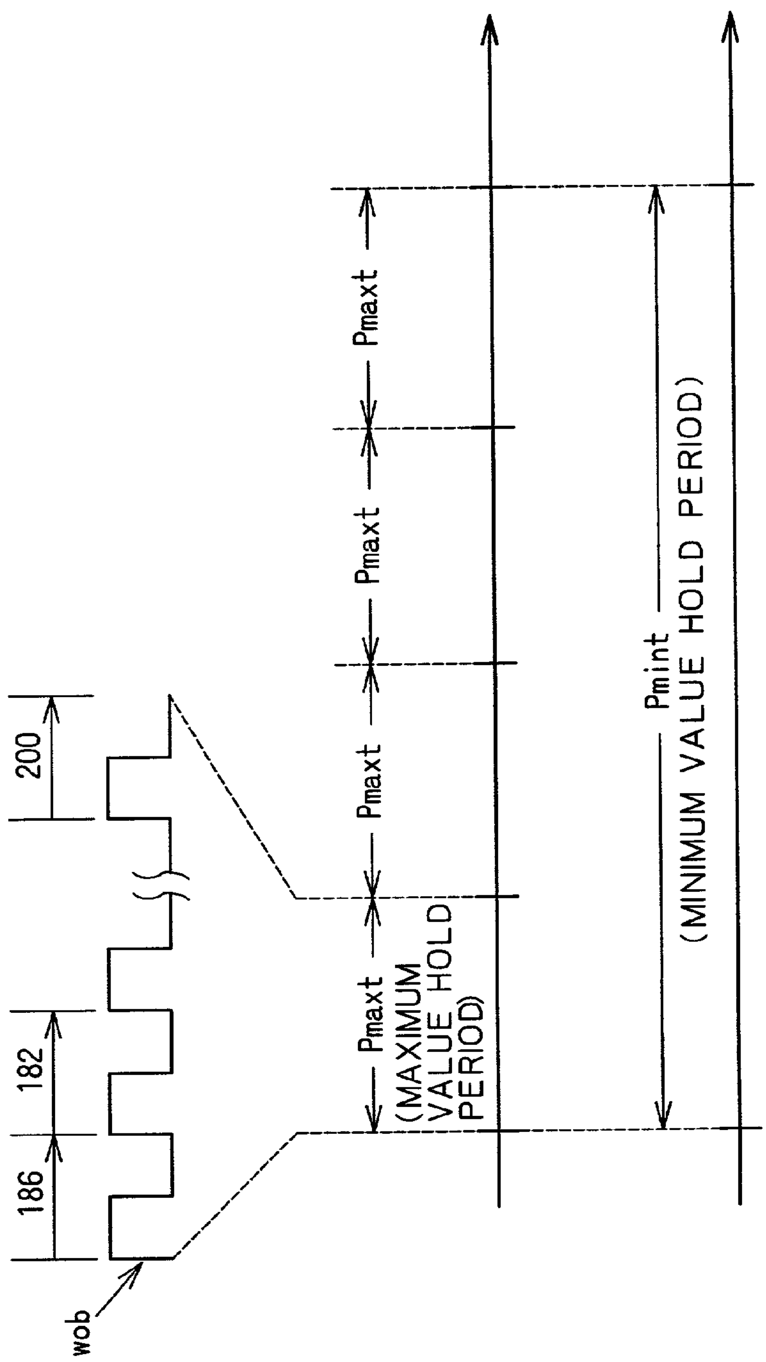
FIGS. 26A, 26B and 26C are timing charts outlining how the maximum period measurement circuit operates.

As shown in FIG. 25, the wobble signal "wob" is first input to a period measurement circuit 110 for a period measurement process. The process takes place illustratively as shown in FIG. 26A. The wobble formed on the disc is stipulated to be 186 PLCK per cycle (PLCK=channel clock). It follows that the wobble signal "wob" derived from detection of the wobble is ideally 186 PLCK per cycle. Given the input wobble signal "wob," the period measurement circuit 110 performs counting in keeping with the channel clock PLCK per cycle. The actual count value may or may not be 186; an error can develop depending on the read state. The count value thus obtained per cycle (period measurement) is output to a maximum value holding circuit 111.

The maximum value holding circuit 111 establishes a maximum value hold period Pmaxt equivalent to a predetermined plurality of cycles of the wobble signal "wob" as shown in FIG. 26B. The circuit 111 then holds the largest of the period measurements acquired per maximum value hold period Pmaxt.

A minimum value holding circuit 112 is provided downstream of the maximum value holding circuit 111 above. The circuit 112 selectively holds the smallest of multiple maximum values that have been held as a predetermined plurality of maximum value hold periods Pmaxt. In the case of FIG. 26C, for example, the period corresponding to four consecutive maximum value hold periods Pmaxt is established as a minimum value hold period Pmint. The smallest of the four maximum value hold periods Pmaxt within the minimum value hold period Pmint is held and output as a maximum period MAXT. The process above is repeated every time the minimum value hold period Pmint occurs, so that the maximum period MAXT can be output continuously at constant intervals. On the assumption that the maximum value hold period Pmaxt remains shorter than the minimum value hold period Pmint (Pmaxt<Pmint), the minimum value hold period Pmint should be sufficiently long with regard to the maximum value hold period Pmaxt.

Illustratively, extremely prolonged wobble periods can be erroneously measured when scratched or unclean areas (defect areas) are traced on the disc. Such measurements, if used for settling control of the PLL circuit, obviously lead to unstable performance. Such an eventuality for the measurement of the maximum period MAXT is bypassed by first sampling maximum values of the period measurements and then selecting the smallest of these maximum values. The procedure helps constantly provide wobble period measurements more accurately than before, whereby the settling operation of the PLL circuit is made more stable than ever.

It should be noted again that the maximum period MAXT measured by the maximum period measurement circuit 101 serves as basic information for acquiring a wobble signal period error (phase error), i.e., the detected error information "err" representative of a disc rotating speed error. In view of this fact, the detected error information "err" may be obtained alternatively by measuring a minimum period MINT instead of the maximum period MAXT and by comparing the minimum period MINT with a target value. Any difference acquired between the compared periods denotes the detected error information "err."

Figure 27:
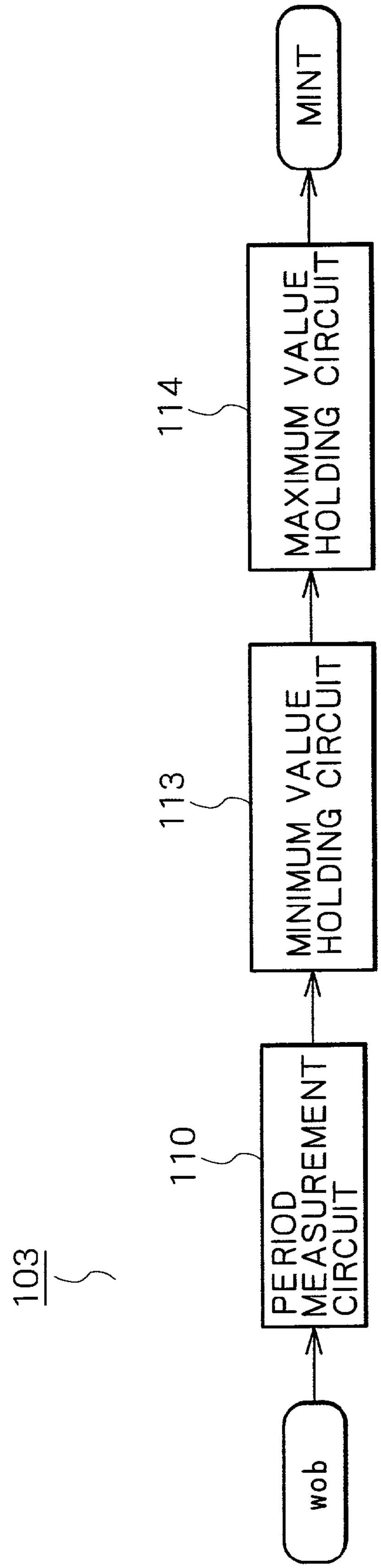
FIG. 27 is a block diagram sketching a typical structure of a minimum period measurement circuit.

FIG. 27 shows a typical structure of a minimum period measurement circuit 103 by which to obtain the minimum period MINT. The minimum period measurement circuit 103 may illustratively replace the maximum period measurement circuit 101 in FIG. 24. In the minimum period measurement circuit 103 of FIG. 27, the binary wobble signal "wob" is first measured periodically by the period measurement circuit 110. The measurements are output to a minimum value holding circuit 113 located downstream. The holding circuit 113 holds minimum values in the same timed relation (see FIG. 26B) as the maximum value holding circuit 111 in FIG. 25.

A maximum value holding circuit 114 is located downstream of the minimum value holding circuit 113 above. The maximum value holding circuit 114 holds maximum values in the same timed relation as shown in FIG. 26C. More specifically, the circuit 114 first establishes a maximum value hold period corresponding to a predetermined plurality of minimum value hold periods held by the minimum value holding circuit 113. The maximum value holding circuit 114 then selectively holds the largest of these minimum values held during the maximum value hold period, and outputs the selected value as the minimum period MINT.

Figure 28:
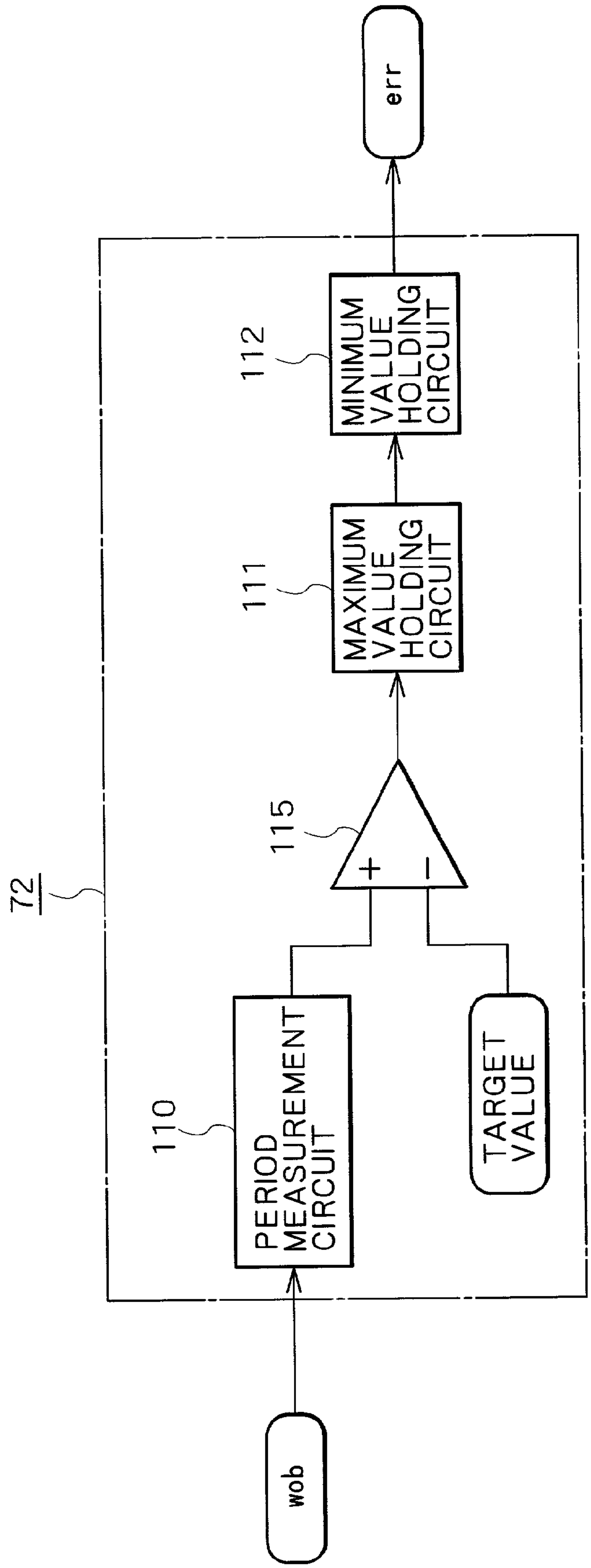
FIG. 28 is a block diagram presenting another typical structure of the periodic error detection circuit.

The periodic error detection circuit 72 may alternatively have a structure shown in FIG. 28 instead of what is indicated in FIG. 24. In the circuit 72 of FIG. 28, the wobble signal "wob" is input to the period measurement circuit 110. In the same timed relation as in FIG. 26A, the period measurement circuit 110 also measures a period length per cycle of the wobble signal "wob" based on the channel clock timing. In this case, an arithmetic circuit 115 computes any difference between a predetermined target value and the period measurements output by the period measurement circuit 110, the difference denoting a period measurement error. The output of the arithmetic circuit 115 is period measurement error information that is input to the maximum value holding circuit 111.

A minimum value holding circuit 112 is located downstream of the maximum value holding circuit 111 above. In this setup, the maximum value holding circuit 111 positioned upstream first holds the largest of period measurement errors. The minimum value holding circuit 112 provided downstream holds selectively the smallest of a predetermined plurality of maximum period measurement errors. The smallest value thus held by the circuit 112 is output as the detected error information "err."

Illustratively, in the setup of FIG. 25 or FIG. 27 designed for period measurement, the values to be processed by the maximum and minimum value holding circuits are relatively large, i.e., about 186 each. By contrast, the structure of FIG. 28 first permits acquisition of the difference between cycle-by-cycle measurements and the target value. Consequently the values to be input to the maximum value holding circuit 111 and minimum value holding circuit 112 are smaller. These two circuits can thus be structured more simply and on a smaller scale than their counterparts in the earlier examples.

Conventionally, a crystal oscillator arrangement was typically used to obtain a predetermined oscillation frequency for use as the reference in the settling of the PLL circuit, followed by other necessary control procedures. In such a setup, if the laser spot tracing the disc signal surface is not dynamically located in the relevant radial direction (i.e., zone), the laser spot can settle on an erroneous frequency preparatory to the subsequent control steps. As a result, it can take an inordinately long time before the disc revolutions and the frequency are allowed to settle correctly.

According to the invention, by contrast, period measurements of the wobble signal are taken and the PLL circuit is operated in such a manner that the measurements settle on a predetermined value. Because the frequency of the wobble signal actually derived from the disc is used as the reference, errors specific to the conventional setup do not occur and the settling operation of the PLL circuit is performed that much faster.

In the inventive setup above, the maximum or minimum period length of the wobble signal "wob" was shown acquired as information for detecting a disc rotating speed error. Alternatively, the period length information may be replaced by a maximum or minimum pulse width that is detected and compared with a target value for any difference. This also provides detected error information "err" of about the same accuracy as in the preceding examples.

5. Spindle Control

With the PLL circuit 8_a_ illustratively structured as discussed above, the spindle motor is controlled in revolutions as described below.

Figure 29:
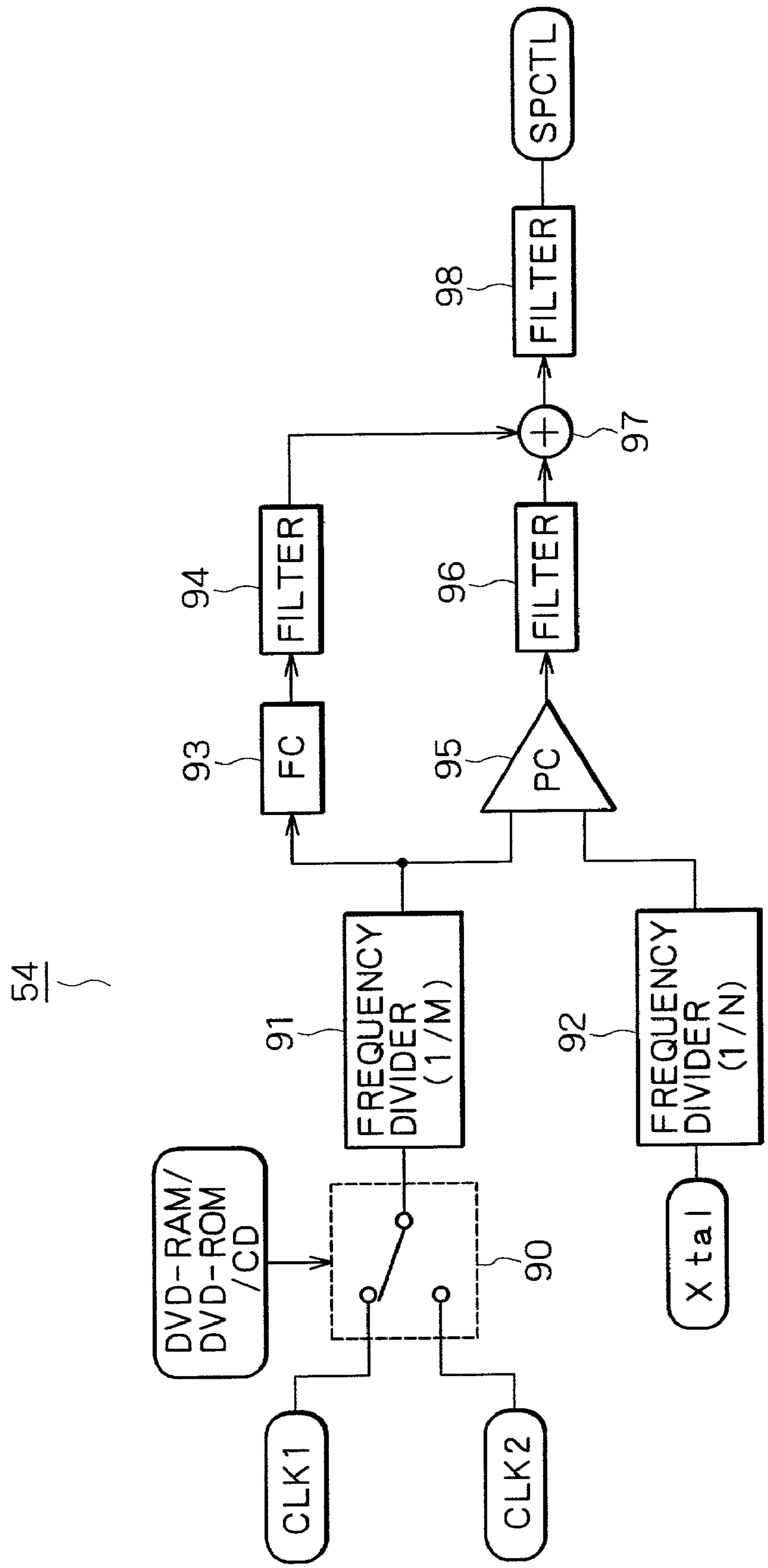
FIG. 29 is a block diagram picturing a typical internal structure of a spindle control circuit in the inventive disc drive apparatus.

As shown in FIG. 21, the spindle control circuit 54 in the inventive disc drive apparatus is characterized in that it admits, for input, the wobble sync clock signal CLK1 reproduced by the PLL circuit 8_a_ and thereby being activated. FIG. 29 shows a typical internal structure of the spindle control circuit 54.

The PLL circuit 8_a_ in FIG. 21 was shown inputting only the wobble sync clock signal CLK1 to the spindle control circuit 54 in a structure focused primarily on DVD-RAM data reproduction.

In practice, however, the disc drive apparatus embodying this invention is capable of reproducing data not only from the DVD-RAM but also from the DVD-ROM and CD. The spindle control circuit 54 of this embodiment is thus structured to control spindle revolutions in compliance with any of these disc formats.

With its multiple disc format compatibility taken into account, the spindle control circuit 54 of FIG. 29 is shown admitting as its input not only the wobble sync clock signal CLK1 but also the RF sync clock signal CLK2. One of the two clock signals is selected by a switch 90 for use as the input signal.

During DVD-RAM data reproduction, the switch 90 is operated to select the wobble sync clock signal CLK1 in fixed fashion. This permits execution of ZCLV-based rotational control in compliance with the DVD-RAM format.

During DVD-ROM or CD data reproduction, the first PLL circuit 53 performs clock recovery based on a sync pattern length detected from the binary RF signal. That means the clock signal CLK1 is in synchronism with the RF signal, not with the wobble. Thus during DVD-ROM or CD data reproduction, the clock signals CLK1 and CLK2 both have their frequencies synchronized with the RF signal. In other words, any one of the clock signals CLK1 and CLK2 may be selected as the input signal for DVD-ROM or CD data reproduction.

At the time of DVD-ROM or CD data reproduction, either the CLV or the CAV scheme is utilized selectively for spindle control. If dividing ratios of 1/M and 1/N are fixed for frequency dividers 91 and 92, then CLV-based spindle control is brought into effect; if the dividing ratios of 1/M and 1/N are varied depending on the radial direction (e.g., zone) in which the laser spot is dynamically located, then spindle control is effected under the CAV scheme.

When the input signals are suitably switched as described depending on the disc type, a single spindle control circuit setup can be shared by a plurality of disc revolution control schemes.

The input signal selected by the switch 90 is divided by the frequency divider 91 using the dividing ratio of 1/M. From the frequency divider 91, the input signal is branched in two directions: a frequency counter 93 and a phase comparator 95.

The frequency counter 93 counts the frequency of the input signal, finds any difference between the measured frequency and a predetermined reference value, and generates a frequency error signal representing the error of the measured frequency with respect to the reference The frequency error signal passes through a filter 94 for a specific band filtration process before reaching an adder 97.

Given the input signal from the frequency divider 91, the phase comparator 95 compares the input signal in terms of phase with a reference frequency signal Xtal generated on the basis of an oscillation signal from a crystal oscillator, and generates a phase error signal indicative of the detected phase difference. The phase error signal passes through a filter 96 for a specific band filtration process before reaching the adder 97.

The adder 97 adds up the frequency error signal and phase error signal thus input and generates a sum signal accordingly. The generated sum signal is output to a filter 98. The signal coming out of the processing by the filter 98 is output as a spindle control signal SPCTL.

In the spindle control circuit setup inside the servo processor 5, a spindle drive signal is generated on the basis of the spindle control signal SPCTL. The generated spindle drive signal is used to control the rotating speed of the spindle motor 2 in such a manner that the rotational frequency of the spindle motor 2 complies with a combination of the dividing ratio (1/N) about the reference frequency signal Xtal and of the dividing frequency (1/M) about the input signal (CLK1, CLK2).

In this setup, the input signal is either the wobble sync clock signal CLK1 or the RF sync clock signal CLK2. It follows that the PLL circuit can maintain its locked state as long as rotational control is effected in a manner allowing the clock signal (CLK1, CLK2) to synchronize with the current wobble signal or RF signal. That means the capture range for the PLL circuit as a whole becomes infinite.

The spindle control circuit 54 of the inventive disc drive apparatus, basically structured as shown in FIG. 29, may preferably take on a structure to which the above-described periodic error detection circuit 72 is additionally applied. The preferred structure offers control performance of higher reliability.

Figure 30:
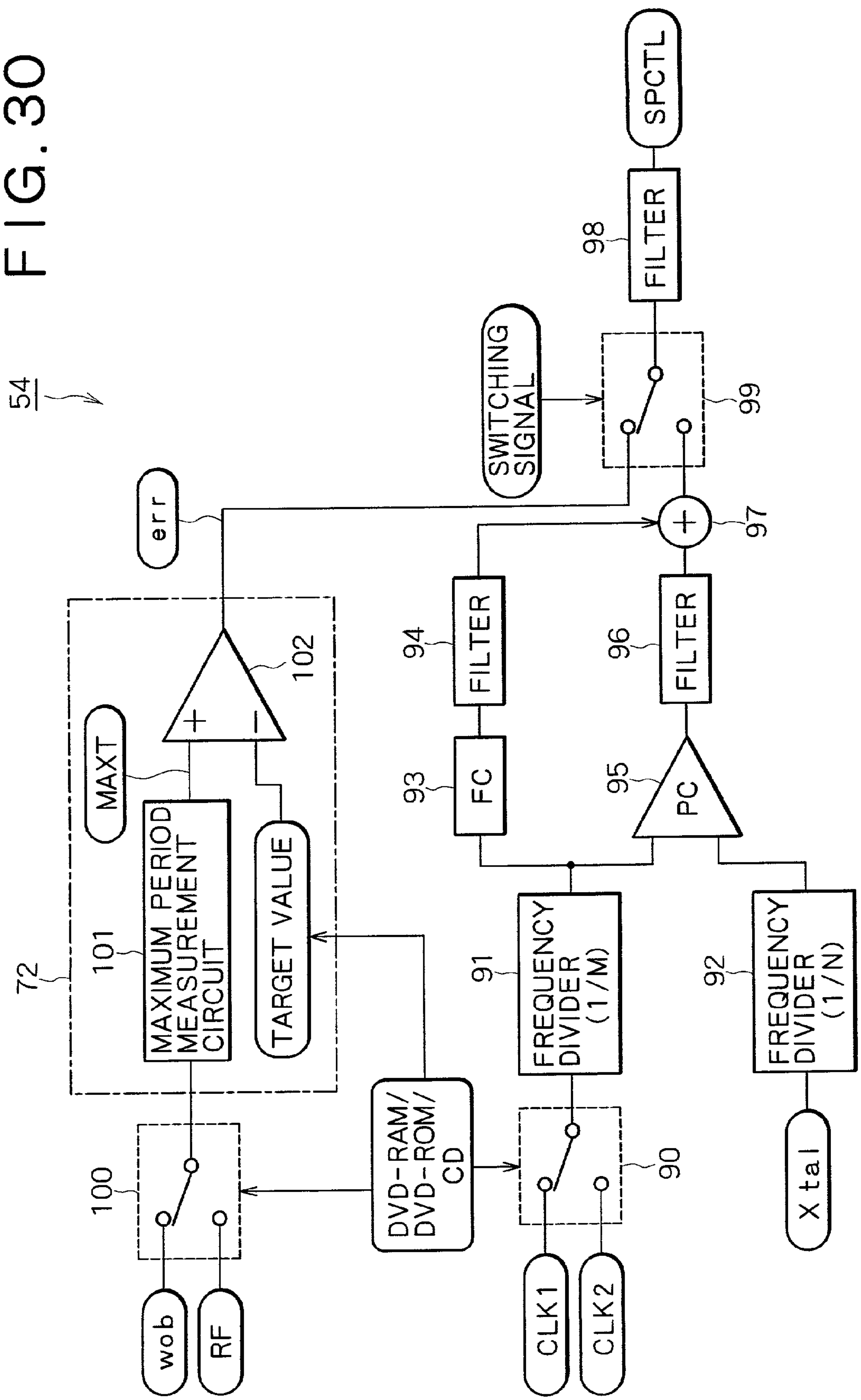
FIG. 30 is a block diagram showing another typical internal structure of the spindle control circuit.

FIG. 30 shows one such structure of the spindle control circuit 54 with the periodic error detection circuit 72 included. In FIG. 30, those parts with their counterparts already shown in FIG. 29 are given the same reference numerals, and descriptions of such parts are omitted where redundant. Since the periodic error detection circuit 72 shown in FIG. 30 is structurally the same as that in FIG. 24, details about the internal structure of the circuit 72 will not be described further.

The spindle control circuit 54 in FIG. 30 is shown having its circuit structure of FIG. 29 supplemented by the periodic error detection circuit 72 of FIG. 24. The signal to be input to the maximum period measurement circuit 101 in the periodic error detection circuit 72 is either the wobble signal "wob" or the RF signal as in the case of the first PLL circuit 53 (see FIG. 23). One of the two signals is selected by a switch 100. The wobble signal "wob" is selected for DVD-RAM data reproduction; the RF signal is chosen for DVD-ROM or CD data reproduction.

The target value to be input to the arithmetic circuit 102 is varied depending on data being reproduced from the DVD-RAM, DVD-ROM or CD. This arrangement allows the single periodic error detection circuit 72 to address any of the DVD-RAM, DVD-ROM and CD formats for data reproduction. It should be noted that the structure in which the periodic error detection circuit 72 is shared between different disc types is also adopted for the periodic error detection circuit 72 in the first PLL circuit 53.

In the circuit structure of FIG. 30, the detected error information "err" from the periodic error detection circuit 72 is input to a switch 99.

The switch 99 is operated to select either the detected error information "err" or the output signal from the adder 97 and to output what is selected to the filter 98.

The above setup permits so-called rough servo control whereby the rotating speed of the spindle motor 2 is settled. Under rough servo control, the switch 99 selectively allows the detected error information "err" to enter the filter 99 which in turn outputs the spindle control signal SPCTL.

At the end of rough servo control, the switch 99 is operated to allow the output signal from the adder 97 to reach the filter 99 which in turn outputs the spindle control signal SPCTL. Thereafter, high-precision spindle servo control is executed based on the result of phase comparisons (and frequency measurements) with reference to the oscillation clock Xtal.

The rough servo control scheme utilizing the detected periodic errors helps accelerate the first PLL circuit 53 in its frequency settling operation and forestalls a pseudo-locked state while the first PLL circuit 53 is under phase comparison control. The pseudo-locked state is a state where the phase is correctly settled, the oscillation frequency is settled on a constant frequency, but the frequency is not correctly settled.

Where the periodic error detection circuit 72 is applied in constituting the spindle control circuit 54, the maximum period measurement circuit 101 may also adopt the structure shown in FIG. 25. Alternatively, the maximum period measurement circuit 101 may be replaced by the minimum period measurement circuit 103 depicted in FIG. 27.

As another alternative, the periodic error detection circuit 72 may take on the structure indicated in FIG. 28. This structure is identical to that of the periodic error detection circuit 72 furnished in the first PLL circuit 53. That means the inventive disc drive apparatus may be structured so as to let the periodic error detection circuit 72 be shared by the first PLL circuit 53 and the spindle control circuit 54. When redundant, multiple circuits of the same structure are replaced by a single circuit setup, the use of circuitry is made more efficient than before. One benefit of such a shared circuit arrangement is that the circuits involved can be reduced in scope when implemented in practice.

In the structures of FIGS. 29 and 30, both the phase comparator 95 and the frequency counter 93 are used to detect rotating speed errors. Alternatively, the frequency counter 93 may be omitted, and rotational control on the spindle motor of this embodiment is still performed in a sufficiently effective manner.

As another alternative, the frequency counter 93 may be kept in place but activated only if the operation status of the downstream second PLL circuit 56 deteriorates. In this case, the downstream status may be judged in terms of sync protection status or based on error rate information. In the structure of the PLL circuit 8a shown in FIG. 21, however, it is highly unlikely for the downstream status to deteriorate because the capture range of the first PLL circuit 53 is infinite. With this feature taken into account, the frequency error signal from the frequency counter 93 is kept monitored and may be forwarded to the adder 97 for spindle control only if the error signal is judged to represent an inordinately large error; the frequency error signal need not be used if it denotes a sufficiently small error. As a further alternative, the frequency error signal may be output to the adder 97 only if an inordinately large error is judged to have continued for a predetermined period of time.

Some conventional PLL circuits utilize during their DVD-RAM data reproduction a frequency signal based on a crystal oscillator for settling control. In such setups, spindle control is executed also using a crystal oscillator-derived reference frequency signal. These circuits are necessarily complex in structure because they must address changing target values of the spindle revolutions depending on the radial direction in which the laser spot is dynamically located. If the laser spot location is not correctly recognized, the PLL circuit is liable to establish erroneous spindle revolutions.

Some conventional spindle control circuits admit, as their input signal, a difference in phase or frequency between an unprotected wobble signal and a reference clock.

In such cases, the wobble signal is vulnerable to servo errors that can result in unstable signal status. Where the DVD-RAM format is in effect, the wobble signal is interrupted every time a header field is traced. As long as the wobble signal is used unprotected, unstable spindle control status is unavoidable.

With the inventive disc drive apparatus, the unprotected wobble signal is replaced as an input signal by the wobble sync clock signal CLK1.

The wobble sync clock signal CLK1 is obtained on the basis of the protected wobble output signal "pwbpe" generated by the wobble protection circuit 52 (see FIG. 21). The protected wobble output signal "pwbpe" is a stable signal acquired after such invalid conditions as unstable servo status or missing wobble signal portions have been corrected.

As opposed to the conventional setup where spindle control is effected in reference to a crystal oscillator-derived frequency signal, the inventive arrangement allows a target value to be established independently of the radial direction in which the laser spot is dynamically located. That is, the target value need only be set based on the frequency of the wobble sync clock signal CLK1. As an added benefit, this arrangement prevents spindle control malfunction.

Unlike the conventional case where the wobble signal is used unprotected, the inventive setup prevents the spindle control circuit from reacting to invalid wobble signals and thereby ensures spindle control of higher reliability.

6. Wobble Protection Circuit

As described above, the PLL circuit 8a of the inventive disc drive apparatus receives the protected wobble output signal "pwbpe," so that the circuit provides clock recovery in a more stable manner than when admitting an unprotected wobble signal. Protection of the wobble signal is accomplished by the wobble protection circuit 52 as shown in FIG. 21. What follows is a description of the wobble protection circuit 52.

Figure 31:
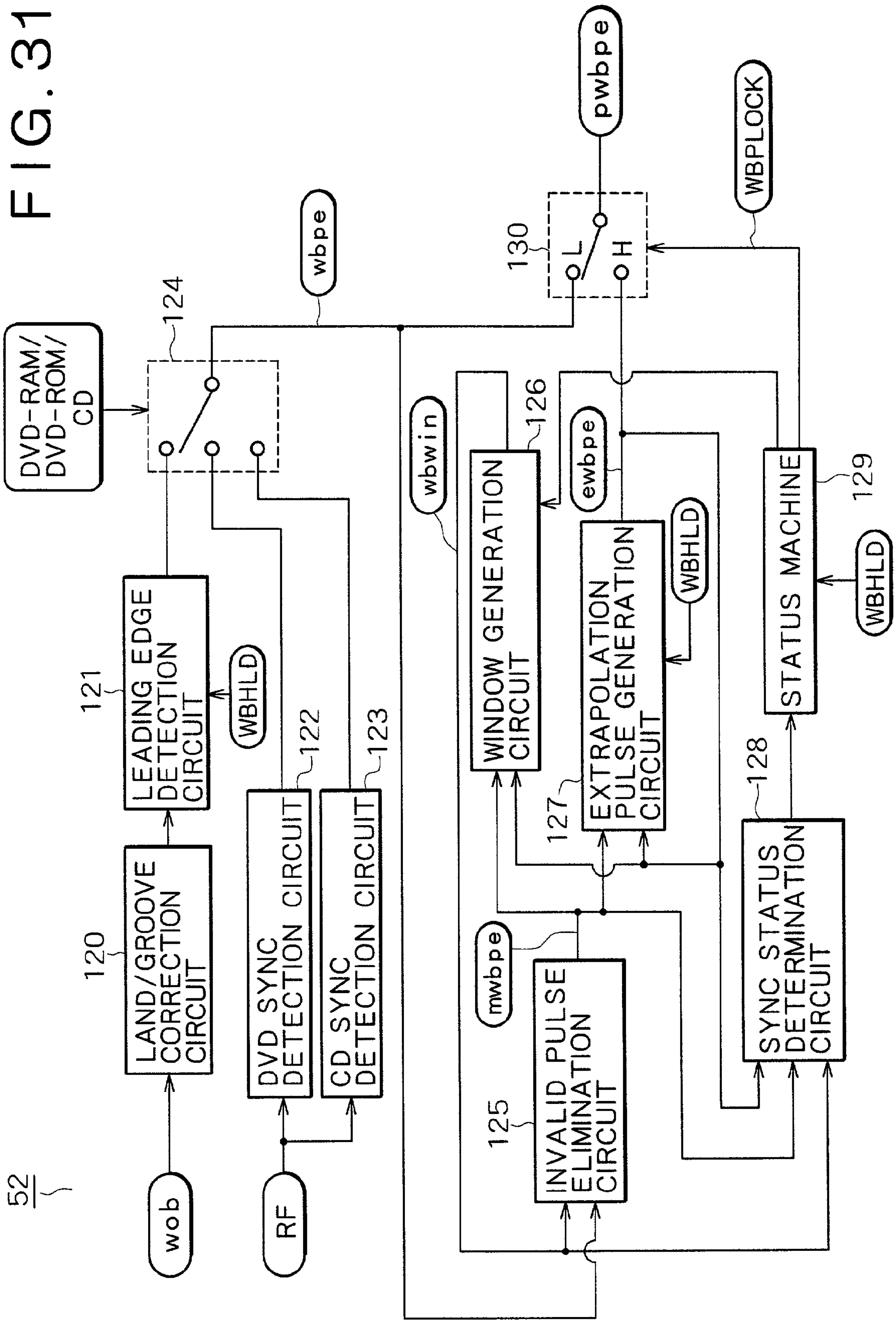
FIG. 31 is a block diagram depicting a typical internal structure of a wobble protection circuit in the inventive disc drive apparatus.

FIG. 31 shows a typical structure of the wobble protection circuit 52.

In FIG. 31, the wobble signal "wob" obtained by the RF amplifier 4 is first input to a land/groove correction circuit 120.

Figure 36:
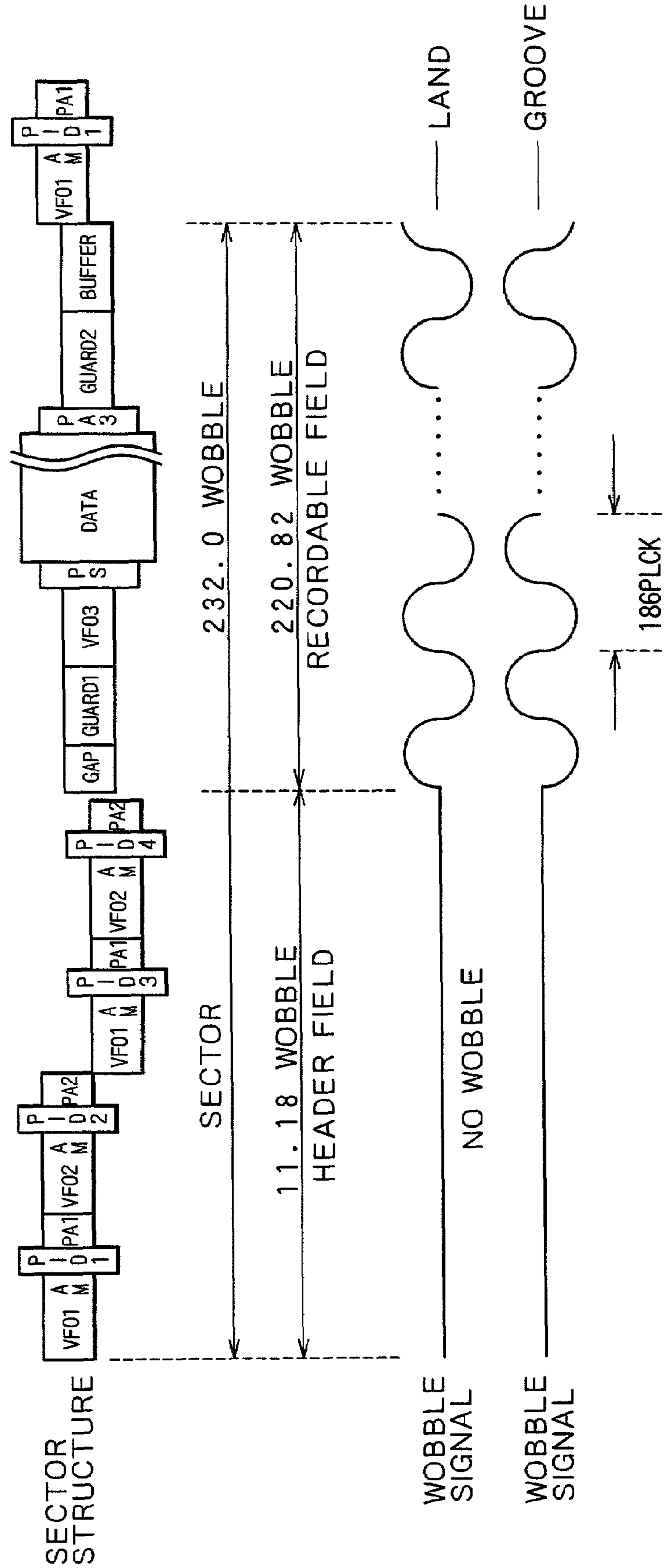
FIG. 36 is an explanatory view comparing land/groove wobble signal waveforms.

FIG. 36 illustrates relationships between the sector structure on the one hand and those wobble signals on the other hand which are detected when a land track or a groove track is traced by the laser spot.

The tracks on the DVD-RAM have the sector structure shown in FIG. 36. A land and a groove occur in contiguously alternate fashion per complete track where the sector structure of FIG. 36 is formed continuously.

Structured as illustrated, the land and groove tracks are inverted to each other in polarity over the recordable field, i.e., they have a phase difference of 180 degrees where that field is being traced.

It should be noted that the wobble signal for each of the land and groove tracks has a cycle of 186 PLCK and that no wobble signal is detected (i.e., the signal is interrupted) over each header field composed of pit rows, as described earlier.

The land/groove correction circuit 120 corrects the 180-degree phase difference that occurs between the time of tracing over the land track and the time of tracing over the groove track. That is, the land/groove correction circuit 120 helps generate wobble signals that have the same phase regardless of the land or groove track being currently traced.

The processing involved is depicted illustratively by the timing charts of FIGS. 32A, 32B and 32C.

The wobble signal generated by the RF amplifier 4 is inverted in phase over each header field separating a groove field from a land field, as shown in FIG. 32A. The wobble signal component is not made available over the header field.

When a groove field is being traced, a corrected wobble signal having an in-phase waveform is obtained by simply adopting the original wobble signal as indicated in FIG. 32C. When a header field is being traced, with the header hold signal driven High as depicted in FIG. 32B, a wobble signal in phase with the groove field is generated in interpolated fashion. When a land field is being traced, the original wobble signal (FIG. 32A) is inverted in waveform. These processes generate a corrected wobble signal with its phase difference rectified between the land and the groove. In other words, the corrected wobble signal is generated by adopting, as reference, the phase of the wobble signal acquired during tracing of the groove field, and by inverting the phase obtained over the land field for alignment with the reference phase derived from the groove field.

The corrected wobble signal of this disc drive apparatus is a signal that maintains its phase consistency as a wobble signal independent of the land or groove being currently traced. Although the phase of the wobble signal derived from the groove field was shown utilized as the reference in the above example, this is not limitative of the invention. Alternatively, the phase of the wobble signal stemming from the land field may instead be used as the reference. In this case, the wobble signal attributable to the groove field may be inverted in waveform for phase alignment with the wobble signal derived from the land field.

Figure 32D:
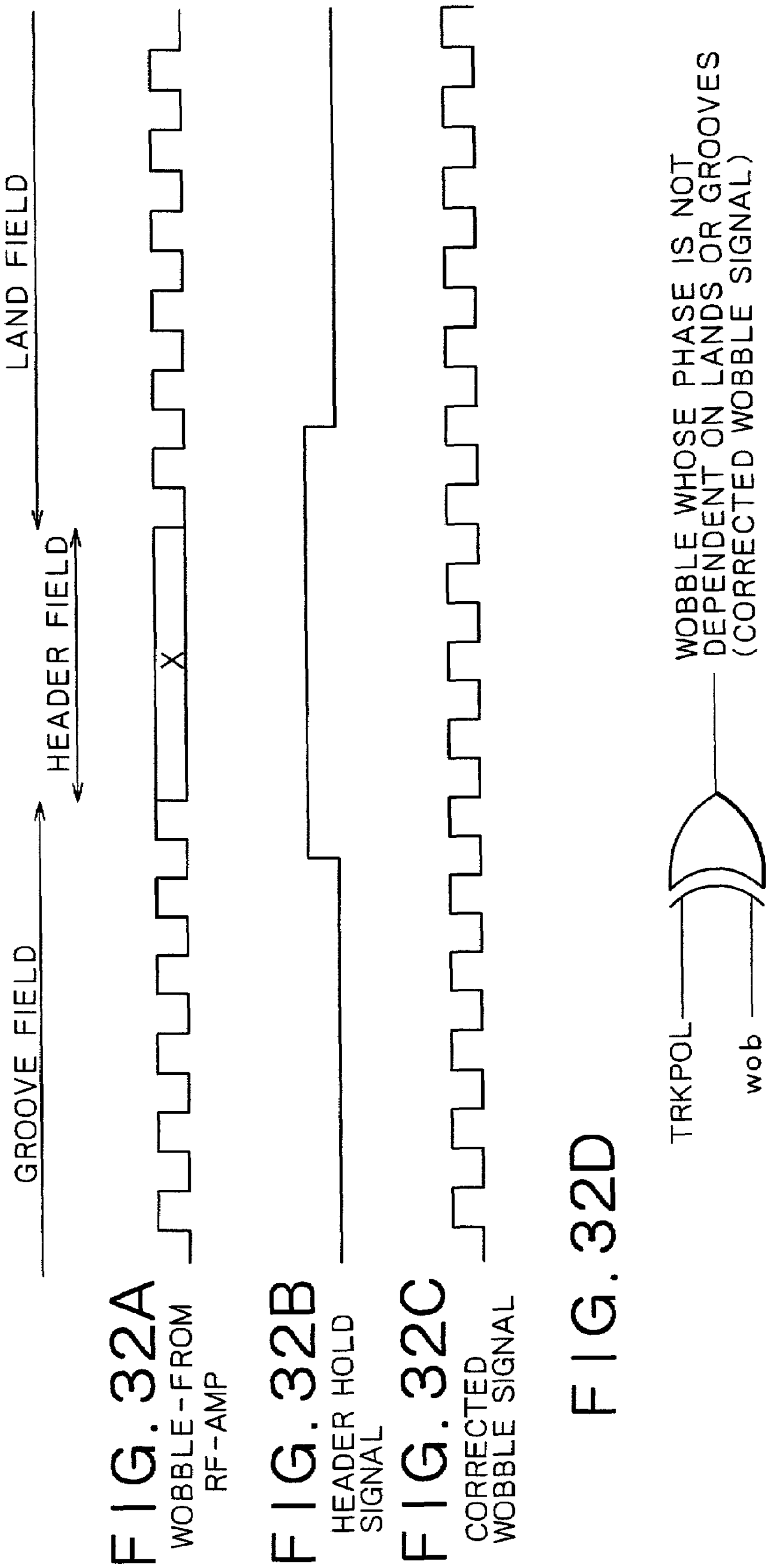

Basically, as shown in FIG. 32D, a signal TRKPOL is exclusively ORed with the wobble signal "wob" so as to generate a corrected wobble signal whose phase is not inverted regardless of the land or groove being currently traced. With the wobble signal thus corrected, its waveform is interpolated every time a header field is traced. This provides a perfectly corrected wobble signal waveform as shown in FIG. 32C.

Returning now to FIG. 31, the wobble signal corrected by the land/groove correction circuit 120 is input to a leading edge detection circuit 121. In turn, the leading edge detection circuit 121 detects leading edges of the corrected wobble signal and outputs a pulse every time a leading edge is detected. The pulse signal is selected by a switch 124 for output as an edge detection signal "wbpe."

During DVD-ROM data reproduction, the switch 124 is operated to select a sync detection signal generated by a DVD sync detection circuit 122 upon detecting a 14T sync pattern from the received RF signal. The sync detection signal selected by the switch 124 is output in place of the edge detection signal "wbpe." During CD data reproduction, the switch 124 is operated to select a sync detection signal generated by a CD sync detection circuit 123 upon detecting an 11T sync pattern from the received RF signal. The selected sync detection signal is output in place of the edge detection signal "wbpe."

The detection signal selected by the switch 124 is branched in two directions, so that the signal is input both to an invalid pulse elimination circuit 125 and to a switch 130.

The invalid pulse elimination circuit 125 eliminates, from the input edge detection signal "wbpe," those edge detection pulses that may have occurred in incorrectly timed relation. The process of eliminating invalid edge detection pulses, to be described later, makes use of windows "wbwin" generated by a window generation circuit 126.

After removal of invalid pulses by the invalid pulse elimination circuit 125, the edge detection signal "wbpe" is forwarded as a signal "mwbpe" for input to the window generation circuit 126, to an extrapolation pulse generation circuit 127, and to a sync status determination circuit 128.

The window generation circuit 126 receives two signals: the signal "mwbpe" from the invalid pulse elimination circuit 125, and a signal "ewbpe" from the extrapolation pulse generation circuit 127, to be described later. Using the signals thus accepted, the window generation circuit 126 generates and outputs a window "wbwin" that is open to edge detection pulses judged correct, as will be discussed later.

The window "wbwin" is branched to two circuits: the invalid pulse elimination circuit 125 and sync status determination circuit 128.

Some edge detection pulses of the edge detection signal "wbpe" can be lost depending on the status of the original wobble signal. This can happen illustratively when a header field or a defective area is being traced or when a certain error has disturbed the waveform of the wobble signal.

The invalid pulse elimination circuit 125 works only to eliminate incorrectly timed edge detection pulses from the edge detection signal "wbpe." That means any missing edge detection pulses from the edge detection signal "wbpe" are directly reflected in the signal "mwbpe." The signal "mwbpe" is thus vulnerable to dropouts of edge detection pulses that should have been acquired in correctly timed relation.

The possible pulse dropouts are corrected by the extrapolation pulse generation circuit 127 extrapolating the missing edge detection pulses from the input signal "mwbpe." The protected wobble signal "ewbpe," output by the extrapolation pulse generation circuit 127 and fed back to the extrapolation pulse generation circuit 127 itself, is used to predict when to extrapolate edge detection pulses, as will be described later.

Following the extrapolation process by the extrapolation pulse generation circuit 127, the protected wobble signal "ewbpe" is branched for input to both the switch 130 and the sync status determination circuit 128.

Figures 33A, 33B, 33C, 33D, 33E, 33F:
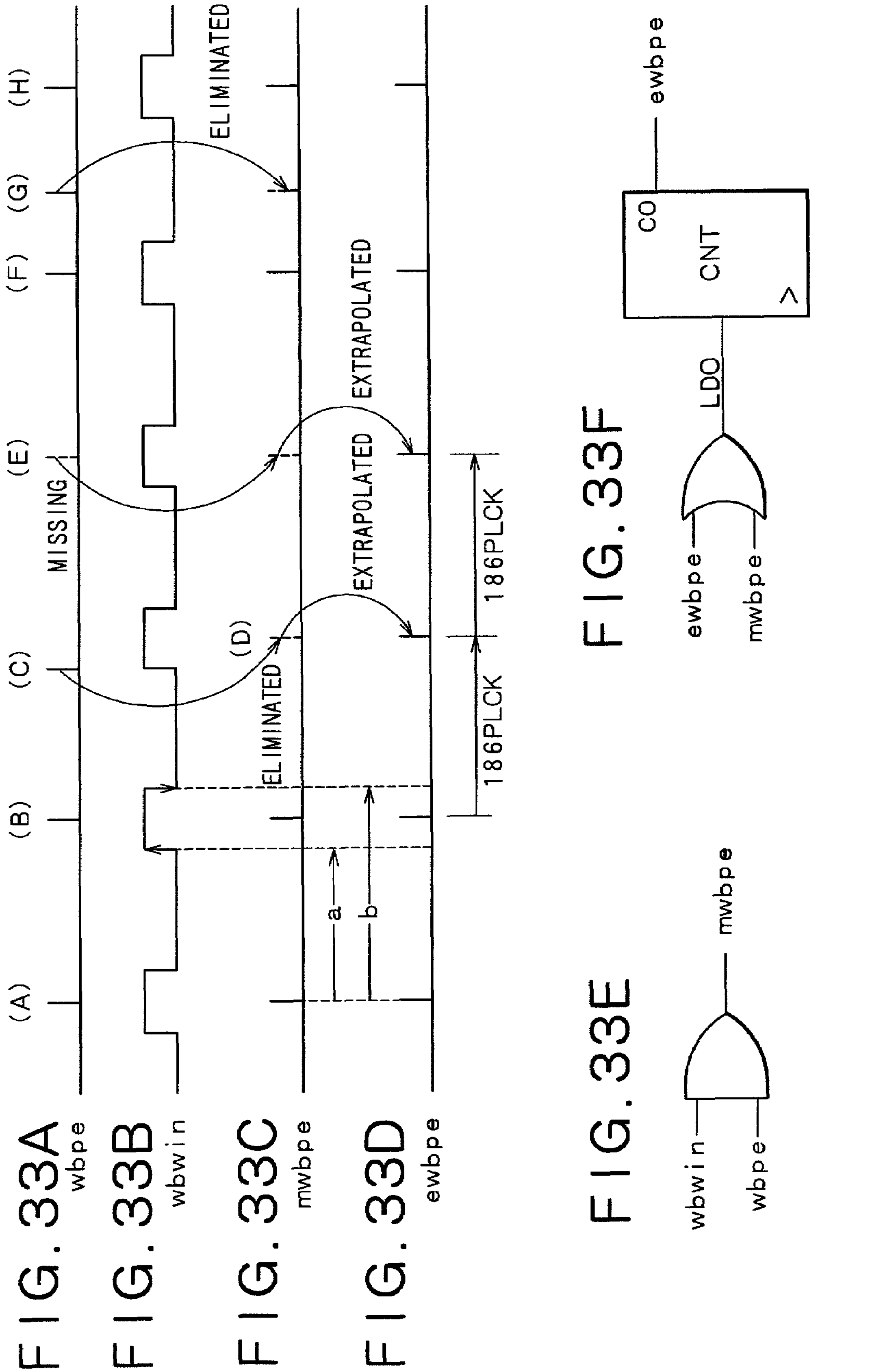
FIGS. 33A through 33F are timing charts and schematic views illustrating how the wobble protection circuit performs an edge prediction process.

Described below with reference to the timing charts of FIGS. 33A through 33D and the circuit diagrams of FIGS. 33E and 33F is a process performed cooperatively by the invalid pulse elimination circuit 125, window generation circuit 126, and extrapolation pulse generation circuit 127 within the wobble protection circuit 52 (the process may also be called the edge predicting operation hereunder).

FIG. 33A shows the edge detection signal "wbpe" obtained by detecting leading edges of the wobble signal.

Edge detection pulses acquired at points (A), (B), (F) and (H) on the waveform of the edge detection signal "wbpe" are judged correctly timed when they occur at High-level intervals where the window "wbwin" is open, as shown in FIG. 33B. These pulses are output unchanged, i.e., not removed by the invalid pulse elimination circuit 125 as depicted in FIG. 33C.

A pulse obtained at point (C) of the edge detection signal "wbpe" should normally occur at point (D) in FIG. 33C but in fact is observed outside the window "wbwin" due to phase fluctuations. This incorrectly timed pulse is removed by the invalid pulse elimination circuit 125.

A pulse acquired at point (G) of the edge detection signal "wbpe" should not normally occur where it does. This pulse is judged improperly timed and is also eliminated by the invalid pulse elimination circuit 125.

A pulse should normally occur at point (E) of the edge detection signal "wbpe" but is missing. In such a case, the invalid pulse elimination circuit 125 lets the signal be output along with the pulse dropout.

When the invalid pulse elimination circuit 125 works as described above, the signal "mwbpe" is acquired as an edge detection signal "wbpe" minus the pulses that are judged illegally timed, as shown in FIG. 33C.

This kind of operation by the invalid pulse elimination circuit 125 is accomplished illustratively by ANDing the window "wbwin" with the edge detection signal "wbpe," as shown conceptually in FIG. 3E.

The extrapolation pulse generation circuit 127 then extrapolates the signal "mwbpe" acquired as depicted in FIG. 33C.

In this case, the edge pulses at points (D) and (E) in time are missing from the signal "mwbpe" of FIG. 33C. The extrapolation pulse generation circuit 127 generates edge pulses in timed relation with points (D) and (E). The extrapolation pulse generation circuit 127 thus outputs the protected wobble signal "ewbpe" with its edge pulses properly generated in suitably timed relation with the wobble cycle, as shown in FIG. 33D.

The above operation of the extrapolation pulse generation circuit 127 is implemented illustratively using the conceptual setup of FIG. 33F.

More specifically, the protected wobble signal "ewbpe" from the extrapolation pulse generation circuit 127 is logically ORed with the signal "mwbpe" devoid of invalid edge pulses. When the output of the logical OR operation turns out High, a downstream counter is loaded with the value 0.

In this case, the counter increments its count value by 1 every time a channel clock signal PLCK occurs. The maximum count value is set for 186. Starting from the initially loaded value of 0, the counter may increment its value up to 186, at which point a pulse is output from a carry-out terminal CO of the counter. This pulse serves as the protected wobble signal "ewbpe."

In other words, the extrapolation pulse generation circuit 127 counts 186 PLCK making up a single wobble cycle starting from the point in time at which an edge pulse of the protected wobble signal "ewbpe" or signal "mwbpe" is obtained. Every time a single wobble cycle is completed, an edge pulse is generated.

For example, a count may be kept up to 186 PLCK starting from the edge pulse obtained at point (B) on the protected wobble signal "ewbpe" in FIG. 33D. In this case, an extrapolated pulse is generated at point (D). A count may also be kept up to 186 PLCK starting from point (D), which causes an extrapolated pulse to occur in properly timed relation at point (E).

The window "wbwin" shown in FIG. 33B is generated by the window generation circuit 126.

Based illustratively on the signals "mwbpe" and "ewbpe" input so far, the window generation circuit 126 predicts when an edge pulse will occur in the next wobble cycle. The predicted point in time is used as a center point around which a signal is generated during a predetermined interval at the High level. The signal thus generated constitutes the window "wbwin." Specifically, if an edge pulse is predicted at point (B), then a High-level signal is generated during an interval between a time "a" and a time "b" relative to the preceding point (A) in time.

Returning to FIG. 31, the sync status determination circuit 128 determines whether or not the wobble protection circuit loop operates in synchronism with the reproduced signal based on the edge detection signal "mwbpe" devoid of invalid input pulses, on the protected wobble signal "ewbpe," and on the window "wbwin."

According to the above-described operation by the wobble protection circuit 52, synchronous status is confirmed as long as the extrapolation timing predicted by the extrapolation pulse generation circuit 127 is correct. The sync status determination circuit 128 judges whether or not extrapolated pulses are generated in properly timed relation using the input signals mentioned above.

For example, the judgment above is made by checking to see whether or not the edge detection signal "mwbpe" minus its invalid pulses and the protected wobble signal "ewbpe" appear in synchronism. In other words, if the edge detection signal "wbpe" and protected wobble signal "ewbpe" occur synchronously, that means the prediction by the extrapolation pulse generation circuit 127 is appropriate; if synchronism is not achieved, the prediction is deemed invalid.

In another example, the appropriateness of the extrapolation pulse generation timing may be judged using the edge detection signal "mwbpe" without invalid pulses and the window "wbwin." Specifically, a check is made to see whether or not the signal "mwbpe" exists in periods where the window "wbwin" is driven High.

Based on the judgment by the sync status determination circuit 128, a status machine 129 in the wobble protection circuit outputs a lock signal WBPLOCK.

The lock signal WBPLOCK is driven High if the sync status determination circuit 128 confirms synchronous status and is brought Low if the sync status determination circuit 128 fails to detect synchronous status. The lock signal WBPLOCK is used for switching control over the switch 130. A High-level lock signal WBPLOCK causes the switch 130 to select the protected wobble signal "ewbpe" coming from the extrapolation pulse generation circuit 127 for output as the protected wobble signal "pwbpe." A Low-level lock signal WBPLOCK causes the switch 130 to select and output the edge detection signal "wbpe."

That is, where synchronous status is confirmed (WBPLOCK=High), the output of the extrapolation pulse generation circuit 127 is deemed reliable and its output is allowed to enter the PLL circuit. If synchronous status is not confirmed (WBPLOCK=Low), then the output signal of the extrapolation pulse generation circuit 127 is judged unreliable. In this case, the original wobble signal "wbpe" is output unprotected.

In the inventive disc drive apparatus, the circuit loop composed of the sync status determination circuit 128 and status machine 129 drives the lock signal WBPLOCK High or Low in the manner described above. This results in status transitions for wobble signal protection as shown in FIG. 34.

Figure 34:
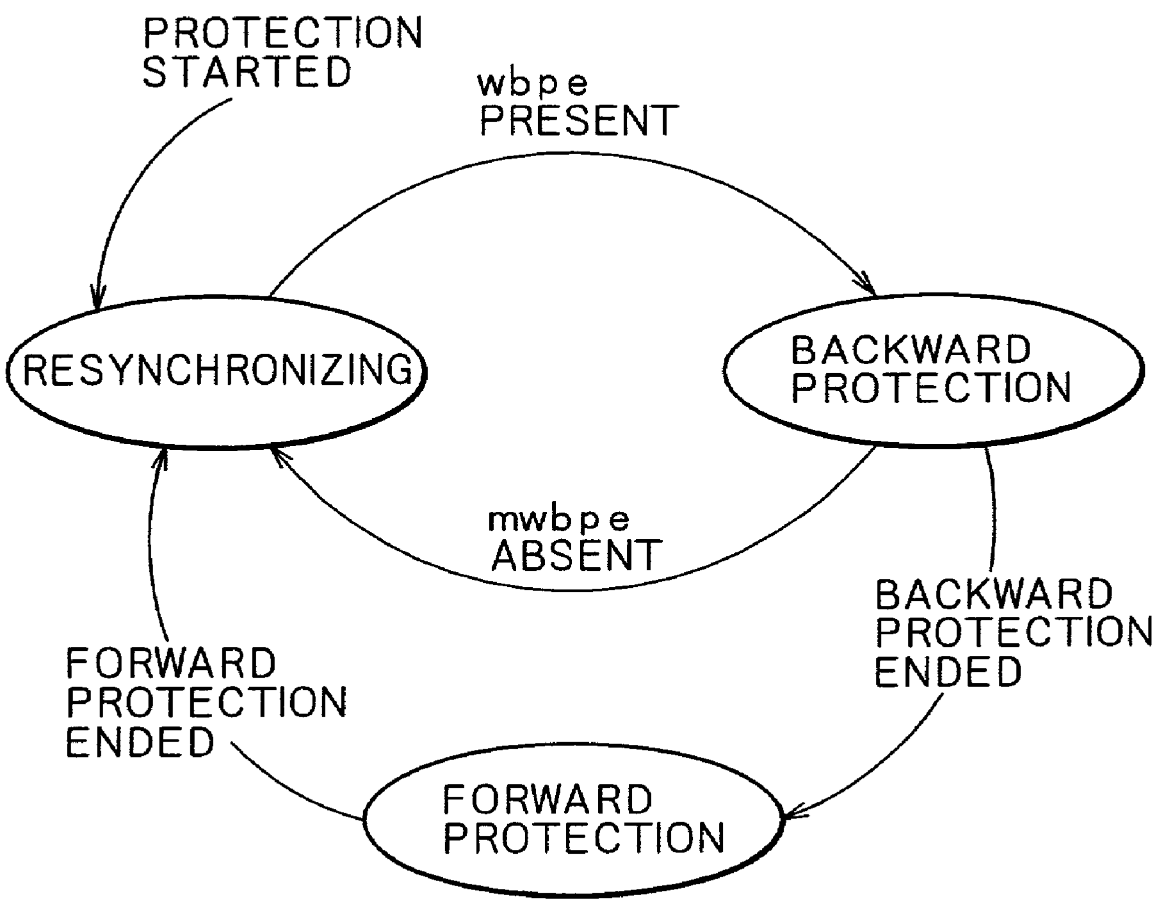
FIG. 34 is an explanatory view revealing transitions of protective operation modes associated with the wobble protection circuit.

As illustrated in FIG. 34, three operation modes are established for wobble signal protection: resynchronizing mode, backward protection mode, and forward protection mode.

In forward protection mode, synchronous status is conformed and the lock signal WBPLOCK is driven High. In resynchronizing or backward protection mode, by contrast, synchronous status is not confirmed and the lock signal WBPLOCK is brought Low.

Illustratively, when the protective operation is started, resynchronizing mode is first entered in which the lock signal WBPLOCK is brought Low. This causes the switch 130 to select the edge detection signal "wbpe" for output as the protected wobble output signal "pwbpe."

In resynchronizing mode, the status machine 129 causes the window generation circuit 126 to open the window "wbwin." In this mode, the edge predicting operation inside the wobble protection circuit 52 (elimination of invalid pulses and extrapolation of edge pulses) is such that all edge pulses obtained as the edge detection signal "wbpe" are rendered effective. If resynchronizing mode is replaced subsequently by backward protection mode, the protected wobble signal "ewbpe" is acquired stably and at higher speeds than before.

If even a single pulse of the edge detection signal "wbpe" is judged acquired by the sync status determination circuit 128, the status machine 129 terminates resynchronizing mode and brings about backward protection mode instead.

In backward protection mode, the lock signal WBPLOCK is also brought Low, which causes the switch 130 to select the protected wobble output signal "pwbpe" for output as the edge detection signal "wbpe." In this mode, however, the window generation circuit 126 is allowed to generate and output the window "Wbwin." In other words, the edge predicting operation above is carried out with the window "wbwin" closed. This permits acquisition of the protected wobble signal "ewbpe" with high reliability immediately after forward protection mode is brought about, as will be described below.

When the sync status determination circuit 128 judges that the wobble signal "mwbpe" devoid of invalid pulses has fallen into the High-level window "wbwin" a predetermined number of times consecutively in backward protection mode, the status machine 129 establishes forward protection mode.

It should be noted that if the wobble signal "mwbpe" without invalid pulses is judged to be outside the High-level window "wbwin" even once, then resynchronizing mode is brought about.

In forward protection mode, the status machine 129 drives the lock signal WBPLOCK High causing the switch 130 to select the protected wobble signal "ewbpe" for output as the protected wobble output signal "pwbpe." At this point, the window generation circuit 126 obviously generates and outputs the window "wbwin." That means the protected wobble signal "ewbpe" is obtained here by the edge predicting operation discussed above with reference to FIGS. 33A through 33F.

In forward protection mode, the sync status determination circuit 128 counts the number of times the signal "mwbpe" does not appear during any High-level intervals of the window "wbwin." The count value is reset the moment the signal "mwbpe" is detected within a High-level window interval. If the count value is judged to have reached a predetermined value, the status machine 129 acts to bring about resynchronizing mode.

Figure 35:
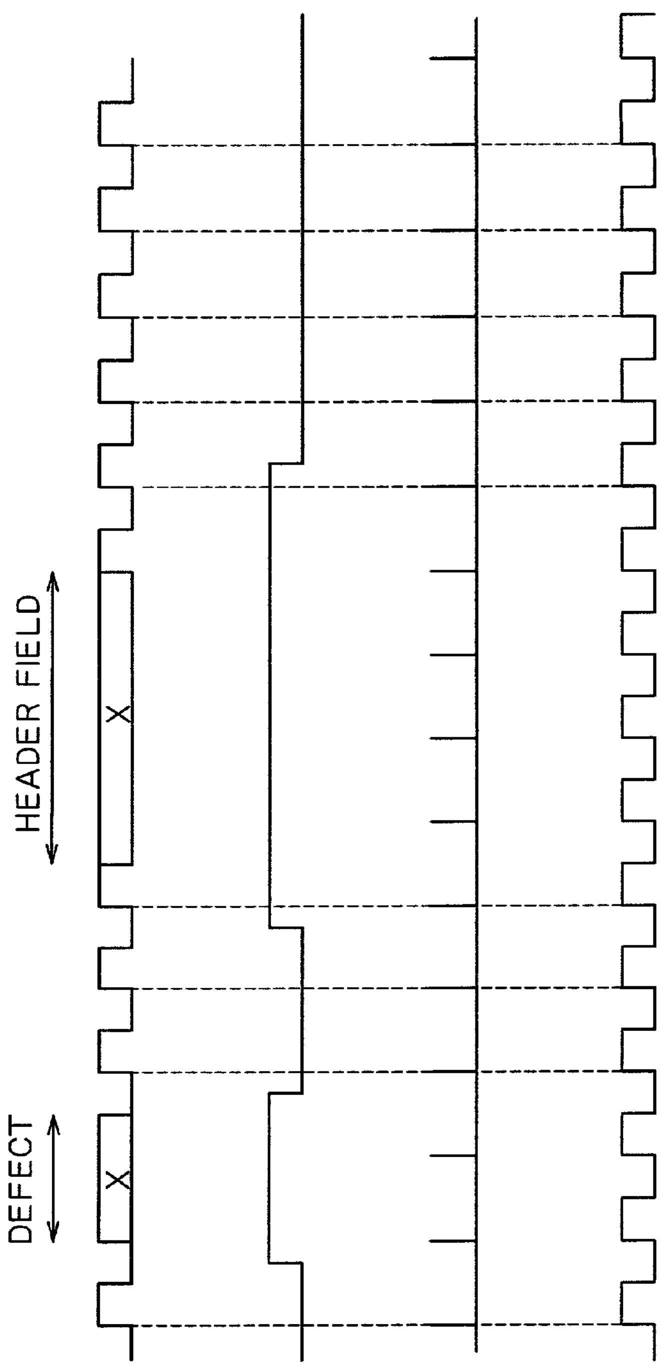
FIGS. 35A through 35D are timing charts showing how the wobble protection circuit carries out a sync protection hold operation.

As shown in FIG. 31, the wobble protection circuit 52 of this disc drive apparatus accepts a sync protection hold signal WBHLD. The sync protection hold signal WBHLD is output when a defect is detected on the disc surface or when a header field is being traced, as illustrated in FIGS. 35A and 35B. That is, the signal is output whenever the wobble signal component is not correctly detected.

The sync protection hold signal WBHLD thus generated causes the status machine 129 to stop, whereby the switch 130 is operated to select the protected wobble signal "ewbpe" for use as the protected wobble output signal "pwbpe."

The sync protection hold signal WBHLD further stops the operation of the leading edge detection circuit 121 so that no edge is detected by the leading edge detection circuit 121 over the line of the edge detection signal "wbpe." As a result, a Low-level signal with no edge detection pulse is output.

The edge predicting operation performed cooperatively by the invalid pulse elimination circuit 125, window generation circuit 126, and extrapolation pulse generation circuit 127 is based on the information in effect preceding the sync protection hold signal WBHLD. Regardless of the header field or defective area being traced, the operation provides the protected wobble output signal "pwbpe" in the form of pulses at constant intervals corresponding to the wobble cycle as shown in FIG. 35C.

For purpose of simplification and illustration, FIG. 35D shows a binary wobble signal based on the protected wobble signal "pwbpe" indicated in FIG. 35C. The presence of the signal sketched in FIG. 35D is only virtual; the signal is not actually generated by any circuit of this disc drive apparatus. As can be seen from a comparison with the original binary wobble signal in FIG. 35A, the binary wobble signal in FIG. 35D is suitably interpolated and rectified in waveform over defects and header fields. That means the protected wobble output signal "pwbpe" in FIG. 35C is indeed protected from defective areas and header fields being traced.

7. Land/Groove Detection

What follows is a description of arrangements for land/groove detection in the inventive disc drive apparatus.

As described earlier, conventional land/groove detection is accomplished either by detecting the inverted pattern of the push-pull signal waveform between the pit rows of PID1 and PID2 on the one hand and those of PID3 and PID4 on the other hand every time a header field is being traced, or by referencing the results of PID decoding.

The conventional method of land/groove detection, it should be noted, is based on the assumption that the laser spot traces the tracks in a substantially correct manner. As long as the laser spot traces header fields correctly, the push-pull signal remains stable and the inverted pattern of its waveform can be detected reliably or PIDs can be detected with high reliability. If the laser spot fails to trace tracks properly, then the reproduced signal becomes unstable. That in turn makes it impossible to obtain the signal with its waveform sufficiently rectified to permit accurate detection of the inverted pattern. Hence the inability to implement land/groove detection.

One reason the laser spot does not always trace tracks correctly is that the spot "traverses" tracks at times of track jumps during access. Obviously the performance of access is improved if land/groove detection is carried out with high reliability.

Such reliable land/groove detection during traverse operations is implemented by the inventive disc drive apparatus as described below.

As shown in FIG. 36, the wobble signal has its waveform inverted to form a 180-degree phase difference between tracing of a land field and tracing of a groove field. With this characteristic taken into account, the inventive disc drive apparatus utilizes the wobble signal "wob" for land/groove detection purposes.

Figure 37:
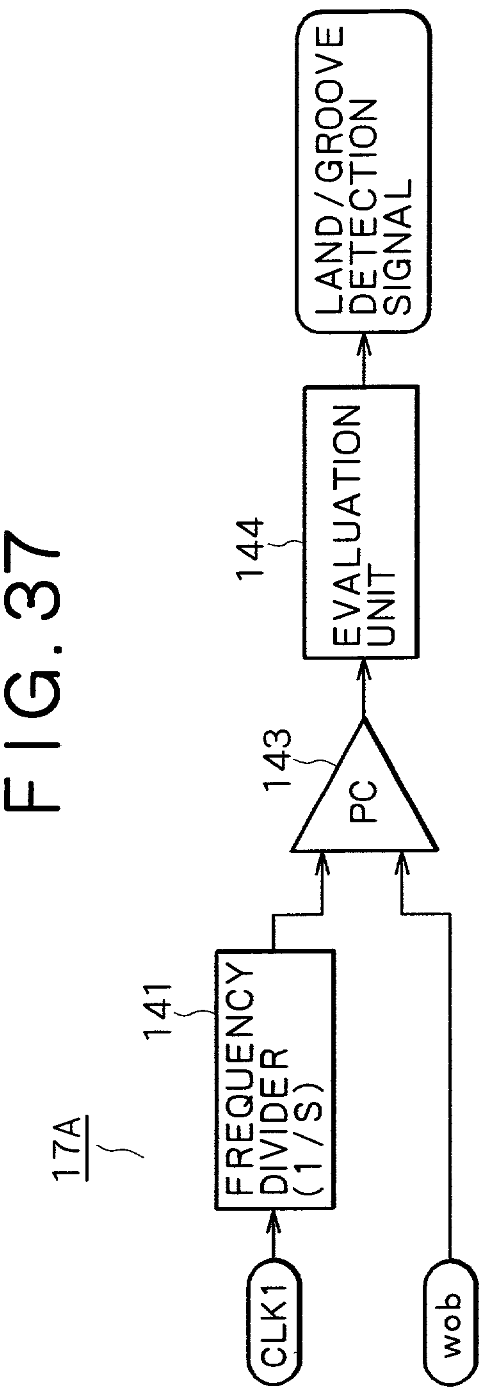
FIG. 37 is a block diagram depicting a basic circuit structure for land/groove detection in the inventive disc drive apparatus.

FIG. 37 is a block diagram showing a conceptual circuit structure for land/groove detection in the inventive disc drive apparatus. The structure represents conceptually a land/groove detection circuit 17A capable of detecting lands and grooves when tracks are traversed. It should be noted that the land/groove detection circuit 17A is furnished independently of the land/groove detection unit 17 shown in FIG. 1. Differing structurally from the circuit 17A, the land/groove detection unit 17 is intended to detect lands and grooves while tracks are being traced.

In the land/groove detection circuit 17A of FIG. 37, a frequency divider 141 divides the wobble sync clock signal CLK1 by a dividing ratio of 1/S to generate a divided signal. The divided signal is input to a phase comparator 143 for use as the reference signal.

The phase comparator 143 also receives the binary wobble signal "wob" as the signal to be compared.

The two signals input to the phase comparator 143 are arranged to have the same frequency. For example, if the wobble sync clock signal CLK1 has the same frequency as the channel clock, then the dividing ratio 1/S becomes equal to 1/186. That is, the relationship S=PR/Q need only hold given the ratios of 1/Q, 1/P and 1/R for the frequency dividers 73, 74 and 75 in the first PLL circuit 53 shown in FIG. 23.

The phase comparator 143 outputs a phase error signal indicating a phase difference between the wobble signal "wob" and the divided signal derived from the wobble sync clock signal CLK1.

The wobble sync clock signal CLK1 is generated on the basis of the protected wobble signal "pwbpe" that has been received (see FIG. 21). The protected wobble signal "pwbpe" in turn is generated based on the wobble signal corrected by the land/groove correction circuit 120 (FIG. 31) in such a manner that the signal polarity is independent of the land or groove being traced. That means the wobble sync clock signal CLK1 is a frequency signal with its polarity kept unchanged regardless of the land or groove being in effect.

If the wobble signal "wob" is in phase with the wobble sync clock signal CLK1 when a groove field is being traced, then the wobble signal "wob" becomes 180 degrees out of phase with the wobble sync clock signal CLK1 when a land field is being traced. That phase difference is detected by the phase comparator 143 as the phase error signal.

Figure 38:
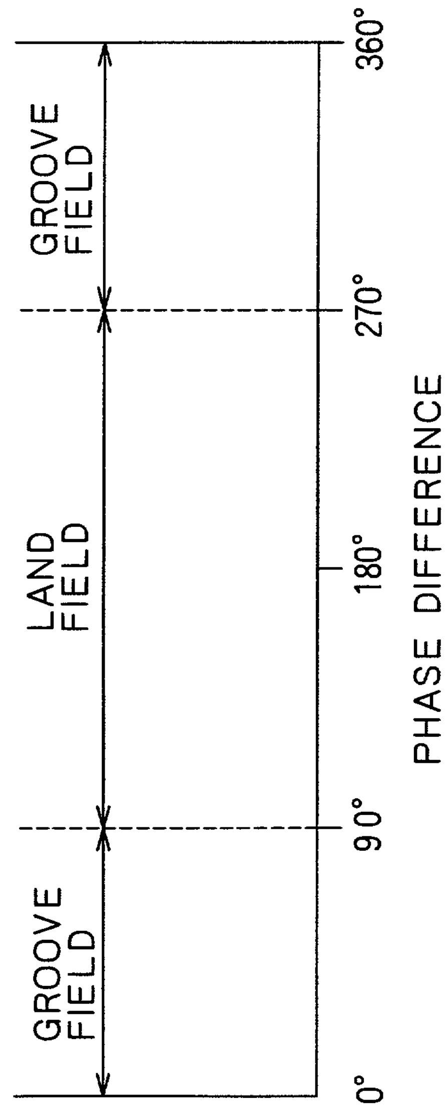
FIG. 38 is an explanatory view outlining relations between a phase difference detected by the circuit of FIG. 37 on the one hand, and a land/groove on the other hand.

The phase error signal from the phase comparator 143 is utilized by the inventive disc drive apparatus in implementing land/groove detection as shown in FIG. 38.

Specifically, suppose that the phase error signal from the phase comparator 143 indicates a phase difference between zero and 90 degrees or between 360 and 270 degrees centering on a zero-degree (or 360-degree) point. In that case, the laser spot is judged to be located over a groove field. If the phase error signal indicates a phase difference between 90 and 270 degrees centering on a 180-degree point, then the laser spot is judged to be located over a land field.

An evaluation unit 144 in FIG. 37 receives the phase error signal from the phase comparator 143. Based on the received signal, the evaluation unit 144 judges whether the laser spot is over a land or a groove as discussed above with reference to FIG. 38. If the laser spot is judged to be over a land field, the evaluation unit 144 generates a High-level signal; if the laser spot is judged to be over a groove field, a Low-level signal is generated. In either case, the generated signal is output as a land/groove detection signal.

The disc drive apparatus of the invention may alternatively implement land/groove detection using the signal generated by the wobble protection circuit 52. The wobble detection circuit 52 performs its protective process upon input of the wobble signal "wob" as described above. In that respect, application of the wobble protection circuit 52 to land/groove protection also takes advantage of the fact that the wobble signal is inverted in waveform depending on the land field or groove field being traced.

Figure 39:
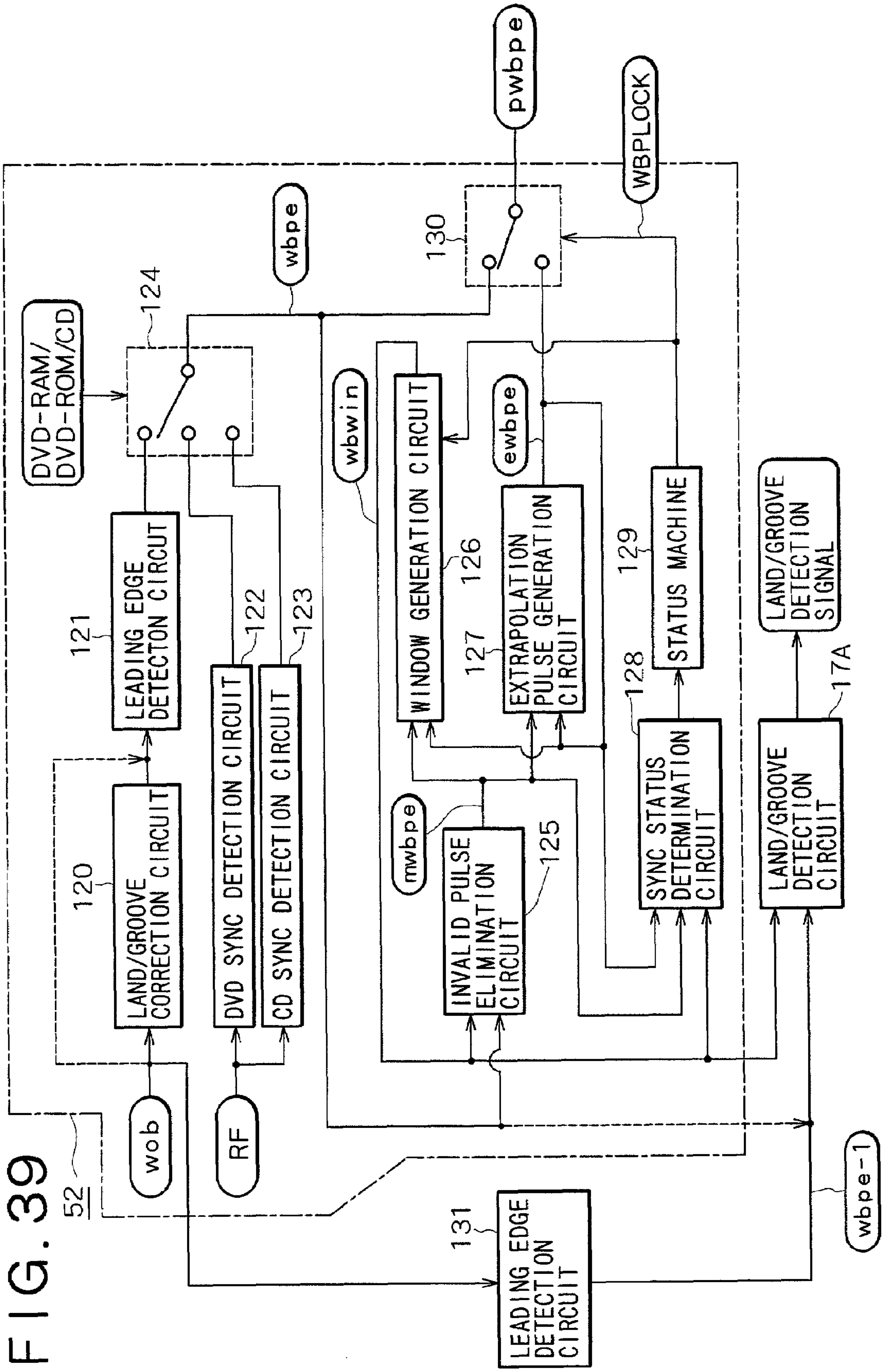
FIG. 39 is a block diagram of another circuit structure for land/groove detection in the inventive disc drive apparatus.
Figure 40:
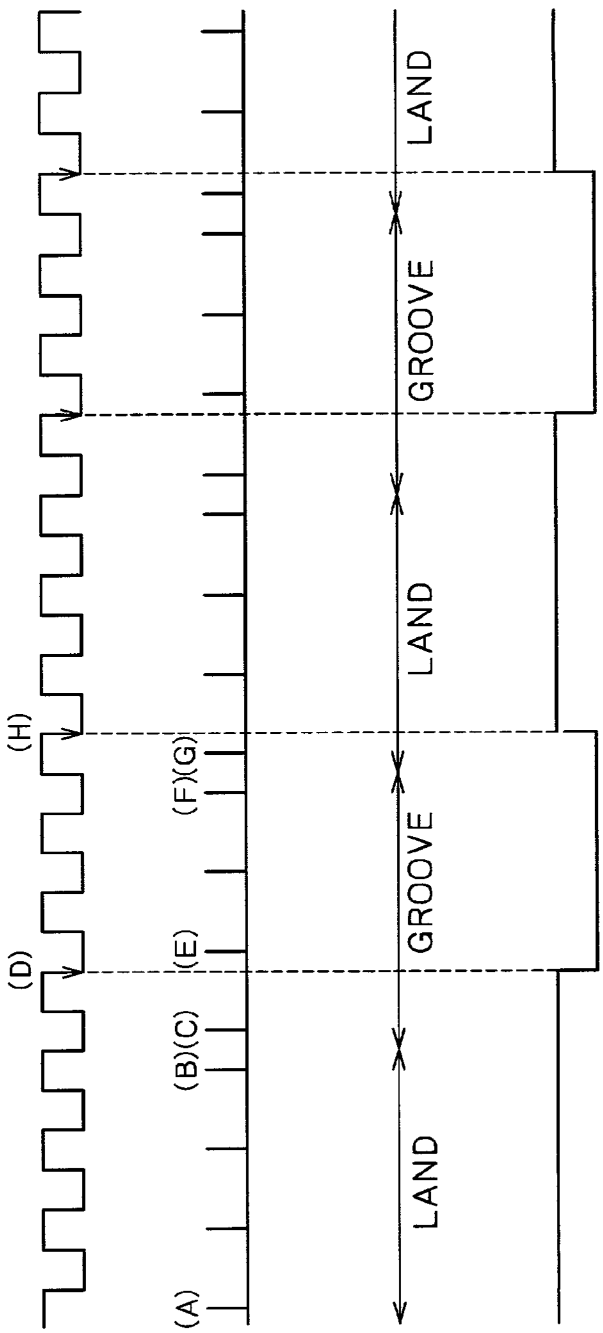
FIGS. 40A through 40D are timing charts illustrating a typical land/groove detecting operation performed by the circuit of FIG. 39.

FIG. 39 shows a circuit structure that utilizes the wobble protection circuit 52 for land/groove detection in the inventive disc drive apparatus. In the wobble protection circuit 52 of FIG. 39, those parts with their counterparts already shown in FIG. 31 are given the same reference numerals, and descriptions of such parts are omitted where redundant.

In the setup of FIG. 39, two signals are input to the land/groove detection circuit 17A: the window "wbwin" generated by the window generation circuit 126 in the wobble protection circuit 52, and an edge detection signal "wbpe-1" obtained by the leading edge detection circuit 131 detecting leading edges from the binary wobble signal "wob" admitted into the circuit 52.

Given the two signals, the land/groove detection circuit 17A generates and outputs a land/groove detection signal accordingly.

FIGS. 40A through 40D are timing charts showing how the land/groove detection circuit 17A of FIG. 39 typically operates.

If the window "wbwin" is assumed to occur as illustrated in FIG. 40A, then the laser spot moves between land and groove fields as depicted in FIG. 40C.

The edge detection signal "wbpe-1" indicated in FIG. 40B has not undergone correction by the land/groove correction circuit 120. For that reason, the edge detection signal entails a 180-degree phase difference in its edge pulse timing depending on the land or groove field being traced. The window "wbwin" is driven High during intervals corresponding to the wobble cycle.

Thus when the laser spot is located over a land field, the edge detection signal "wbpe-1" has its edge pulses generated between points (A) and (B) shown in FIG. 40B during intervals where the window "wbwin" is driven High. When the laser spot is located over a groove field, the edge detection signal "wbpe-1" has its edge pulses generated between points (C) and (F) during intervals where the window "wbwin" is brought Low, not during intervals where the window "wbwin" is driven High.

That is, land/groove detection is implemented by the setup ascertaining whether or not the edge pulses of the edge detection signal "wbpe-1" appear during intervals where the window "wbwin" is driven High.

In the above setup, the land/groove detection signal is switched between the High and Low levels at trailing edges of the window "wbwin" as depicted in FIG. 40D.

In the case of FIG. 40B, a land field is traced between point (A) and point (B). Past point (B), a groove field starts being traced and an edge pulse appears for the first time at point (C) since point (B) during an interval where the window "wbwin" is brought Low. In other words, edge pulses do not occur consecutively during intervals where the window "wbwin" is driven High.

Once the absence of edge pulses is established at point (D) during the High-level interval of the window "wbwin," the land/groove detection signal is brought Low (over groove field) from its High level (over land field).

Thereafter, edge pulses occur likewise between point (E) and point (F) during an interval where the window "wbwin" is brought Low. Immediately after the interval (E) through (F), a land track starts getting traced. An edge pulse appears at point (G) during an interval where the window "wbwin" is driven High. Then at point (H) where a trailing edge of the window "wbwin" occurs for the first time past point (G), the land/groove detection signal is driven High (over land field) from its Low level (over groove field).

Figure 41:
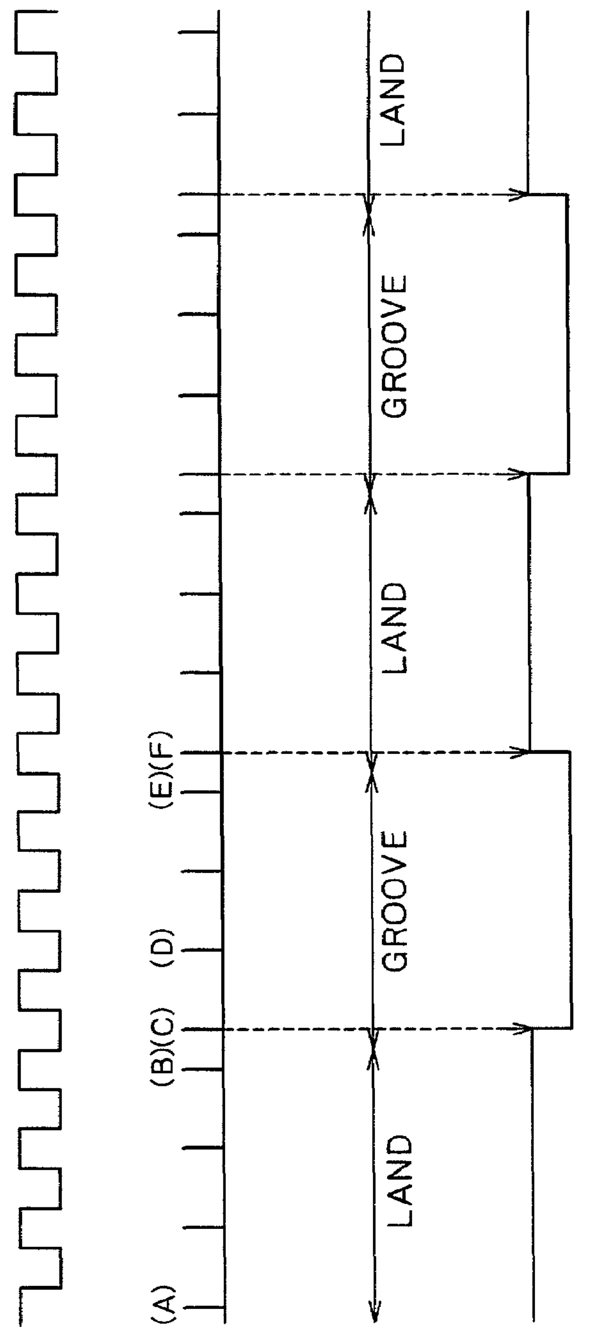
FIGS. 41A through 41D are timing charts showing another land/groove detecting operation performed by the circuit of FIG. 39.

Alternatively, the land/groove detection signal of the land/groove detection circuit 17A in the inventive disc drive apparatus may be switched between the High and Low levels as indicated in the timing charts of FIGS. 41A through 41D. The timings in FIGS. 41A through 41C are the same as those in FIGS. 40A through 40C and they will not be described further.

Comparing FIG. 41B with FIG. 41D reveals that the land/groove detection signal is switched between the High and Low levels at times when edge pulses are detected.

More specifically, a land field is traced between point (A) and point (B) in FIG. 41A. Past point (B), a groove field starts getting traced and an edge pulse appears for the first time at point (C) since point (B) during an interval where the window "wbwin" is brought Low. The land/groove detection signal is brought Low (over groove field) from its High level (over land field) at point (C) where the edge pulse is detected.

Between point (D) and point (E), the laser spot is located over the groove field and edge pulses occur where the window "wbwin" is brought Low. The groove field is followed by a land field beginning at point (F). From point (F) on, edge pulses occur during intervals where the window "wbwin" is driven High. It is at point (F) that the land/groove detection signal is driven High (over land field) from its Low level (over groove field).

The above arrangements of this disc drive apparatus allow land/groove detection to be implemented even when tracks are traversed.

In the inventive disc drive apparatus, as described, the land/groove detection circuit 17A for detecting lands and grooves where tracks are traced is provided independently of the land/groove detection unit 17 for land/groove detection where tracks are traversed. The dual detection setup is adopted in view of the fact that the land/groove detection circuit 17A accepting the unprotected original wobble signal may not ensure reliable performance when tracks are traced. However, the land/groove detection circuit 17A could be shared for land/groove detection by two setups, one for use where tracks are traced and the other for use where tracks are traversed. This eventuality is conceivable at a later date when suitable arrangements are devised to ensure high reliability even where the unprotected wobble signal is used or when arrangements are made based solely on the land/groove detection circuit 17A to reduce the possibility of erroneous land/groove detection.

The timings shown in FIGS. 40A through 41D are simplified representations of the actual workings.

In practice, the way the laser spot is timed to be located over lands and grooves is somewhat different from the way the land/groove detection signal is timed to be switched between the High and Low levels. However, such actual timing differences are negligible and do not affect the processes of control over data reproduction.

In the setup of FIG. 39 discussed above, the leading edge detection circuit 131 was shown additionally provided, the leading edge detection circuit 131 accepting the wobble signal "wob" as its input and outputting the edge detection signal "wbpe-1" for land/groove detection. Alternatively, the leading edge detection circuit 131 may be omitted from the setup.

In such a case, the wobble signal "wob" is made to pass through the land/groove correction circuit 120 for input to the leading edge detection circuit 121, as shown by the dashed line in FIG. 39 indicative of the signal line. The edge detection signal "wbpe" derived from the leading edge detection circuit 121 is then forwarded to the land/groove detection circuit 17A.

This alternative makes use of some portions of the wobble protection circuit 52 and thereby constitutes a more simplified circuit structure. On the other hand, the earlier setup including the leading edge detection circuit 131 provides higher degrees of freedom because the setup allows the wobble protection circuit 52 and the land/groove detection circuit 17A to function in parallel and independently of each other.

8. Detection of the Laser Spot Moving Direction

Taking advantage of the results of lands and grooves being detected correctly even when tracks are traversed, the inventive disc drive apparatus can also detect the radial direction of the disc in which the laser spot traverses tracks illustratively for access. Conventionally, it has been impossible to detect the moving direction in which the laser spot traverses tracks.

Figure 42:
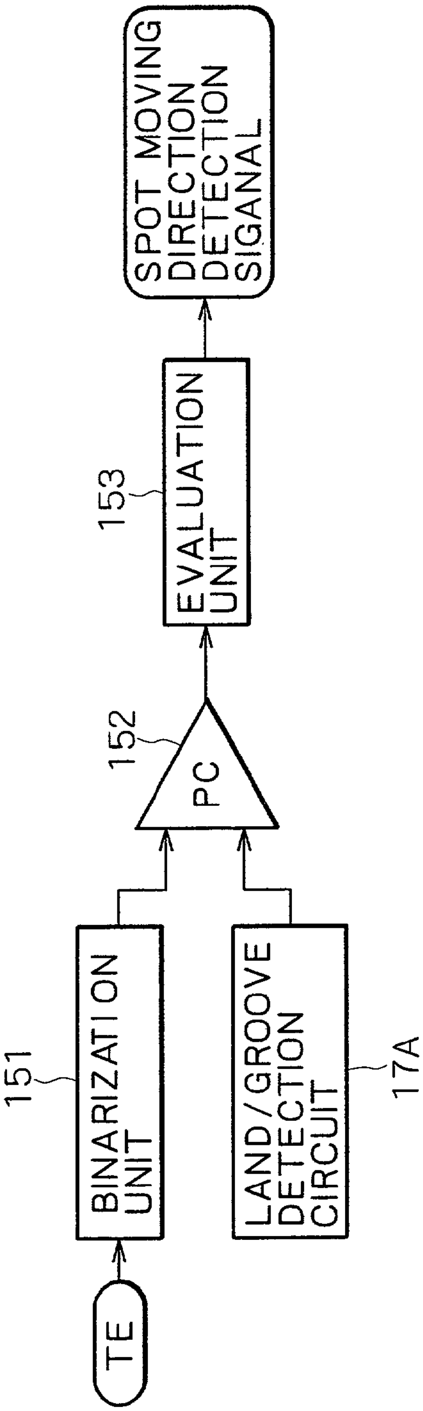
FIG. 42 is a block diagram of a circuit structure for detecting the moving direction of the laser spot in the inventive disc drive apparatus.

FIG. 42 shows a typical circuit structure in the inventive disc drive apparatus for detecting the direction in which the laser spot moves. As illustrated in FIG. 42, the setup to detect the laser spot moving direction uses two signals: a tracking error signal TE, and the land/groove detection signal coming from the land/groove detection circuit 17A. The land groove detection signal is acquired by the structure for land/groove detection described above with reference to FIGS. 37 through 41D. The tracking error signal TE is binarized by a binarization unit 151 before being input to a phase comparator 152.

The phase comparator 152 compares the binarized tracking error signal TE with the land/groove detection signal and outputs a phase error signal reflecting the result of the comparison. The output phase error signal is used to determine whether the laser spot is moving from the radially inner zone to the outer zone or in the opposite direction. The principles of such determination are described below with reference to FIGS. 44A through 44D.

Figures 44A, 44B, 44C, 44D:
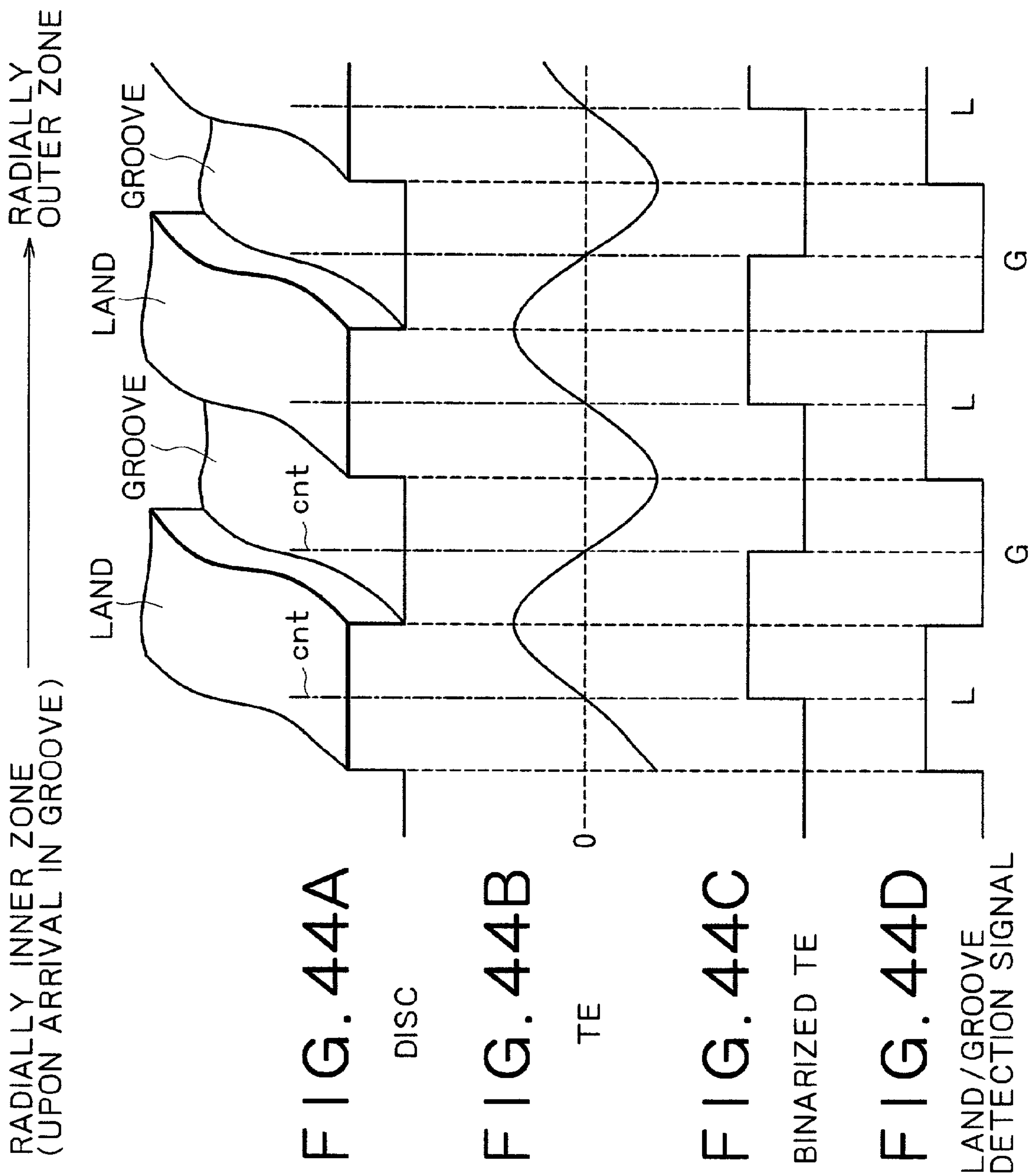
FIGS. 44A through 44D are explanatory views explaining the principles of detection of the laser spot moving direction by the inventive disc drive apparatus.

Each recordable field on the DVD-RAM is made up of land and groove tracks arranged alternately in the radial direction of the disc, as indicated in FIG. 44A. FIG. 44B shows the tracking error signal TE (also called a traverse signal) obtained when these tracks are traversed. With the laser spot assumed to move from the radially inner zone to the radially outer zone, the signal TE takes on a sinusoidal waveform that crosses level zero at a center "cnt" of each land and groove track. This sine wave attains a positive peak where the laser spot starts moving from a land track into a groove track and reaches a negative peak where the laser spot starts moving from a groove track into a land track.

The binary tracking error signal TE acquired by binarizing the tracking error signal TE goes High during intervals where the original tracking error signal TE is higher than level zero and goes Low during intervals where the original signal TE is lower than level zero, as shown in FIG. 44C. The tracking error signal TE is inverted in polarity depending on the laser spot moving from the radially inner zone to the outer zone or in the opposite direction. The polarity settings also differ from one system to another. For example, the signal TE may have the polarity characteristics opposite to those shown in the above figures. As illustrated in FIG. 44D, the land/groove detection signal takes on a waveform that goes High over each land track and goes Low over each groove track.

Figure 43:
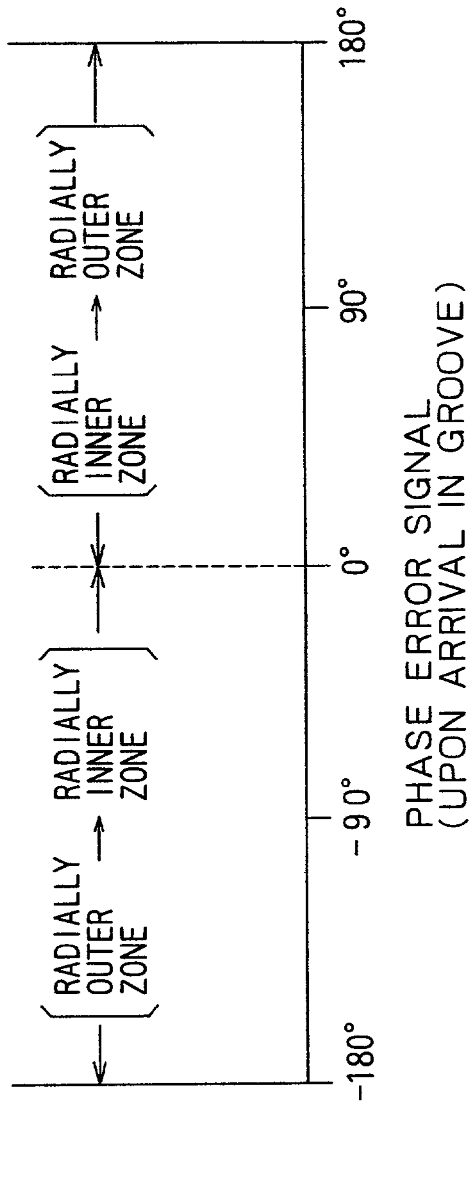
FIG. 43 is an explanatory view indicating the laser spot moving direction as detected by the circuit of FIG. 42 depending on the phase difference between a tracking error signal and a land/groove detection signal.

Comparing the binarized tracking error signal TE in FIG. 44C with the land/groove detection signal in FIG. 44D indicates a phase difference between the two signals. It can also be seen that the polarity of the phase difference is inverted depending on the laser spot moving from the radially outer zone to the inner zone or in the opposite direction. This phase difference is utilized as a basis for judging the direction in which the laser spot is moving. More specifically, as shown in FIG. 43, if the land/groove detection signal leads the tracking error signal TE in phase, the laser spot is judged to be moving from the radially inner zone to the outer zone; if the land/groove detection signal lags behind the tracking error signal TE, then the laser spot is judged to be moving from the radially outer zone to the inner zone.

Returning to FIG. 42, the evaluation unit 153 accepting the phase error signal from the phase comparator 152 determines the laser spot moving direction based on the phase difference revealed by that signal and on the principles of operation explained with reference to FIGS. 43 through 44D. With the spot moving direction thus determined, the evaluation unit 153 outputs a spot moving direction detection signal representing that direction. Illustratively, the spot moving direction detection signal may be a signal that goes High or Low depending on the laser spot moving from the radially inner zone to the outer zone or in the opposite direction.

9. Track Jump Control

The inventive disc drive apparatus detects the laser spot moving direction as described above when tracks are traversed. Given the result of the detection, the apparatus executes braking control toward the end of a track jump as part of track jump control in ways to be described below.

Figure 45:
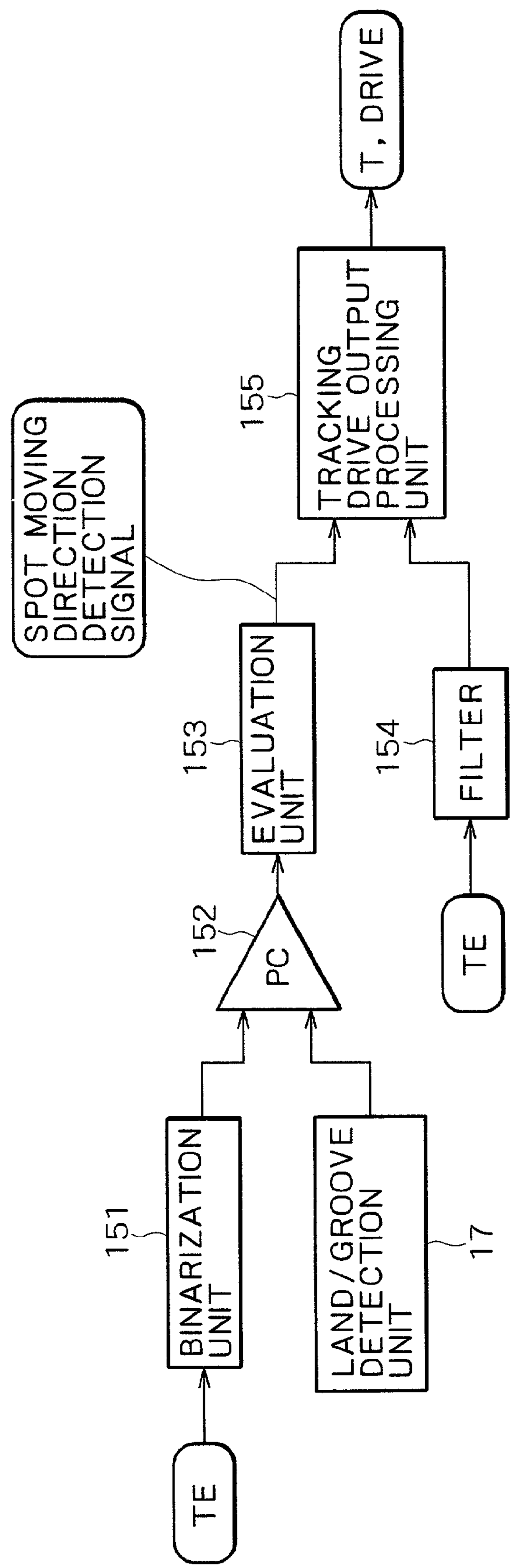
FIG. 45 is a block diagram sketching a typical structure of a braking circuit in the inventive disc drive apparatus.

FIG. 45 shows a typical structure of a braking circuit for implementing braking control toward the end of each track jump. The braking circuit (excluding the land/groove detection circuit 17A) is furnished illustratively in a tracking servo control circuit arrangement inside the servo processor 5, the circuit being used just as a track jump comes to an end.

The braking circuit of FIG. 45 contains the circuit for detecting the laser spot moving direction shown in FIG. 42, including the binarization unit 151, land/groove detection circuit 17A, phase comparator 152 and evaluation unit 153. The evaluation unit 153 outputs a spot moving direction detection signal for input to a tracking drive (T. Drive) signal output processing unit 155.

The tracking drive output processing unit 155 receives through a filter 154 the tracking error signal TE having undergone phase and gain compensation to acquire servo loop characteristics. Based on the tracking error signal TE thus received, the processing unit 155 generates a tracking drive signal source. In accordance with the spot moving direction detection signal received as another input, the tracking drive output processing unit 155 applies waveform changes to the tracking drive signal source to generate a braking-dedicated tracking drive signal in a manner braking the laser spot in its current moving direction. The tracking drive signal (T. Drive) thus generated is output toward the end of a track jump.

It should be noted that the tracking drive signal (T. Drive) fed to the dual-axis mechanism of the objective lens is not limited solely to the brake-use tracking drive signal generated as described above. During ordinary data reproduction, other drive signals are also output: drive signals for causing the laser spot correctly to trace tracks, and drive signals such as kick pulses and brake pulses for track jump control prior to completion of each track jump.

Figure 46:
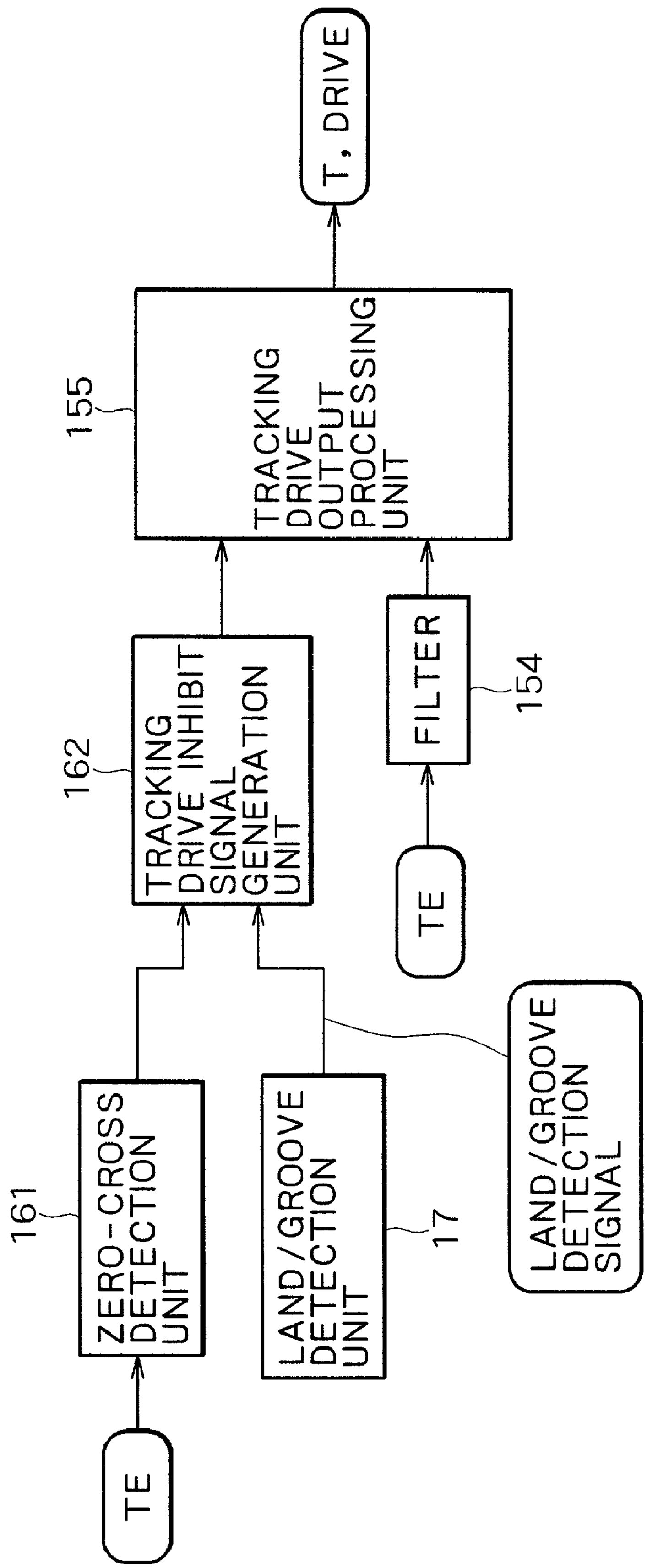
FIG. 46 is a block diagram picturing another structure of the braking circuit in the inventive disc drive apparatus.

With the above-described setup used as a basic structure open for modifications, an actual braking circuit may be implemented illustratively as depicted in FIG. 46. The braking circuit of FIG. 46 is discussed below by referring to FIGS. 47A through 47E as needed. FIGS. 47A through 47E are timing charts showing how the braking circuit of FIG. 46 typically operates. In this example, the laser spot is assumed to be moving from the radially inner zone to the outer zone upon arrival at a groove track.

In FIG. 46, a zero-cross detection unit 161 replaces the binarization unit 151 and phase comparator 152 shown in FIG. 42. The zero-cross detection unit 161 accepts the tracking error signal TE, detects zero-cross points therefrom, and outputs detection pulses at the points of detection. For example, if the tracking error signal TE is obtained as illustrated in FIG. 47A upon arrival at a target groove track, then the zero-cross detection unit 161 detects zero-cross points from the tracking error signal TE and outputs detection pulses at the detected zero-cross points as shown in FIG. 47B.

A tracking drive inhibit signal generation unit 162 in FIG. 46 receives two signals: the detection pulses from the zero-cross detection unit 161, and the land/groove detection signal from the land/groove detection circuit 17A. As shown in FIG. 47C, the land/groove detection signal is switched between the High and Low levels at peaks of the tracking error signal TE. Illustratively, the land/groove detection signal indicates a land field when driven High and reveals a groove field when brought Low.

Figures 47A, 47B, 47C, 47D, 47E:
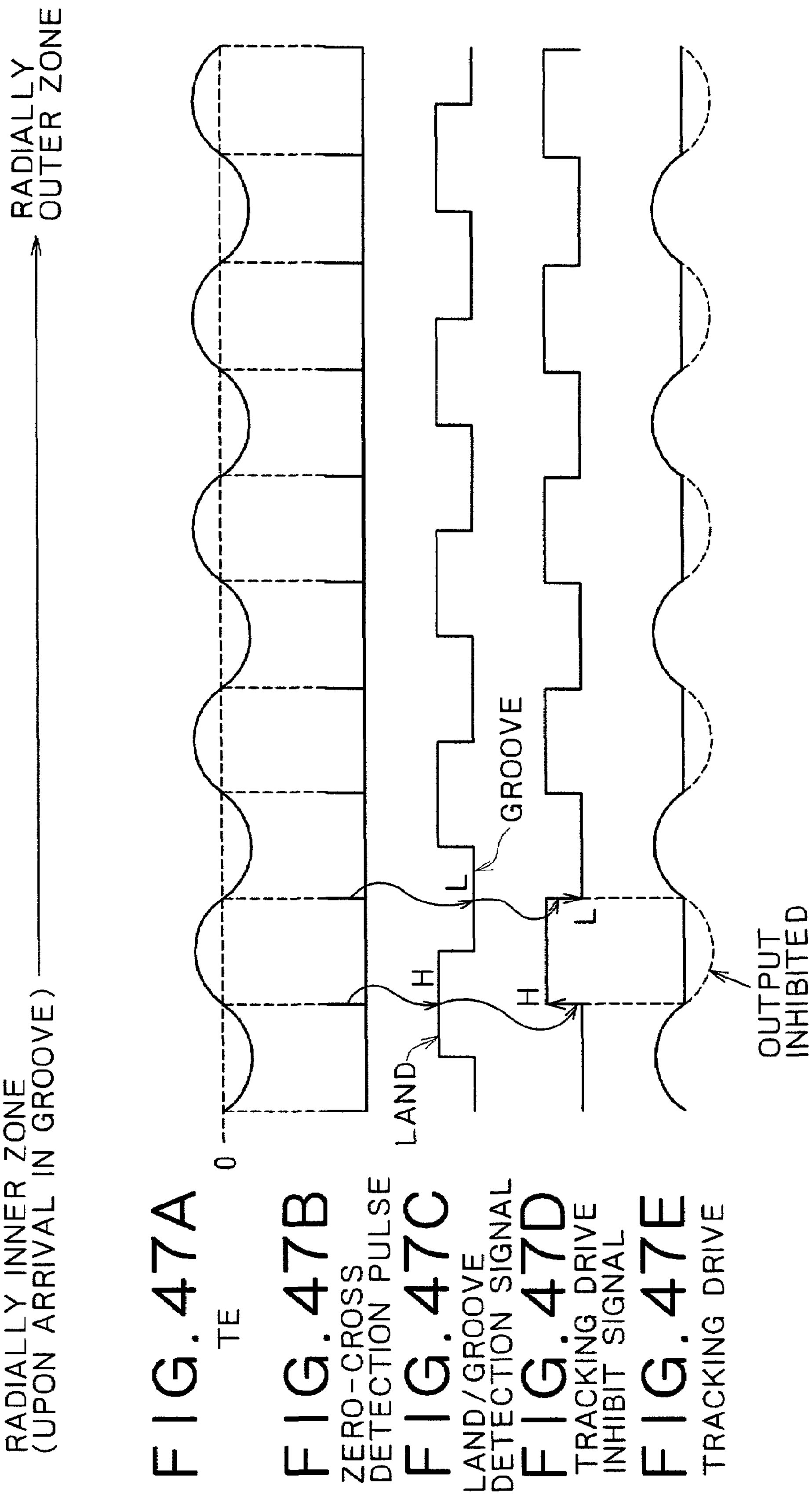
FIGS. 47A through 47E are timing charts showing how the braking circuit operates (moving from radially inner zone to radially outer zone)

Given the input detection pulses (FIG. 47B) and land groove detection signal (FIG. 47C), the tracking drive inhibit signal generation unit 162 generates a tracking drive inhibit signal shown in FIG. 47D. Specifically, the tracking drive inhibit signal of FIG. 47D is driven High and held there when a zero-cross detection pulse occurs while the land/groove detection signal of FIG. 47C is being High; and the tracking drive inhibit signal is brought Low and held there when the next zero-cross detection pulse occurs while the land/groove detection signal is being Low.

The tracking drive output processing unit 155 receives the tracking drive inhibit signal (FIG. 47D) generated as described and the tracking error signal TE (FIG. 47A) past the filter 154. In turn, the processing unit 155 generates a tracking drive signal source reflecting the waveform of the input tracking error signal TE. The tracking drive signal source has a waveform whose polarity is opposite to that of the tracking error signal TE of FIG. 47A. That is, the tracking drive signal source has a waveform substantially close to the inverted waveform of the tracking error signal TE of FIG. 47A.

The tracking drive signal source thus generated has its waveform changed so that level zero is maintained during intervals where the tracking drive inhibit signal (FIG. 47D) goes High. The waveform change brings about a tracking drive signal (T. Drive) shown in FIG. 47E. Specifically, the tracking drive signal source is kept from manifesting those negative signal waveform portions (indicated by broken lines) which would cause the objective lens 34 to move in the radially outer direction if not inhibited and replaced by level zero.

The tracking drive signal (T. Drive) thus generated is used to control the objective lens 34 in its movement in a way braking the laser spot moving from the radially inner zone to the outer zone. Such movement control is executed toward the end of a track jump while the objective lens 34 is moving from the radially inner zone to the outer zone. The control allows the laser spot to arrive at the target location in a more reliable and stable manner than before. When the target location is reached with higher reliability upon track jump, the settling operation under tracking servo control is carried out at an appreciably higher speed at the end of the track jump. In this manner, the braking circuit of the disc drive apparatus helps improve access performance.

The workings of the braking circuit illustrated in FIGS. 47A through 47E apply when the laser spot is moving from the radially inner zone to the outer zone upon arrival at the target groove track. By contrast, the timing charts in FIGS. 48A through 48E apply when the laser spot is moving in reverse, i.e., from the radially outer zone to the inner zone upon arrival at a destination groove track.

Because the laser spot moving direction in effect in FIGS. 48A through 48E is opposite to the direction of the laser spot movement in effect in FIGS. 47A through 47E, the tracking error signal TE is inverted in polarity between the two sets of figures with respect to land and groove locations. The polarity inversion of the signal TE is observed clearly when FIGS. 47C and 47A are compared with FIGS. 48C and 48A respectively.

Figures 48A, 48B, 48C, 48D, 48E:
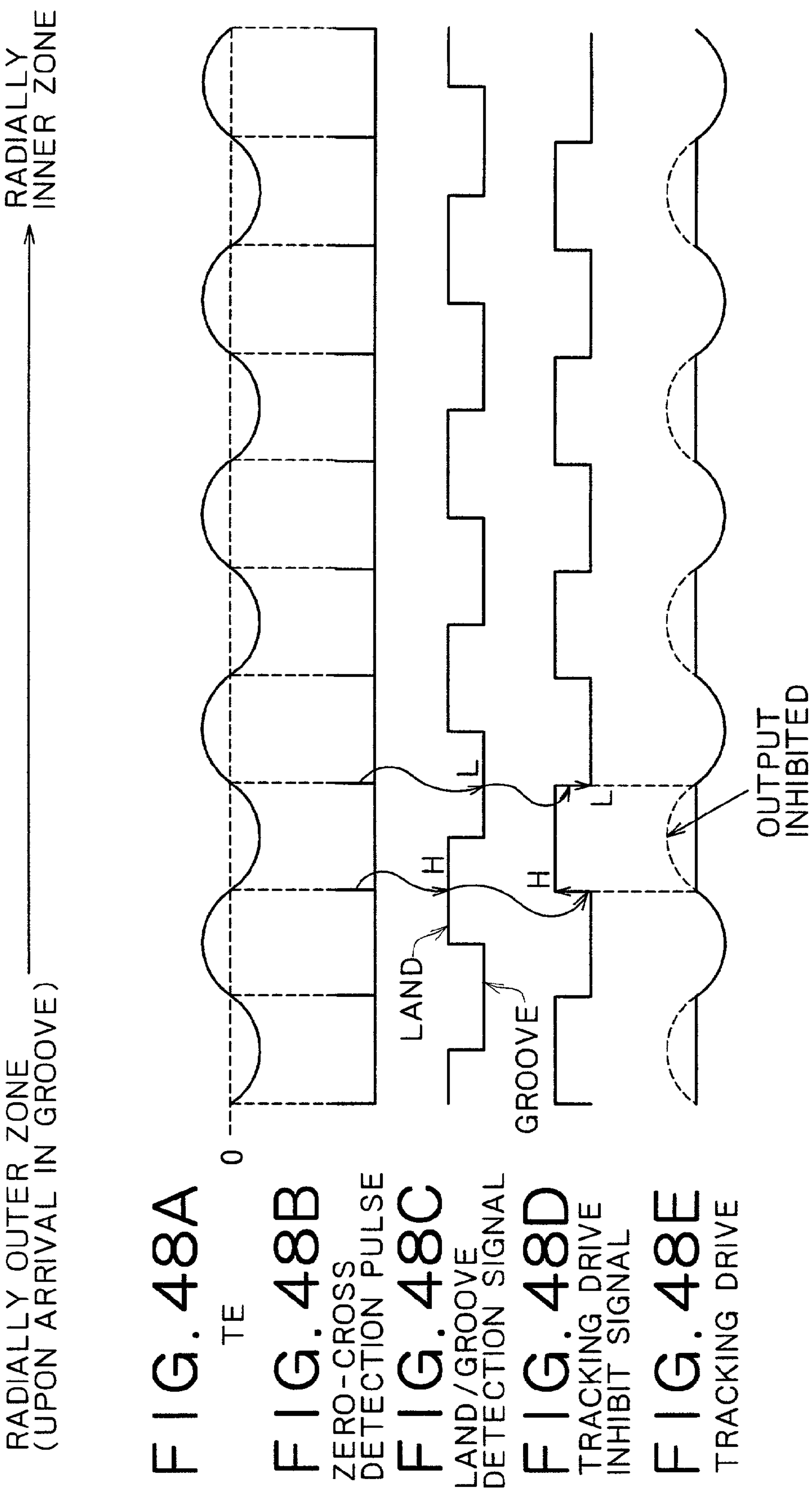
FIGS. 48A through 48E are other timing charts depicting how the braking circuit operates (moving from radially outer zone to radially inner zone)

With the tracking error signal TE thus inverted in polarity, the zero-cross detection unit 161, tracking drive inhibit signal generation unit 162, and tracking drive output processing unit 155 perform the same operations as those discussed above. The operations of the units generate a tracking drive inhibit signal (FIG. 48D) based on the zero-cross detection pulses (FIG. 48B) and land/groove detection signal (FIG. 48C). The tracking drive inhibit signal entering the tracking drive output processing unit 155 causes this unit to generate a tracking drive signal (T. Drive) that presents a modified waveform (FIG. 48E) derived from the original tracking drive signal source. That is, as indicated by broken lines in FIG. 48E, the tracking drive signal (T. Drive) is generated when the tracking drive signal source is kept from manifesting those positive signal waveform portions which would cause the objective lens 34 to move in the radially inner direction if not inhibited and replaced by level zero. The resulting tracking drive signal applies brakes to the objective lens 34 moving from the radially outer zone to the inner zone. Such movement control thus allows the laser spot to arrive at the target track in a stabilized manner following the objective lens movement from the radially inner zone to the outer zone.

On the one hand, according to the land/groove recording method, tracking servo control may be carried out by inverting the tracking error signal TE in waveform depending on whether the target location to arrive at upon access is a land track or a groove track. On the other hand, tracking servo control may be effected using the tracking error signal TE left uninverted in its waveform. The inventive disc drive apparatus described so far operates on the assumption that the tracking error signal TE is inverted under control. Where inversion of the tracking error signal TE is involved, the way the tracking error drive signal is generated with its output inhibit intervals established by the braking circuit varies depending on either a land track or a groove track getting arrived at. The waveforms discussed above in reference to FIGS. 47A through 48E apply when a groove track is arrived at under control of the braking circuit; the waveforms shown in FIGS. 49A through 50E occur when the braking circuit controls arrival of the laser spot at a land track.

Figures 49A, 49B, 49C, 49D, 49E:
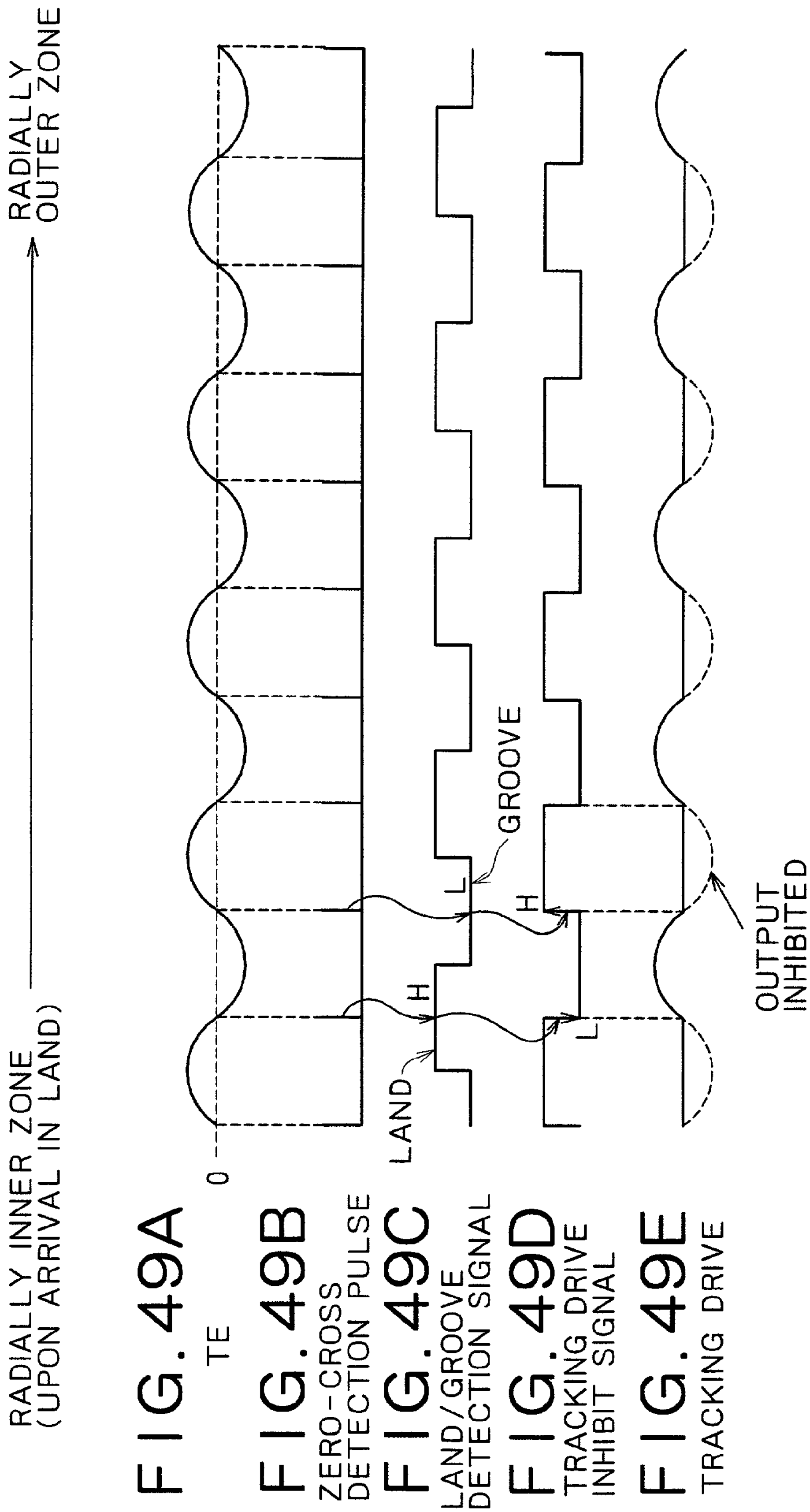
FIGS. 49A through 49E are other timing charts indicating how the braking circuit operates (upon arrival on land; moving from radially inner zone to radially outer zone)

FIGS. 49A through 49E apply when the laser spot is arriving at a land track while moving from the radially inner zone to the outer zone under control of the braking circuit. When FIGS. 49A and 49C are compared with FIGS. 47A and 47C respectively, the tracking error signal TE is seen occurring inversely between the two sets of figures with respect to the High-Low fluctuating pattern of the land/groove detection signal. In other words, as discussed above, the tracking error signal TE occurs inverted in waveform depending on the target location of the laser spot being a land groove or a track groove upon access. The tracking error signal TE thus generated is input to the zero-cross detection unit 161.

In the example of FIGS. 49A through 49E, the zero-cross detection unit 161 also detects zero-cross points from the tracking error signal TE as described above. In turn, the zero-cross detection unit 161 outputs detection pulses in properly timed relation indicated in FIG. 49B.

Depending on whether the track to arrive at is a land or a groove, the tracking drive inhibit signal generation unit 162 changes the way the tracking drive inhibit signal is generated. More specifically, the tracking drive inhibit signal shown in FIG. 49D is brought Low and held there when a zero-cross detection pulse in FIG. 49B occurs while the land/groove detection signal of FIG. 49C is being High; and the tracking drive inhibit signal is driven High and held there when the next zero-cross detection pulse occurs while the land/groove detection signal is being Low. That is, in terms of waveform, the tracking drive inhibit signal of FIG. 49D occurs in reverse relation to that of FIG. 47D when the same conditions are met in the two examples.

The tracking drive output processing unit 155 operates in the same manner as in the example of FIGS. 47A through 47E. That is, in the example of FIGS. 49A through 49E, the tracking drive output processing unit 155 also generates a tracking drive signal source corresponding to the waveform of the tracking error signal TE input to the unit 155. The resulting tracking drive signal source has a waveform substantially close to the inverted waveform of the tracking error signal TE shown in FIG. 49A.

The tracking drive signal source thus generated has its waveform changed so that level zero is maintained during intervals where the input tracking drive inhibit signal (FIG. 49D) goes High. The waveform change brings about a tracking drive signal (T. Drive) whose waveform is shown in FIG. 49E. That is, in the example of FIGS. 49A through 49E, as in the example of FIGS. 47A through 47E, the tracking drive signal (T. Drive) is generated when the tracking drive signal source is kept from manifesting those negative signal waveform portions (indicated by broken lines) which would cause the objective lens 34 to move in the radially outer direction if not inhibited.

FIGS. 50A through 50E apply when the laser spot is arriving at a land track while moving from the radially outer zone to the inner zone under control of the braking circuit. In this example, the moving direction of the laser spot is opposite to that in the example of FIGS. 49A through 49E. It follows that the polarity of the tracking error signal TE relative to land and groove locations is the reverse of what is shown in FIG. 49A. The waveform pattern of the tracking error signal TE in FIG. 50A with respect to the land/groove detection signal in FIG. 50C is the opposite of the waveform of the signal TE in FIG. 48A with regard to the land/groove detection signal in FIG. 48C. The inverted waveform reflects the fact that although the laser spot moving direction in the example of FIGS. 50A and 50C is the same as in the example of FIGS. 48A and 48C, the destination track to be arrived at is not a groove but a land.

When the relevant conditions are met as discussed above causing the tracking error signal TE to invert in polarity, the zero-cross detection unit 161, tracking drive inhibit signal generation unit 162 and tracking drive output processing unit 155 perform the same operations as in the case of FIGS. 49A through 49E. The operations of the units generate a tracking drive inhibit signal (FIG. 50D) based on the zero-cross detection pulses (FIG. 50B) and land/groove detection signal (FIG. 50C). The tracking drive inhibit signal entering the tracking drive output processing unit 155 causes this unit to generate a tracking drive signal (T. Drive) in the same manner as discussed above. As indicated by broken lines in FIG. 50E, the tracking drive signal (T. Drive) presents a waveform devoid of those positive signal waveform portions which would cause the objective lens 34 to move in the radially inner direction if not inhibited.

As discussed above, the inventive disc drive apparatus may alternatively adopt the setup where the tracking error signal TE is kept from inverting regardless of whether the target location to arrive at is a land track or a groove track. In that case, as long as the moving direction of the laser spot is detected, the result of that detection may be effectively utilized as a basis for implementing a suitable braking circuit that will incorporate and apply the workings and arrangements described above.

Under ZCLV control, an access operation may occur across a zone boundary. In such a case, the wobble signal frequency before a jump can be different from the wobble signal frequency in effect upon arrival at a target track after the jump. That contingency is addressed by having the wobble signal frequency of the destination zone generated beforehand by a frequency synthesizer or like device so as to substitute for the wobble sync clock signal CLK1. The wobble signal frequency thus generated allows the braking circuit of the above-described structure to provide stable braking performance.

To execute spindle control in the above setup requires determining the initial phase of a divided signal derived from the clock CLK1. This requirement is met illustratively as follows: suppose that the laser spot is moving from the radially inner zone to the outer zone. With the laser spot still in motion close to an access destination, those points in time at which trailing edges of the tracking error signal TE are detected indicate groove fields. Thus after a leading edge of the tracking error signal TE is detected while the laser spot has yet to be reversed in direction (i.e., still moving from the radially inner zone to the outer zone) prior to arrival at the destination, the divided signal of the clock CLK1 is driven High at the first-detected leading edge of the wobble signal.

For higher reliability in land/groove detection, it is preferable to acquire as many cycles as possible of the wobble signal over a unit time while tracks are being traversed. For that end, the rotating speed of the disc may be boosted at least for purpose of land/groove detection by the inventive disc drive apparatus. With the rotating speed kept constant, the wobble formation with shorter wavelengths yields a wobble signal of more cycles. Given this characteristic, a novel DVD-RAM format or a new writable disc other than the DVD-RAM may be proposed in the future with shorter wobble formation wavelengths aimed at higher performance.

The invention is not limited to the above-mentioned disc types for data reproduction; the inventive disc drive apparatus also embraces other discs as long as their track formats are suited for application of the invention. The inventive apparatus illustratively addresses DVD-RAM data reproduction. As discussed earlier, the wobble formed by the tracks on the DVD-RAM has a constant cycle of 186 PLCK. On the other hand, the DVD+RW also has a wobble formation that constitutes a signal frequency provided by the addresses having undergone frequency modulation. That is, the wobble formed on the DVD+RW is such that its frequency varies within a predetermined range. With the wobble formation offering the same frequency characteristics, the DVD-RAM format has a constant cycle while the DVD+RW format has a cyclically variable wobble. The present invention also addresses the DVD+RW and similar disc formats in which the wobble is provided by a modulated signal. In these cases, the wobble signal cycle varies but a PLL circuit receiving the wobble signal outputs a frequency signal of a constant cycle, which is an extra benefit.

The description above was made assuming that data reproduction is in effect. Alternatively, the inventive disc drive apparatus also applies to data write operations particularly when required to perform control processes using the wobble signal or to execute land/groove detection according to the land/groove recording method.

While a preferred embodiment of the invention has been described using specific terms, such description is for illustrative purposes only, and it is to be understood that changes and variations may be made without departing from the spirit or scope of the following claims.

What is claimed is:

1. A disc drive apparatus for recording and reproducing data to and from an optical disc-like storage medium which has tracks formed thereon each constituting a wobble with a frequency and which includes land and groove fields for storing said data in retrievable fashion, said disc drive apparatus comprising:

wobble signal generating means for generating a wobble signal representative of information about said wobble detected based on reflected light from said optical disc-like storage medium under a light beam emitted to a disc signal surface of the storage medium;

land/groove detecting means for determining by using the wobble signal, when said light beam fails to trace a specific track correctly on said storage medium, whether the emitted light beam is located on a land field or in a groove field, said land/groove detecting means further outputting a land/groove detection signal having a waveform inverted depending on whether said light beam is located on said land field or in said groove field;

moving direction determining means for determining a radial moving direction of said light beam over said disc signal surface based on a phase difference between said land/groove detection signal and a tracking error signal that represents how much said light beam deviates from said specific track on said disc signal surface; and controlling means for executing control so as to prevent said light beam from moving in the direction determined by said moving direction determining means.

2. A disc drive apparatus according to claim 1, further comprising drive signal generating means for generating, based on said tracking error signal, a tracking drive signal for causing an objective lens through which said light beam passes to move in a manner allowing said light beam correctly to trace said specific track on said disc signal surface;

wherein said controlling means executes control such as to either enable or disable output of said tracking drive signal in order to prevent said objective lens from moving in a direction corresponding to the moving direction determined by said moving direction determining means.

3. A disc drive apparatus according to claim 1, wherein said land/groove detecting means comprises phase detecting means for detecting a phase of said wobble signal so as to provide phase detection information, said land/groove detecting means further determining, based on said phase detection information, whether said emitted light beam is located on said land field or in said groove field over said optical disc-like storage medium.

4. A disc drive apparatus according to claim 1, wherein said land/groove detecting means comprises:

window generating means for generating a window opened at intervals corresponding to a period of said wobble;

first detecting means for detecting a signal change per period based on said wobble signal that is input; and second detecting means for determining whether said emitted light beam is located on said land field or in said groove field over said optical disc-like storage medium, on the basis of whether any signal change is detected by said first detecting means while said window is being opened.

5. A disc drive apparatus for recording and reproducing data to and from an optical disc-like storage medium which has tracks formed thereon each constituting a wobble with a frequency and which includes land and groove fields for storing said data in retrievable fashion, said disc drive apparatus comprising:

wobble signal generating means for generating a wobble signal representative of information about said wobble detected based on reflected light from said optical disc-like storage medium under a light beam emitted to a disc signal surface of the storage medium;

land/groove detecting means for determining by using the wobble signal, when said light beam fails to trace a specific track correctly on said storage medium, whether the emitted light beam is located on a land field or in a groove field, said land/groove detecting means further outputting a land/groove detection signal having a waveform inverted depending on whether said light beam is located on said land field or in said groove field;

zero-cross detecting means for detecting a zero-cross event of a tracking error signal generated to represent how much said light beam deviates from said specific track on said disc signal surface;

drive signal generating means for generating, based on said tracking error signal, a tracking drive signal for causing an objective lens through which said light beam passes to move in a manner allowing said light beam correctly to trace said specific track on said disc signal surface; and setting means for either enabling or disabling output of said tracking drive signal depending on whether said land/groove detection signal indicates said land field or said groove field at a point in time at which said zero-cross event is detected by said zero-cross detecting means.

6. A disc drive apparatus according to claim 5, wherein said land/groove detecting means comprises phase detecting means for detecting a phase of said wobble signal so as to provide phase detection information, said land/groove detecting means further determining, based on said phase detection information, whether said emitted light beam is located on said land field or in said groove field over said optical disc-like storage medium.

7. A disc drive apparatus according to claim 5, wherein said land/groove detecting means comprises:

window generating means for generating a window opened at intervals corresponding to a period of said wobble;

first detecting means for detecting a signal change per period based on said wobble signal that is input; and second detecting means for determining whether said emitted light beam is located on said land field or in said groove field over said optical disc-like storage medium, on the basis of whether any signal change is detected by said first detecting means while said window is being opened.

* * * * *